US009945588B2

(12) United States Patent
Diamond et al.

(10) Patent No.: US 9,945,588 B2
(45) Date of Patent: Apr. 17, 2018

(54) SYSTEMS AND METHODS IMPLEMENTING ROBUST AIR CONDITIONING SYSTEMS CONFIGURED TO UTILIZE THERMAL ENERGY STORAGE TO MAINTAIN A LOW TEMPERATURE FOR A TARGET SPACE

(71) Applicant: Axiom Exergy Inc., Richmond, CA (US)

(72) Inventors: Anthony Diamond, Berkeley, CA (US); Amrit Robbins, Berkeley, CA (US)

(73) Assignee: Axiom Exergy Inc., Richmond, CA (US)

( * ) Notice: Subject to any disclaimer, the term of this patent is extended or adjusted under 35 U.S.C. 154(b) by 192 days.

(21) Appl. No.: 14/859,262

(22) Filed: Sep. 19, 2015

(65) Prior Publication Data

US 2016/0084552 A1 Mar. 24, 2016

Related U.S. Application Data

(60) Provisional application No. 62/052,999, filed on Sep. 19, 2014, provisional application No. 62/081,517, (Continued)

(51) Int. Cl.
*F25B 1/00* (2006.01)
*F25B 6/00* (2006.01)
(Continued)

(52) U.S. Cl.
CPC .............. *F25B 6/00* (2013.01); *F24F 5/0017* (2013.01); *F25B 13/00* (2013.01); *F25B 41/00* (2013.01); *F25B 49/02* (2013.01); *Y02E 60/147* (2013.01)

(58) Field of Classification Search
CPC .. F25B 6/00; F25B 49/02; F25B 13/00; F25B 41/00; F24F 5/0017; Y02E 60/147
See application file for complete search history.

(56) References Cited

U.S. PATENT DOCUMENTS 3,839,879 A   10/1974   Redfern
4,224,925 A    9/1980   Movick
(Continued)

FOREIGN PATENT DOCUMENTS

WO   2014065938 A1   5/2014
WO   2016044819      3/2016

OTHER PUBLICATIONS

International Search Report and Written Opinion for International Application No. PCT/US2015/051108, Search completed Nov. 11, 2015, dated Dec. 17, 2015, 8 Pgs.

(Continued)

*Primary Examiner* — Len Tran
*Assistant Examiner* — Ana Vazquez
(74) *Attorney, Agent, or Firm* — KPPB LLP

(57) ABSTRACT

Systems and methods in accordance with embodiments of the invention implement air conditioning systems that are operable to establish/maintain a desired temperature for a target space and simultaneously establish/maintain a temperature lower than the desired temperature for the target space for an included cold thermal energy storage unit. In one embodiment, an air conditioning system includes: a condensing unit; a liquid pressurizer and distributor ensemble; a cold thermal energy storage unit; a target space; and a suction gas/equalizer; where the listed components are operatively connected by piping such that vapor compression cycles can be simultaneously implemented that result in the cooling of the cold thermal energy storage unit and the target space; and the air conditioning system is configured such that the simultaneous implementation of vapor compression cycles results in cooling the cold thermal energy storage unit to a greater extent relative to the target space.

26 Claims, 67 Drawing Sheets

Related U.S. Application Data filed on Nov. 18, 2014, provisional application No. 62/165,026, filed on May 21, 2015.

(51) Int. Cl.
*F25B 13/00* (2006.01)
*F25B 41/00* (2006.01)
*F25B 49/02* (2006.01)
*F24F 5/00* (2006.01)

(56) References Cited

U.S. PATENT DOCUMENTS

| | | |
|---|---|---|
| 4,280,335 A | 7/1981 | Perez et al. |
| 4,735,064 A | 4/1988 | Fischer et al. |
| 4,756,164 A | 7/1988 | James et al. |
| 5,335,508 A | 8/1994 | Tippmann |
| 5,381,671 A | 1/1995 | Saito et al. |
| 5,383,339 A | 1/1995 | McCloskey et al. |
| 5,386,709 A | 2/1995 | Aaron |
| 5,524,453 A | 6/1996 | James et al. |
| 5,682,752 A | 11/1997 | Dean et al. |
| 6,158,237 A | 12/2000 | Riffat |
| 7,152,413 B1 | 12/2006 | Anderson |
| 8,707,723 B2 | 4/2014 | Narayanamurthy et al. |
| 9,441,861 B2 | 9/2016 | Diamond et al. |
| 2005/0172660 A1 | 8/2005 | Anderson et al. |
| 2009/0133412 A1 | 5/2009 | Narayanamurthy et al. |
| 2011/0023508 A1 | 2/2011 | Bean et al. |
| 2013/0145780 A1 | 6/2013 | Parsonnet et al. |
| 2014/0165616 A1 | 6/2014 | Grabon et al. |
| 2014/0338389 A1 | 11/2014 | Ma et al. |
| 2016/0084536 A1 | 3/2016 | Diamond et al. |

OTHER PUBLICATIONS

International Preliminary Report on Patentability for International Application PCT/US2015/051108, Report issued Mar. 21, 2017, dated Mar. 30, 2017, 7 Pgs.

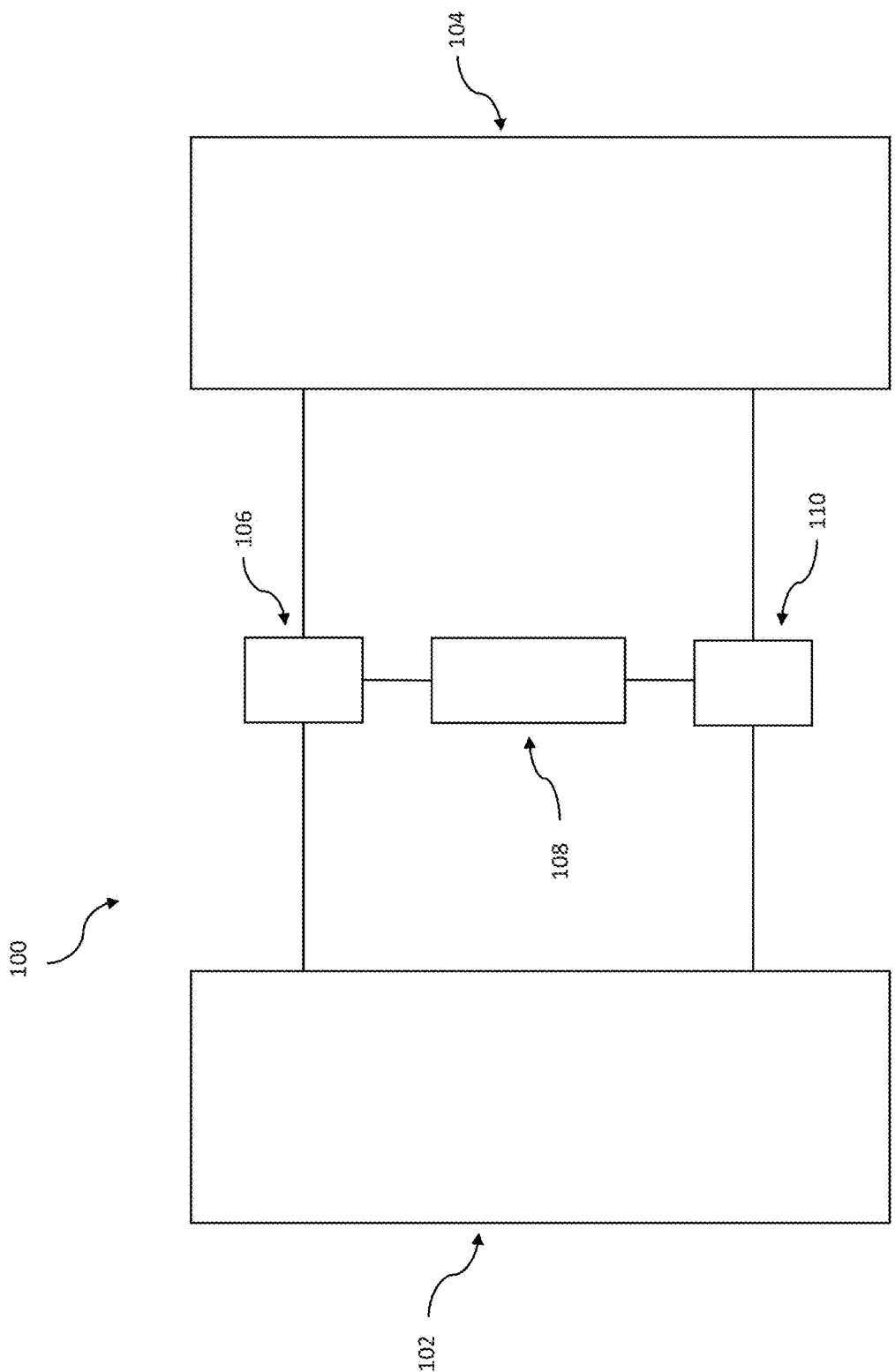

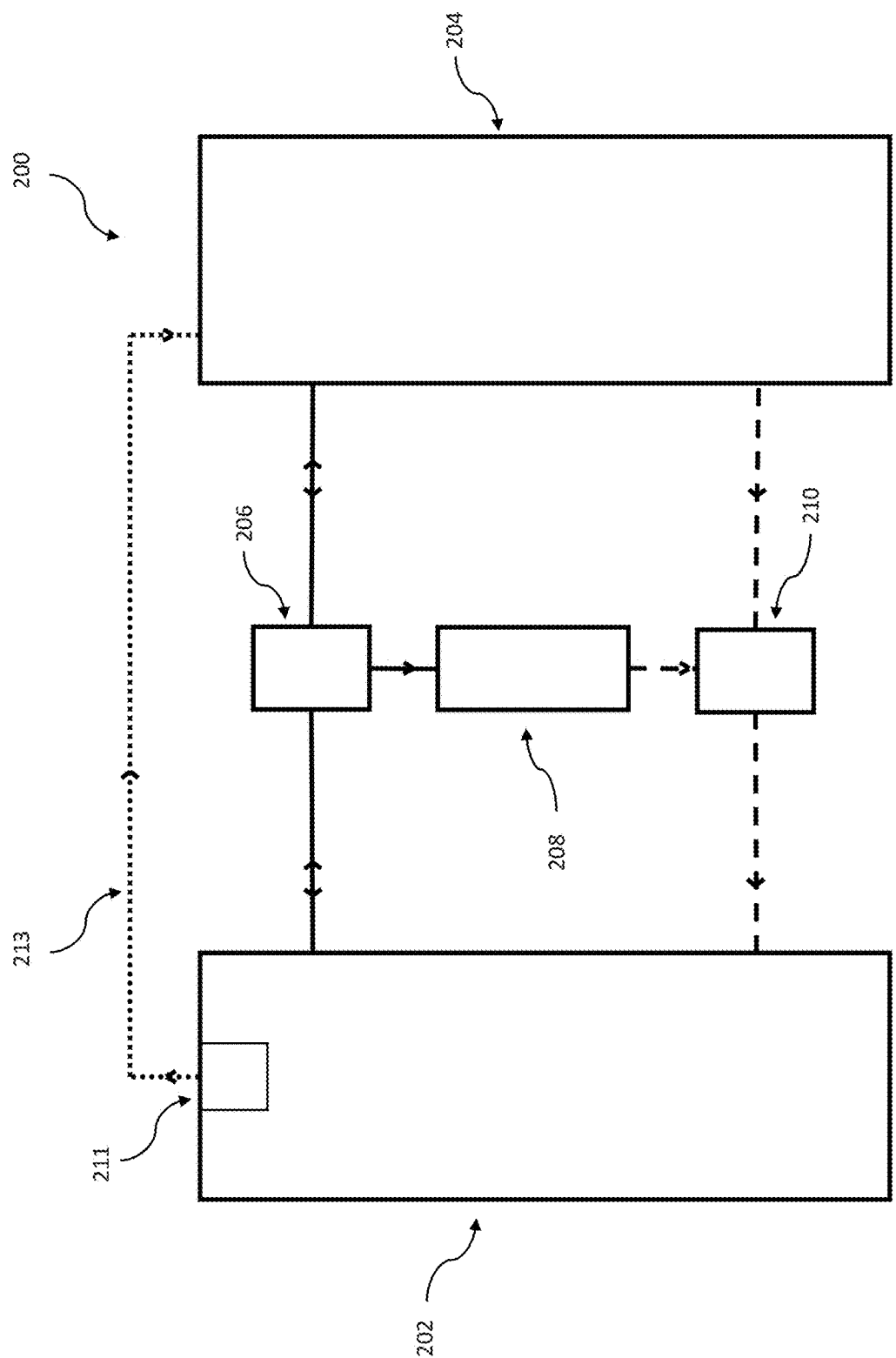

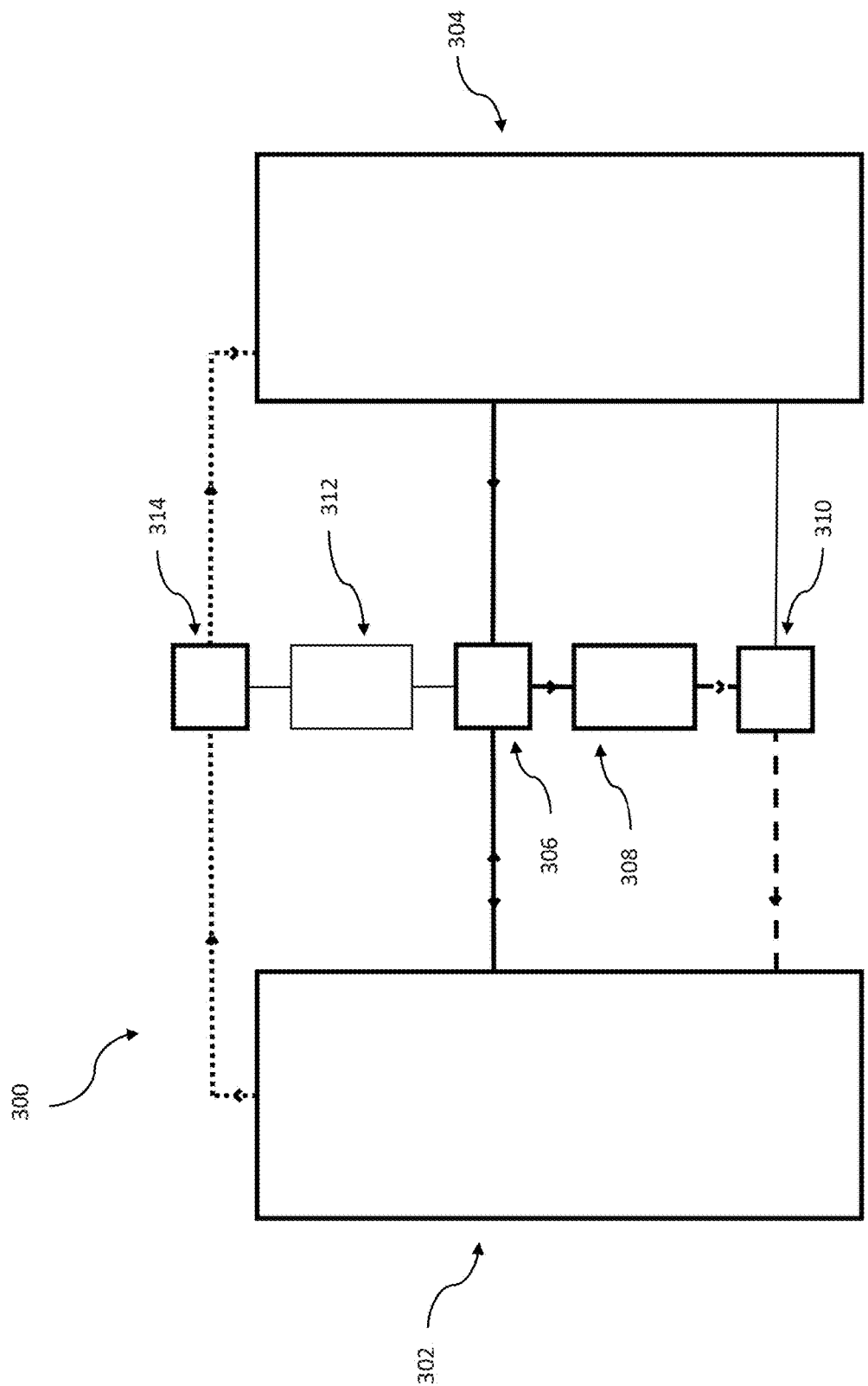

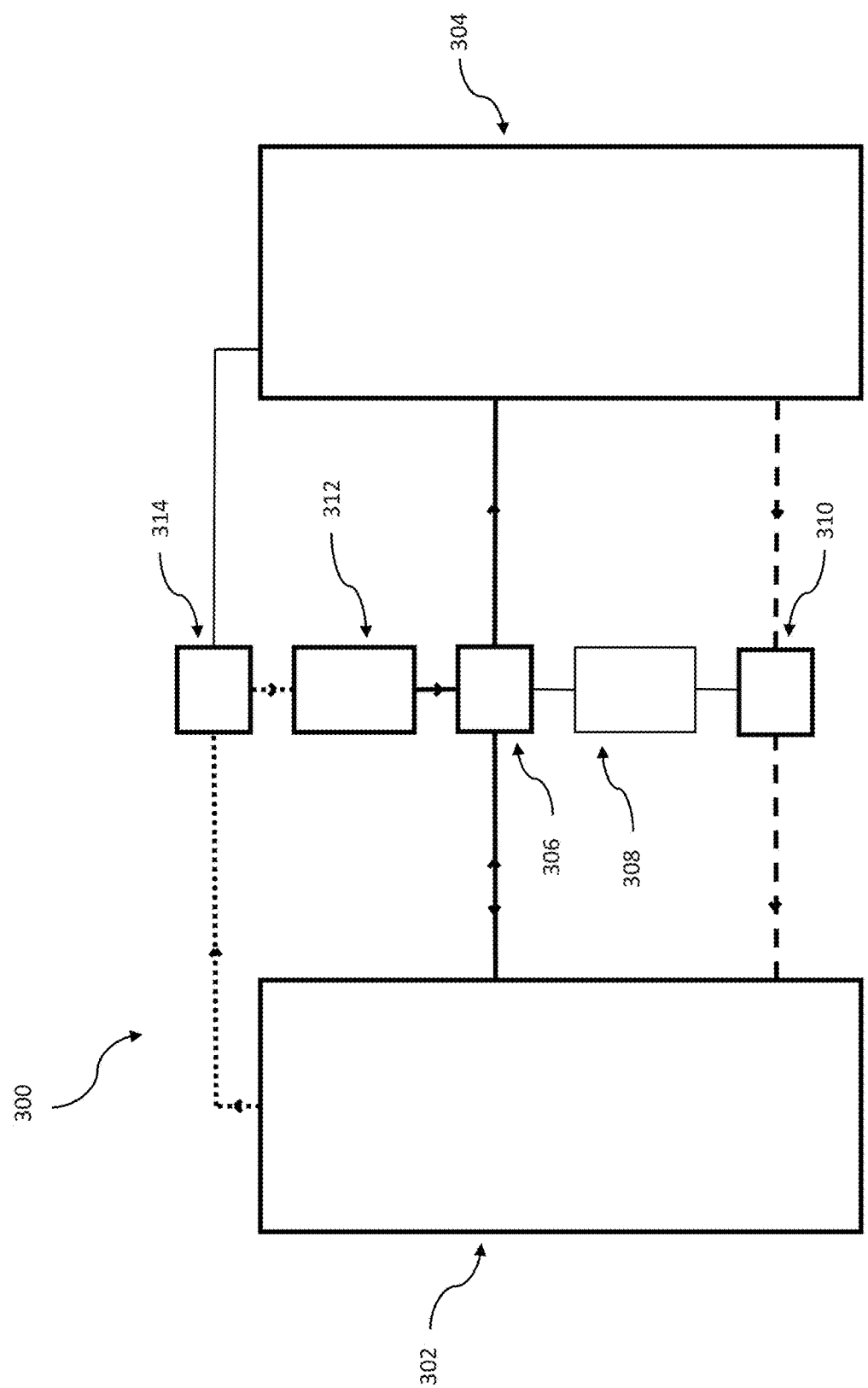

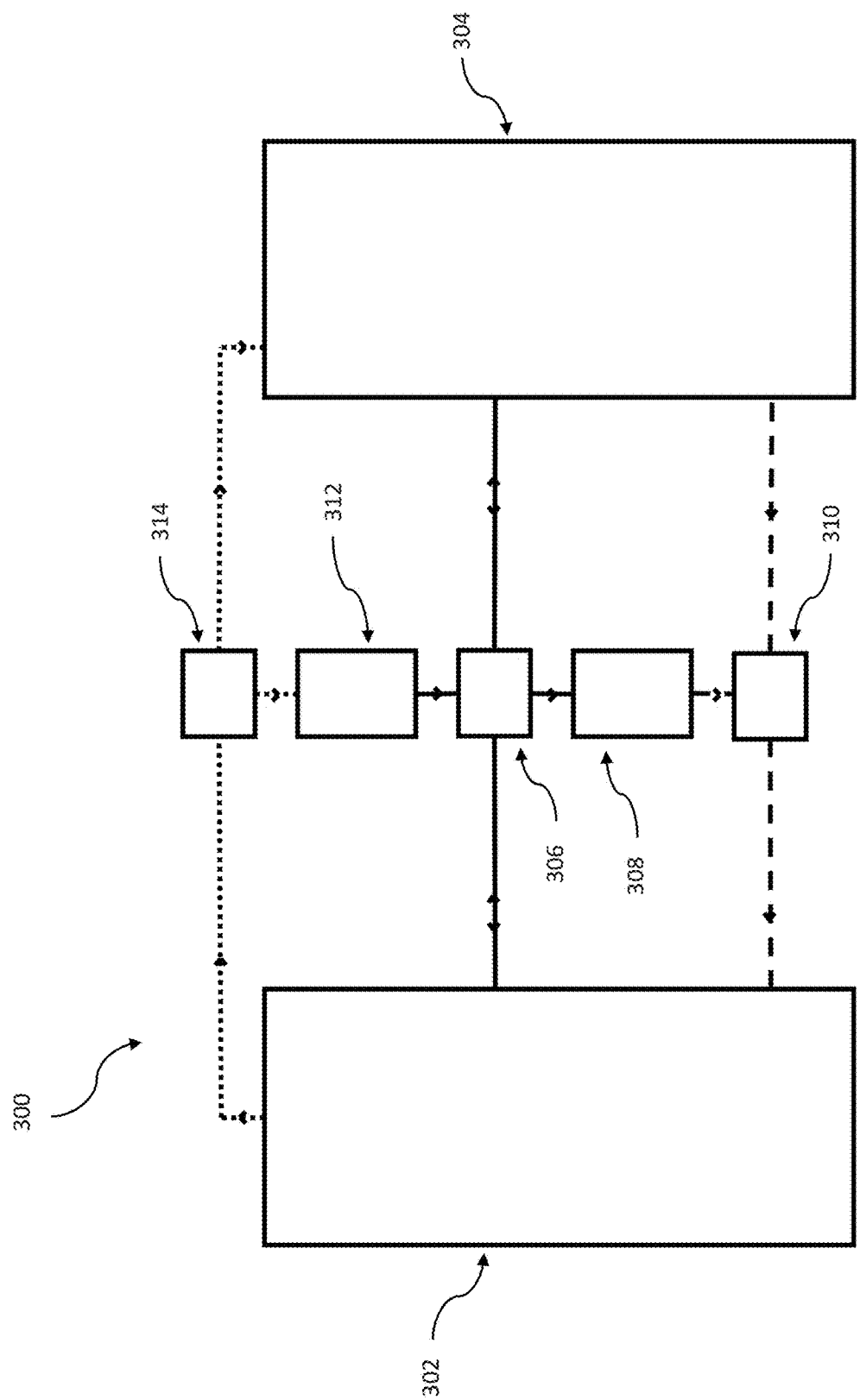

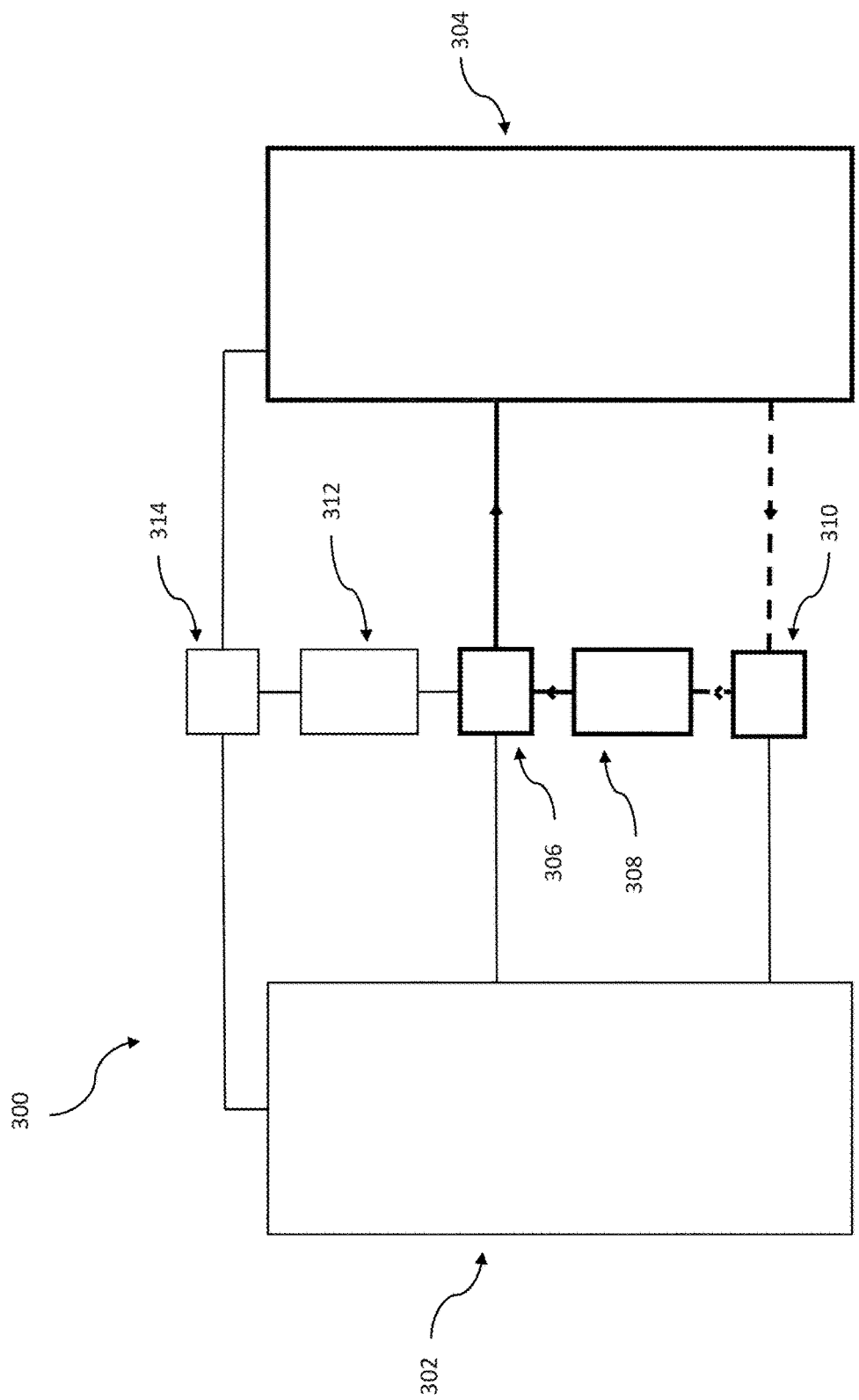

SYSTEMS AND METHODS IMPLEMENTING ROBUST AIR CONDITIONING SYSTEMS CONFIGURED TO UTILIZE THERMAL ENERGY STORAGE TO MAINTAIN A LOW TEMPERATURE FOR A TARGET SPACE

CROSS-REFERENCE TO RELATED APPLICATIONS

This application claims priority to: U.S. provisional patent application Ser. No. 62/052,999 entitled "Method for Shifting the Electricity Load of a Centralized Refrigeration System Using a Thermal Energy Storage Apparatus to Condense and Prepare Refrigerant for Direct Use by Said or Auxiliary Refrigeration Systems," filed on Sep. 19, 2014; U.S. provisional patent application Ser. No. 62/081,517 entitled "Method for Shifting the Electricity Load of a Centralized Refrigeration System Using a Thermal Energy Storage Apparatus to Condense and Prepare Refrigerant for Direct Use by Said or Auxiliary Refrigeration Systems," filed on Nov. 18, 2014; and, U.S. provisional patent application Ser. No. 62/165,026 entitled "Method for Shifting the Electricity Load of a Centralized Direct Expansion Cooling System Using a Thermal Energy Storage Apparatus to Condense and Prepare Refrigerant for Direct Use by Said or Auxiliary Direct Expansion Cooling Systems," filed on May 21, 2015, all of which are incorporated by reference herein in their entirety.

FIELD OF THE INVENTION

The present invention generally relates to air conditioning systems that implement thermal energy storage devices.

BACKGROUND

Air conditioning is a convenience that is ubiquitous in modern society. Within the context of the instant application, 'air conditioning' can be understood to refer to the controlling of the properties of air—especially temperature—within a defined space, and is inclusive of both the heating and cooling of air (although note that 'air conditioning' is sometimes colloquially interpreted not to refer to heating—i.e. heating is sometimes colloquially understood to be separate from air conditioning). Air conditioning can be implemented using any of a variety of devices, and is typically used, for instance, to help create comfortable indoor environments. Importantly, one critical application for air conditioning is refrigeration, which is generally used to preserve/elongate the shelf life of foods. Typical air conditioning systems—including refrigerators—employ a 'vapor-compression' cycle to cool a targeted space. In a 'vapor-compression' cycle, a working fluid (e.g. a refrigerant) is circulated proximate the targeted space that is to be cooled, and is made to undergo iterative phase changes to continually remove heat from the targeted space and eject it outside of the targeted space.

Vapor-compression cycles are typically implemented via a compressor, an expansion valve, an evaporator, and a condenser, all operatively connected via piping that facilitates the circulation of a working fluid. Typically, the working fluid—in its liquid phase—is made to pass through the expansion valve and thereby experiences a pressure drop, and a corresponding temperature drop. The working fluid—typically then in a saturated fluid phase—subsequently passes through the evaporator, which is the target of the cooling efforts. This saturated fluid absorbs heat from the evaporator, and consequently is made to substantially evaporate into a vapor phase. The substantially vapor phase working fluid then passes through a compressor where it is compressed to a higher pressure, and relatedly a higher temperature. Thereafter, the high pressure, high temperature vapor phase working fluid passes through a condenser, where it releases heat outside of the evaporator and thereby condenses into a liquid phase working fluid, which can be re-circulated. Accordingly, it is enumerated how vapor-compression cycles are generally implemented to remove heat from a targeted space.

SUMMARY OF THE INVENTION

Systems and methods in accordance with embodiments of the invention implement air conditioning systems that are operable to establish/maintain a desired temperature for a target space and simultaneously establish/maintain a temperature lower than the desired temperature for the target space for an included cold thermal energy storage unit, such that the cold thermal energy storage unit can subsequently be used to establish/maintain a desired temperature for the target space without having to principally rely on the operation of a powered condensing unit. In one embodiment, an air conditioning system includes: a condensing unit; a liquid pressurizer and distributor ensemble; a cold thermal energy storage unit; a target space; and a suction gas pressurizer and distributor ensemble; where: the condensing unit, the liquid pressurizer and distributor ensemble, the cold thermal energy storage unit, the target space, and the suction gas pressurizer and distributor ensemble are operatively connected by piping such that vapor compression cycles can be simultaneously implemented that result in the cooling of the cold thermal energy storage unit and the target space; and the air conditioning system is configured such that when the vapor compression cycles are simultaneously implemented that result in the cooling of the cold thermal energy storage unit and the target space, the cold thermal energy storage unit cools to a greater extent than the target space.

In another embodiment, the cold thermal energy storage unit includes a first expansion device; the target space includes a second expansion device; and the first expansion device is operable to reduce the temperature of received working fluid to a greater extent than the second expansion device.

In yet another embodiment, the suction gas pressurizer and distributor ensemble includes: at least one of: a pressure regulator and a compressor; and a flow control apparatus operable to controllably direct vapor phase working fluid to adjoined structures.

In still another embodiment, the cold thermal energy storage unit includes a phase change material encased in thermal insulation.

In still yet another embodiment, the condensing unit includes a compressor and condenser in series, and where the condensing unit is operable to direct received vapor phase working fluid through a compressor to compress the vapor phase working fluid, and then direct the compressed vapor phase working fluid through a condenser to condense the vapor phase working fluid, such that the condensing unit can output the corresponding liquid phase working fluid.

In a further embodiment, the liquid pressurizer and distributor ensemble includes a pump that is operable to alter the pressure of received liquid phase working fluid, and a flow control apparatus operable to controllably direct received liquid phase working fluid to adjoined structures.

In a still further embodiment, the condensing unit is operable to output heated vapor phase working fluid.

In a yet further embodiment, the condensing unit includes an integrated heating source and is thereby operable to output heated vapor phase working fluid.

In a still yet further embodiment, the integrated heating source is a gas powered heater.

In another embodiment, an air conditioning system further includes piping configured to direct heated vapor phase working fluid that is output by the condensing unit to the target space.

In yet another embodiment, the condensing unit is configured to output heated vapor phase working fluid such that when the heated vapor phase working fluid is directed by the piping to the target space, it condenses into a liquid phase working fluid.

In still another embodiment, an air conditioning system further includes: a discharge gas distributor; and a hot thermal energy storage unit; where the discharge gas distributor, the hot thermal energy storage unit, the liquid pressurizer and distributor ensemble, and the target space are operatively connected by piping such that heated vapor phase working fluid output by the condensing unit can be circulated, using the discharge gas distributor, to the target space and/or the hot thermal energy storage unit.

In a further embodiment, the condensing unit is configured to output heated vapor phase working fluid such that when the heated vapor phase working fluid is directed by piping to the target space and/or the hot thermal energy storage unit, it condenses into a liquid phase working fluid.

In a yet further embodiment, the hot thermal energy storage unit includes a thermal storage medium encased in thermal insulation.

In a still further embodiment, an air conditioning system further includes: a second condensing unit; a second liquid pressurizer and distributor ensemble; a second target space; a second discharge gas distributor; and a condenser; where: the condensing unit and the second condensing unit are operatively connected by piping to the condenser; the second condensing unit, the second liquid pressurizer and distributor ensemble, the second target space, and the cold thermal energy storage unit are operatively connected by piping such that vapor compression cycles can be simultaneously implemented that result in the cooling of the cold thermal energy storage unit and the target space; and the second condensing unit, the second discharge gas distributor, the second target space, and the hot thermal energy storage unit are operatively connected by piping such that a working fluid can be heated and circulated through the target space to heat it.

In a still yet further embodiment, an air conditioning system further includes: a hot thermal energy storage unit that is operable to act as a heat source; where: the hot thermal energy storage unit and the target space are operatively connected by piping; and the hot thermal energy storage unit is configured to receive liquid phase working fluid, and heat it so that it outputs vapor phase working fluid that thereafter be directed to the target space to heat it.

In another embodiment, the air conditioning system is configured such that the vapor phase working fluid that is output by the hot thermal energy storage unit and thereafter directed to the target space, transmits heat to the target space and thereby condenses.

In yet another embodiment, the condensing unit is configured to be operable only on received vapor phase working fluid that is within a distinct pressure range, and the suction gas pressurizer and distributor ensemble is configured to output vapor phase working fluid that is within the distinct pressure range.

In still another embodiment, the cold thermal energy storage unit includes a phase change material within a circuit that interfaces with the piping via a heat exchanger.

In a further embodiment, an air conditioning system further includes: a second condensing unit; a second liquid pressurizer and distributor ensemble; a second target space; and a condenser; where: the condensing unit and the second condensing unit are operatively connected by piping to the condenser; and the second condensing unit, the second liquid pressurizer and distributor ensemble, the second target space, and the cold thermal energy storage unit are operatively connected by piping such that vapor compression cycles can be simultaneously implemented that result in the cooling of the cold thermal energy storage unit and the target space.

BRIEF DESCRIPTION OF THE DRAWINGS

FIGS. 1A-1E illustrate a robust air conditioning system in accordance with certain embodiments of the invention.

FIGS. 2A-2I illustrate a robust air conditioning system operable to provide heating to a targeted space in accordance with certain embodiments of the invention.

FIGS. 3A-3K illustrate a robust air conditioning system including a distinct hot thermal storage unit to further facilitate the heating of a targeted space in accordance with certain embodiments of the invention.

DETAILED DESCRIPTION

Figure 1B:
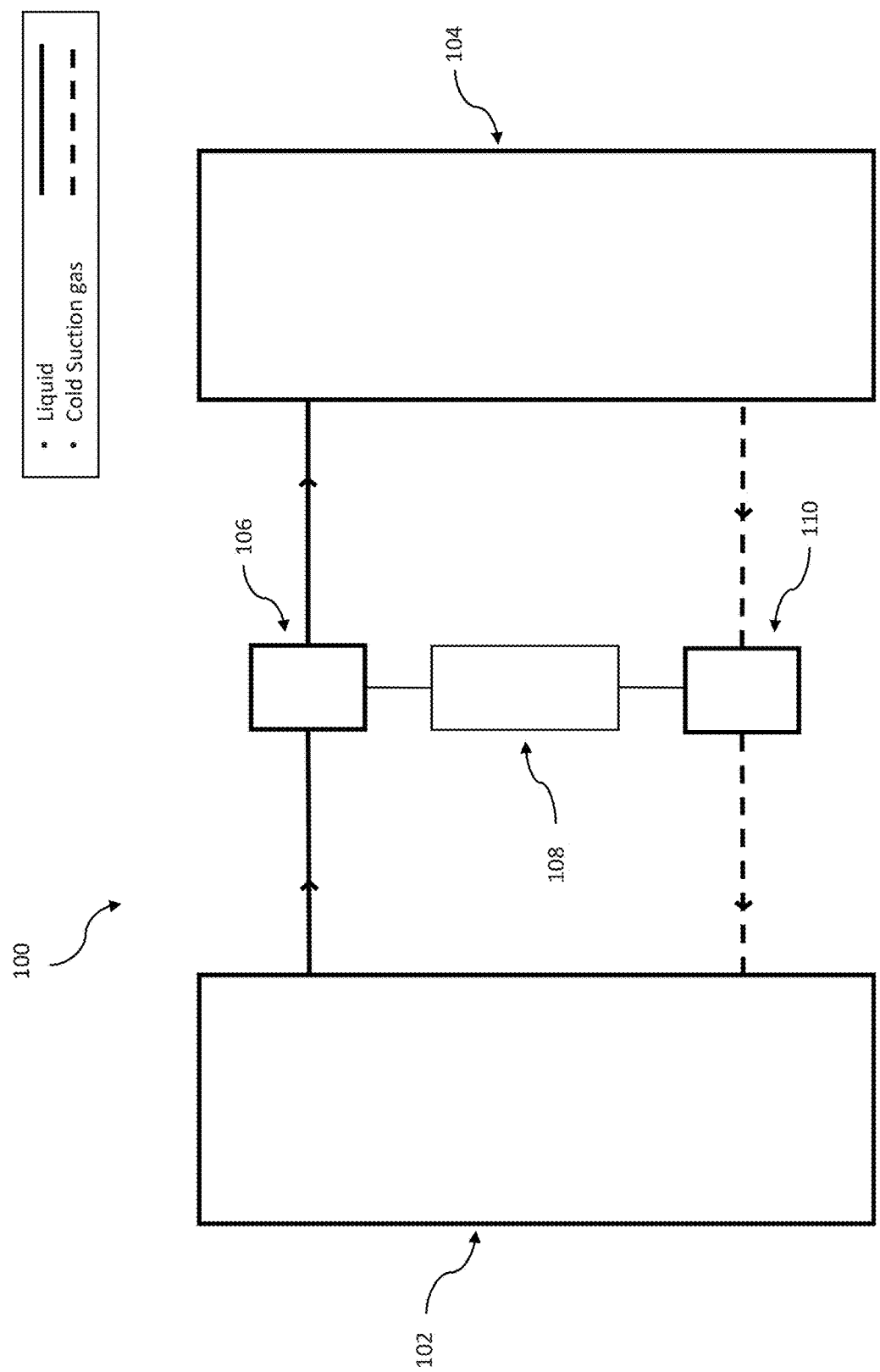

Turning now to the drawings, systems and methods for implementing robust air conditioning systems that are operable such that an included cold thermal energy storage unit can be cooled to a temperature lower than the temperature desired for a target space while the target space is simultaneously cooled to the desired temperature, such that the temperature desired for the target space can subsequently be established and/or maintained by the cold thermal energy storage unit irrespective of whether the cold thermal energy storage unit is being principally relied on to cool the target space or whether an included powered condensing unit is being relied on to cool the target space. In a number of embodiments, an air conditioning system is configured to cool the included cold thermal energy storage unit to a temperature lower than that desired for the target space such that—when the cold thermal energy storage unit is principally relied on to establish/maintain the desired temperature for the target space—the associated working fluid can be iteratively circulated through the target space and the cold thermal energy storage unit such that: (1) as the working fluid passes through the target space it substantially evaporates and absorbs heat within the target space so that the desired temperature for the target space can be established/maintained, and (2) when the substantially evaporated working fluid passes through the cold thermal energy storage unit, the low temperature of the cold thermal energy storage unit is sufficient to cause the condensation of the substantially vapor phase working fluid, e.g. so that it can be reintroduced to the target space and continue to remove heat. In this way, the target space can be held at a precise desired temperature irrespective of whether the air conditioning system is principally relying on the cold thermal energy storage unit to provide cooling or whether the air conditioning system is relying on a powered condensing unit (e.g. continually powered by a connection to a power grid) to provide cooling.

As can be appreciated, the continual removal of heat from a targeted space (e.g. as happens in refrigeration) can be a substantially energy intensive operation. Moreover, given the reliance by modern society on the creation of comfortable living environments and refrigeration (especially refrigerated warehouses and grocery stores), it can further be appreciated how such systems can impose a substantial burden on power generation facilities. To mitigate these potential burdens on power infrastructure, many electricity providers impose a time-of-use (TOU) pricing schedule—e.g. charging more for providing electricity during the day where the demand for electricity/cooling is typically greater—so as to address load balancing/intermittency problems on the grid. Consequently, to take advantage of the tiered pricing, many electricity consumers (e.g. grocers and warehouse operators) have focused on developing/implementing energy storage technologies enabling them to purchase energy at a lower rate (e.g. during middle of the night), and store it for use during the day (when the cost of electricity is higher). As can be appreciated, this energy storage 'behind-the-meter' can provide a substantial economic benefit for such TOU customers. Note that this economic benefit is accentuated when the consumer has a very small load factor defined as the average load divided by maximum load in a given time period.

Thermal energy storage (TES) refers to accruing thermal energy, and storing it for later use, and is often implemented in the context of air conditioning systems. For example, in some instances, flake and slushy ice is regularly generated to maintain the temperature of products during transport or display; such methods surround the products such as poultry and fish directly with a phase change material (PCM) such as ice or brine. In U.S. Pat. No. 4,280,335, a method for utilizing an ice bank PCM to provide cooling load for cooled display cases and the 'heating ventilating, and air conditioning' ("HVAC") system of a supermarket is enumerated. In this method, coolant in the form of liquid water is produced from the ice bank and is pumped to display cases and the HVAC system to offset energy consumption. The disclosure of U.S. Pat. No. 4,280,335 is incorporated by reference herein. Other notable prior art includes U.S. Pat. No. 5,383,339, which presents an apparatus that couples to an existing refrigeration system to cool a PCM. This PCM TES is then utilized to offset electricity demand by subcooling the liquid refrigerant of a second auxiliary refrigeration circuit in order to increase its cooling capacity and improve the refrigeration system's efficiency during discharge mode. The disclosure of U.S. Pat. No. 5,383,339 is incorporated by reference herein.

Although previous methods for storing thermal energy within the context of air conditioning systems have been effective to some extent, the current state of the art can benefit from more robust and effective methods for storing and using stored thermal energy. For example, many prior art air conditioning systems that rely on the implementation of a vapor-compression cycle and incorporate thermal energy storage mechanisms are not configured such that the associated thermal energy storage unit can be principally relied on to provide cooling to the same extent as when the air conditioning system utilizes a powered condenser/compressor (e.g. powered by the grid). Rather, many such systems utilize an included thermal energy storage unit as a supplemental mechanism to facilitate cooling; e.g. in many such systems, separate compressor and condenser units are still relied on to effectuate the vapor-compression cycle. Alternatively, in a number of such systems, the included thermal energy storage unit can be principally relied on to provide for cooling, but not to the same extent as when the air conditioning system utilizes condenser/compressor units. Although not as robust, such systems may find use where precise cooling temperatures are not required—e.g. the cooling of a living quarters. By contrast, such systems may not be sufficient in situations such as refrigeration, where precise cooling temperatures are desired.

Against this backdrop, many embodiments of the invention implement robust air conditioning systems whereby a cold thermal energy storage unit is included within a cooling circuit, where the air conditioning system is configured such that a desired temperature for a target space can be maintained irrespective of whether the cold thermal energy storage unit is being principally relied on to cool the target space or whether the air conditioning system is relying on a separately powered condensing unit (e.g. including a compressor unit and a condenser unit) to help cool the target space. For example, in a number of embodiments, an air conditioning system incorporates a cold thermal energy storage device that is configured to be cooled to a temperature lower than that desired for a targeted space. For instance, the air conditioning system can utilize an incorporated powered condensing unit to cool the cold thermal energy storage unit to a temperature lower than that desired for a targeted space; note that the air conditioning system can be configured such that it can simultaneously utilize the powered condensing unit to establish/maintain the desired temperature for the targeted space. The air conditioning system can further be configured such that the thermal energy stored in the cold thermal energy storage unit (which was cooled to a temperature lower than that desired for the target space) can thereafter be principally relied on (e.g. substantially without the assistance of a powered condensing unit) to establish/maintain the desired temperature for the targeted space for at least some period of time. In many embodiments, the air conditioning system is configured such that the cold thermal energy storage unit can be cooled to a temperature lower than that desired for the target space such that—when the cold thermal energy storage unit is principally relied on to cool the target space—the associated working fluid is iteratively circulated through the target space and the cold thermal energy storage unit such that: (1) as the working fluid passes through the target space it evaporates and absorbs heat within the target space so that the desired temperature for the target space can be established/maintained, and (2) when the working fluid passes through the cold thermal energy storage unit, the low temperature of the cold thermal energy storage unit is sufficient to cause the condensation of the vapor phase working fluid, e.g. so that it can be reintroduced to the target space to continue to absorb heat. In a number of embodiments, these configurations can allow for any included compressors or condensers to be deactivated when the thermal energy storage unit is being principally relied on to provide cooling; in other words, the target space can be cooled to the desired temperature even in the absence of the operation of condensers and compressors. As can be appreciated, the operation of the compressors and condensers is the principal source of energy consumption for many air conditioning systems.

In general, such robust air conditioning systems can provide for substantial energy efficiency and financial savings. Moreover, such systems can further be utilized for their inherent ability to provide effective backup refrigeration services, e.g. in the case of a power disruption. Configurations for robust air conditioning systems, along with their respective operation, in accordance with many embodiments of the invention are now discussed below.

Configurations for and the Operation of Robust Air Conditioning Systems Incorporating Cold Thermal Energy Storage Devices In many embodiments, robust air conditioning systems incorporate a cold thermal energy storage unit within a cooling circuit such that a desired temperature for a target space can be established/maintained irrespective of whether an included condensing unit is being relied on to provide the cooling service or whether an included cold thermal energy storage unit is being relied on—e.g. without the assistance of the powered condensing unit—to provide the cooling service. In numerous embodiments, robust air conditioning systems are configured to be operable to establish and/or maintain a temperature for the included cold thermal energy storage unit that is lower than the temperature desired for the target space, while simultaneously cooling the target space to the desired temperature. In this way, the thermal energy storage unit can thereafter be principally relied on—e.g. without the assistance of a powered condensing unit—to cool the target space to the same extent that the included, powered, condensing unit can. Note that, as can be appreciated, the air conditioning system may still require power for operation of ancillary components.

In many embodiments air conditioning systems are configured to implement vapor-compression cycles to cool a target space to a desired temperature as well as to cool a cold thermal energy storage unit to a temperature lower than the temperature desired for the target space. For example, FIGS. 1A-1E illustrate the configuration and operation of a robust air conditioning system that is operable to cool an included cold thermal energy storage unit using a vapor compression cycle to a greater extent than a target space, while simultaneously cooling the target space, in accordance with an embodiment of the invention. Note that throughout all of the figures depicted in the instant application, valves may not be explicitly depicted. However, as can be appreciated, valves can be implemented any of the depicted figures to facilitate the desired flow. In any case, FIG. 1A illustrates the configuration of the robust air conditioning system; more specifically, FIG. 1A illustrates that a robust air conditioning system 100 includes a condensing unit 102, a target space 104, a liquid pressurizer and distributor ensemble 106, a cold thermal energy storage unit 108, and a suction gas pressurizer and distributor ensemble 110, all of which are operatively interconnected by piping such that a vapor-compression cycle can be implemented to cool the target space 104 using either the condensing unit 102 or the cold thermal energy storage unit 108, and further configured such that a working fluid can be circulated through the cold energy storage unit 108 and the target space 104 to transport heat as desired. Importantly, within the context of this application, the suction gas pressurizer and distributor ensemble is sometimes referred to as the 'suction gas/equalizer ensemble' or 'suction gas/equalizer,' or 'suction gas equalizer/distributor ensemble', or 'suction gas equalizer/distributor,' or the like. Additionally, within the context of the application, as can be appreciated, references to e.g. low temperature/pressure and high temperature pressure are relative, and can be understood to be interpreted within the context of a vapor compression cycle.

The condensing unit 102 is generally operable to pressurize and/or condense received low pressure, low temperature vapor phase working fluid (e.g. exiting from the target space 104 and/or the thermal energy storage unit 108) such that it changes phase to a high temperature, high pressure liquid, e.g. within the context of a vapor-compression cycle. Although the condensing unit 102 is depicted schematically, it should be appreciated that it can be implemented using any of variety of schemes. For example, in many embodiments, the condensing unit comprises a compressor—to compress received vapor phase working fluid—and a condenser to condense the high pressure vapor phase working fluid to a liquid phase working fluid. Of course, to be clear, a condensing unit can be effectuated in any of a variety of ways in accordance with embodiments of the invention. Examples of some of the condensing units that can be implemented in the depicted figures are discussed in subsequent sections below.

The liquid pressurizer and distributor ensemble 106 generally operates to pressurize and/or circulate working fluid as desired to facilitate the operation of the air conditioning system 100 in accordance with any of its various operating modes. For example, the liquid pressurizer and distributor ensemble 106 can circulate working fluid through the cold thermal energy storage unit 108, through the target space, or simultaneously through each of the cold thermal energy storage unit 108 and the target space 104. In general, the liquid pressurizer and distributor ensemble 106 functions to accept liquid phase flow from any connected components, alter the flow pressure as necessary (if appropriate), and/or distribute the received flow to an appropriate connected component in accordance with any of the air conditioning system's operating modes. Additionally, note that the liquid pressurizer and distributor ensemble 106 can be implemented using any of a variety of components. For example, any suitable pump can be used to pressurize received liquid phase working fluid, and any suitable control apparatus can be implemented to redirect the working fluid as desired. To be clear, embodiments of the invention are not limited to the implementation of particular configurations for liquid pressurizer and distributor ensembles. Examples of some of the liquid pressurizer and distributor ensembles that can be incorporated are discussed in subsequent sections below. Importantly, within the context of the instant application, the term 'liquid pressurizer and distributor ensemble' can reference even those devices that are only operable to controllably distribute liquid phase working fluid. Additionally, within the context of this application, the liquid pressurizer and distributor ensemble is sometimes referred to as the 'liquid pressurizer/distributor ensemble' or 'liquid pressurizer/distributor,' or the like.

The target space 104 includes the target of the cooling efforts. As can be appreciated, in many embodiments, the target space further includes an expansion device operable to reduce the pressure and temperature of a received working fluid (e.g. such that a vapor-compression cycle can be implemented). Although the target space 104 is depicted schematically, it should be appreciated that any suitable target space can be implemented in accordance with many embodiments of the invention. For example, in many embodiments, the target space is a living quarters. In a number of embodiments, the target space 104 is an evaporator (e.g. in the context of refrigeration). Additionally, while FIG. 1A schematically depicts a single contiguous volume that is a target space, in many embodiments, the target space includes a plurality of discrete volumes; corresponding piping can be implemented such that working fluid can circulate through each of the plurality of volumes within the target space. In any case, it should be clear that any suitable space can be the target of cooling efforts in accordance with embodiments of the invention.

The suction gas pressurizer and distributor ensemble 110 generally operates to prepare and/or distribute received vapor phase working fluid for further treatment, e.g. for sending to the condensing unit 102 or sending to the cold thermal energy storage unit 108. In a number of embodiments, the suction gas/equalizer ensemble 110 is configured to pressurize (or depressurize) received vapor phase working fluid so that it is suitable to be received by further respective treatment modules. For example, in some embodiments, the condensing unit 102 requires receipt of vapor phase working fluid within a specified pressure range. Similarly, in a number of embodiments, the cold thermal energy storage unit 108 requires receipt of vapor phase working fluid within a specified pressure range. Moreover, as with the liquid pressurizer and distributor ensemble 106, the suction gas/equalizer ensemble 110 can be implemented using any of a variety of components. For example, any of a number of pressure regulating mechanisms (e.g. compressors and pressure regulators) can be incorporated with any of a variety of fluid control mechanisms to implement the suction gas/equalizer ensemble 110. Examples of some of the suction gas/equalizer ensembles are discussed in subsequent sections below.

The cold thermal energy storage unit 108 generally operates to store thermal energy for subsequent utilization. For instance, as can be appreciated, the cold thermal energy storage unit can be cooled to a low temperature, and can operate to retain the cold temperature for extended periods of time (e.g. substantially without assistance). For example, thermal energy can be stored within the cold thermal energy storage unit 108 at a time when electricity rates are low, and then used to cool the target space 104 at a time when electricity rates are high, thereby mitigating the use of the condensing unit 102. Any suitable cold thermal energy storage unit 108 can be implemented in accordance with many embodiments of the invention. For example, in many embodiments, a phase change material encased in thermal insulation is implemented to effectuate the cold thermal energy storage unit 108. Additionally, as alluded to above, in many embodiments, the air conditioning system 100 is configured to be operable to establish a temperature for the cold thermal energy storage unit 108 that is lower than that desired for the target space 104. This can be achieved in any of a variety of ways. For example, the cold thermal energy storage unit 108 includes an expansion valve configured to reduce the pressure and temperature of received working fluid to a greater extent than any expansion valves incorporated within the target space 104. Examples of some cold thermal energy storage units that can be incorporated in accordance with embodiments of the invention are discussed below.

Importantly, as can be appreciated by one of ordinary skill in the art and as discussed above, although the configuration depicted in FIG. 1A does not specifically illustrate valves, valves can of course be implemented to control the circulation of working fluid through the air conditioning system. Indeed, any of a variety of supplementary components can be incorporated to facilitate the operation of the air conditioning system 100 in accordance with many embodiments of the invention. For example, as can be appreciated, in many embodiments, liquid gas separators are incorporated within the system to increase operational efficiency of the implemented vapor-compression cycles. To be clear though, any of a variety of supplementary components can be incorporated in accordance with many embodiments of the invention.

FIG. 1B illustrates how the air conditioning system 100 can operate to establish/maintain a desired temperature for the targeted space 104 principally using the condensing unit 102. In particular, the bolded lines (and arrows) depict the circulation of a working fluid so as to implement a vapor-compression cycle that can cool the target space 104 using the condensing unit 102. More specifically, in the illustrated embodiment, the condensing unit 102 acts to condense incoming vapor phase working fluid that is low pressure, low temperature to a (relatively) high temperature, high pressure liquid phase. As mentioned above, the condensing unit 102 can be implemented via any suitable mechanism(s) in accordance with many embodiments of the invention. The high temperature liquid phase working fluid is then sent to the liquid pressure and distributor ensemble 106 where it is pressurized, if necessary, and directed to the target space 104. At the target space 104, the working fluid is made to expand so that it experiences a pressure drop and a correlated temperature drop; in this way, the low pressure, low temperature saturated fluid can continue its circulation through the target space 104 and absorb heat from the target space 104. Consequently, the working fluid is made to evaporate. As mentioned above, the target space 104 can be any suitable space in accordance with certain embodiments of the invention, including but not limited to a living quarters or an evaporator. The low pressure, low temperature vapor phase working fluid is subsequently redirected to the suction gas/equalizer ensemble 110, where it is pressurized—if necessary—and redirected for re-entry into the condensing unit 102, e.g. so that the vapor-compression cycle can continue. Accordingly, it is seen how the robust air conditioning system 100 can implement a vapor-compression cycle using a condensing unit 102 as the engine for cooling the target space 104. Needless to say any suitable working fluid can be implemented. For example, any of a variety of refrigerants can be incorporated.

Figure 1C:
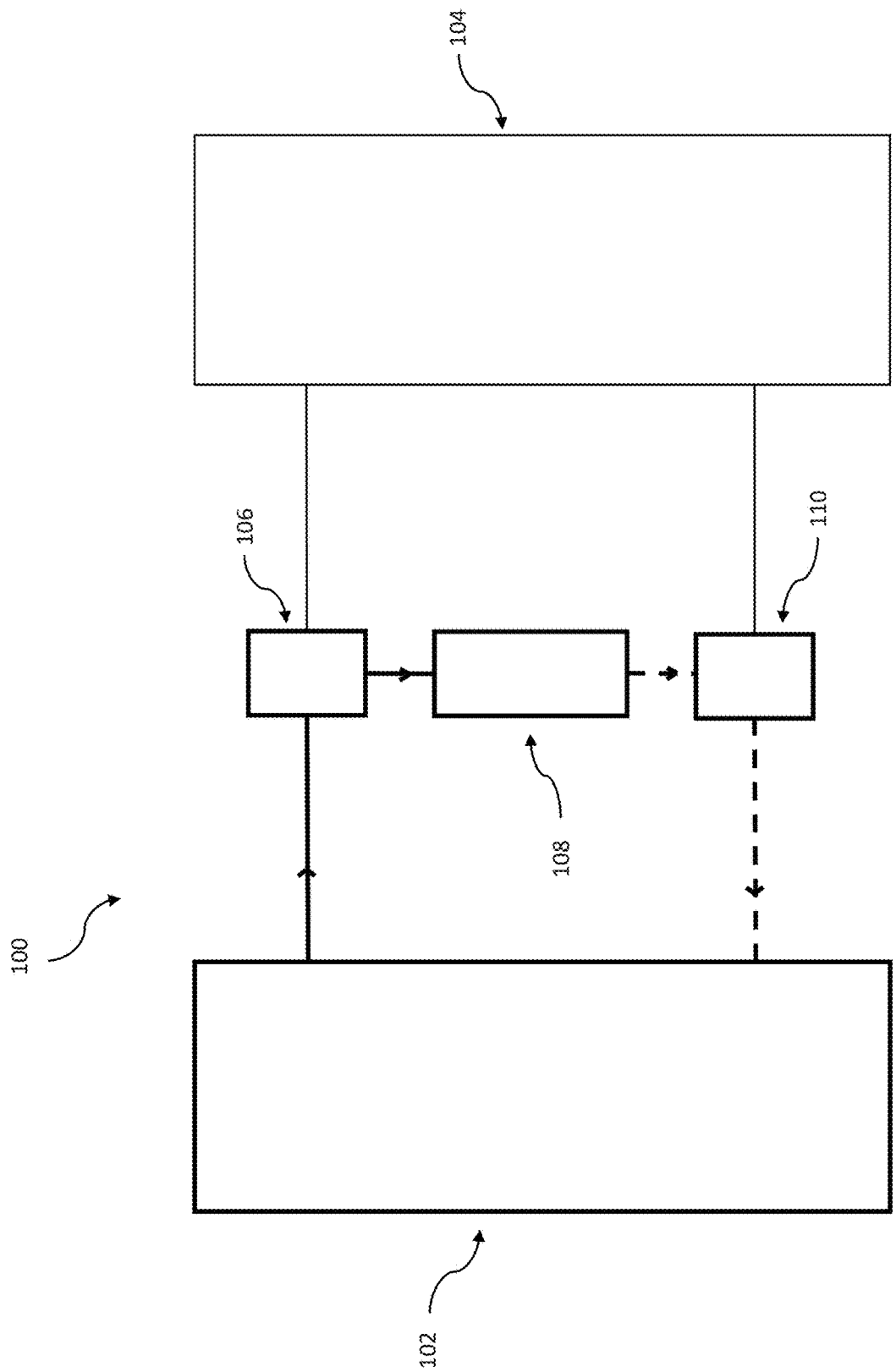

FIG. 1C illustrates how the robust air conditioning system 100 can operate to store thermal energy. In particular, it is illustrated how a vapor-compression cycle can be implemented using the condensing unit 102 to store thermal energy within the cold thermal energy storage unit 108. More specifically, it is depicted that the condensing unit 102 causes the condensation of a circulated working fluid, which is then redirected by the liquid pressurizer and distributor ensemble 106 to the cold thermal energy storage unit 108. Importantly, the air conditioning system 100 is configured such that the vapor-compression cycle cools the cold thermal energy storage unit 108 to a greater extent compared to the target space. In other words, the temperature of the cold thermal energy store can be set to a temperature lower than that desired for the target space 104. As alluded to above, this can be achieved in any of a variety of ways. For example in many embodiments, the cold thermal energy storage unit 108 includes an expansion valve that decreases the pressure and temperature of a received working fluid to a greater extent than any expansion valve incorporated within the target space 104. In this way, thermal energy can be stored sufficient to effectively establish/maintain the desired temperature for the target space 104.

Figure 1D:
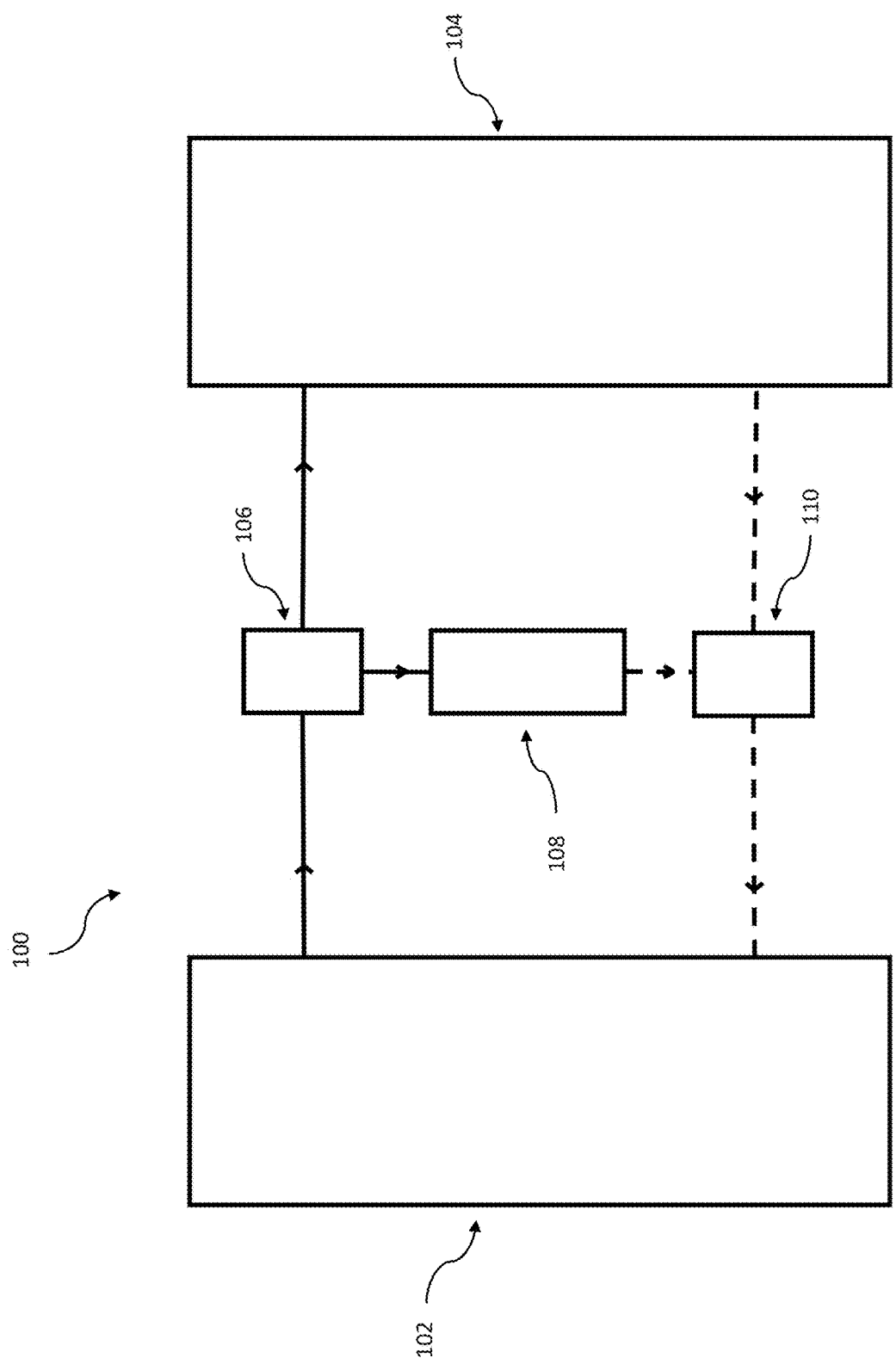

While FIG. 1C illustrates the storing of thermal energy by using the condensing unit 102 to implement a vapor-compression cycle, FIG. 1D illustrates how the robust air conditioning system 100 can operate to simultaneously cool the target space 104 and store thermal energy using the condensing unit. As can be appreciated, in the illustrated embodiment, vapor-compression cycles are implemented in a manner similar to those seen in and described with respect to FIGS. 1B and 1C. It is depicted how the liquid pressurizer and distributor ensemble 106 and the suction gas/equalizer 110 control the division and aggregation of the flow of the working fluid. For example, it is depicted that the liquid pressurizer and distributor ensemble splits the liquid phase working fluid, so that part of the flow is directed to the cold thermal energy storage unit 108 and part of the flow is directed to the target space 104. In this way, both the target space 104 and the cold thermal energy storage unit 104 can be cooled. The illustrated embodiment further depicts that the suction gas/equalizer 110 can operate to equalize vapor pressure working fluid received from both the target space 104 and the thermal energy storage unit 108, and additionally implement any further treating processes, prior to sending it to the condensing unit 102.

Figure 1E:
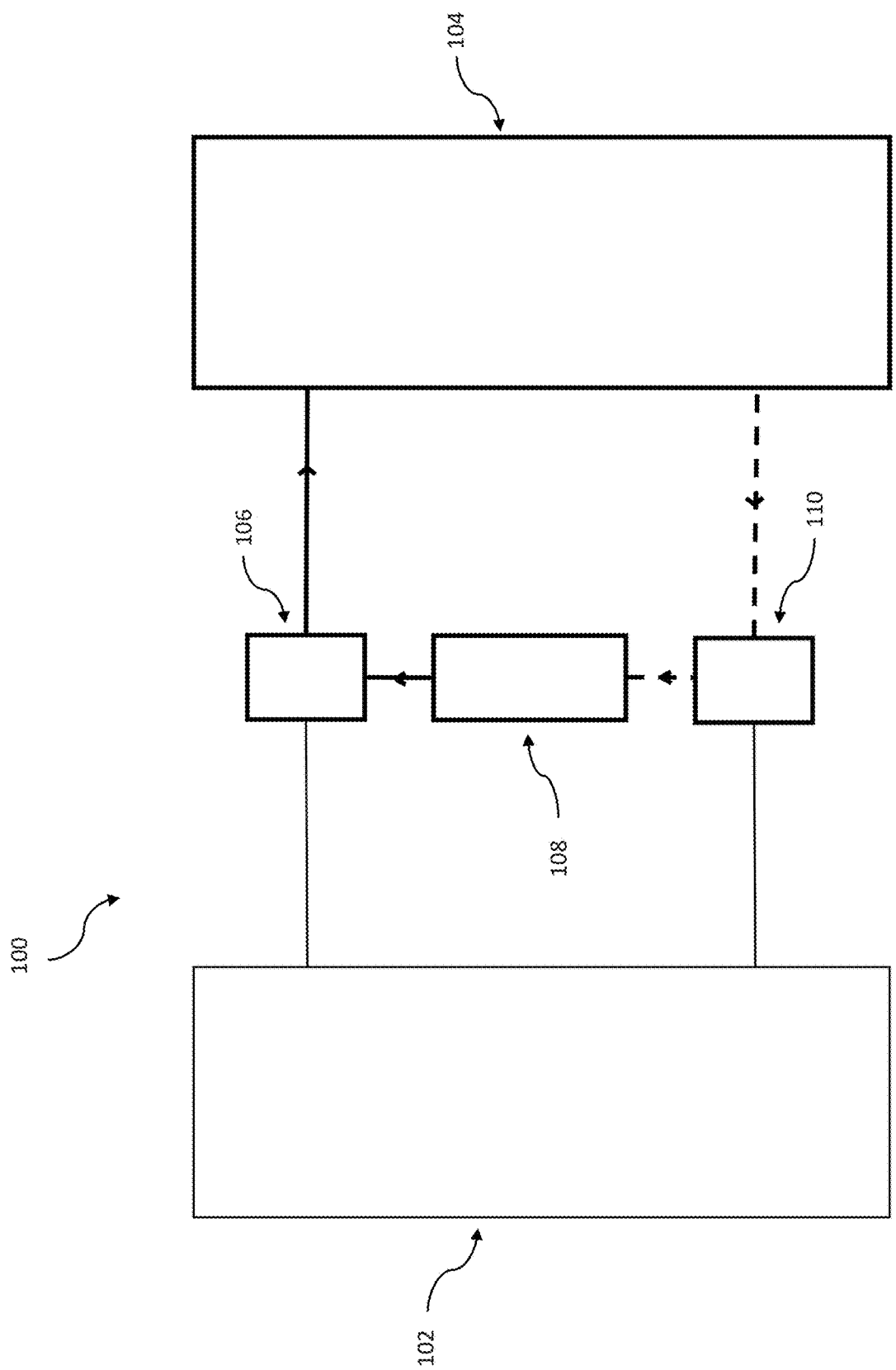

FIG. 1E illustrates how the robust air conditioning system 100 can operate to cool the target space 104 using stored thermal energy in the thermal energy storage unit 108. In general, fluid can be circulated through the cold thermal energy storage unit 108 and the target space 104. As the cold thermal energy storage unit 108 is set at a temperature lower than that desired for the target space 104, the circulation of the fluid will facilitate the transport of heat away from the target space 104 and toward the cold thermal energy storage 108, and importantly, the target space can be held at the same temperature as if it were powered by the condensing unit 102. More specifically, the illustrated embodiment depicts that fluid is circulated through the cold thermal energy storage unit 108, the liquid pressurizer and distributor ensemble 106, the target space 104, and the suction gas/equalizer 110. As can be appreciated and as illustrated, the piping can be implemented such that it allows for fluid flow in either direction. In a number of embodiments, the air conditioning system 100 is configured such that the fluid flow is made to condense by the cold thermal energy storage unit 108 and evaporate by the target space 104. This can be achieved by configuring the air conditioning system 100 such that it is operable to establish a temperature for the cold thermal energy storage unit 108 that is sufficiently lower than that desired for the target space 104. Importantly, it is depicted that the illustrated operating mode does not require the operation of the condensing unit 102, which typically draws much power.

Notably, because the depicted system 100 is operable to simultaneously establish/maintain specified temperatures for each of the cold thermal energy storage 108 unit and the target space 104, the air conditioning system 100 is capable of continuously establishing/maintaining a desired temperature for the target space. For example, where the air conditioning system 100 is used as a refrigerator, the air conditioning system 100 can operate to cool the target space 104 and the cold thermal energy storage unit 108 using the condensing unit 102 during the night (when the cost of electricity is cheaper), and then use the cold thermal energy storage unit 108 to cool the target space 104 during the day (when the cost of electricity is more expensive).

Although the above-discussion has principally regarded robust air conditioning systems incorporating cold thermal energy storage units and configured to cool a target space, in many embodiments, air conditioning systems are further configured to be operable to heat a target space using an integrated heating source. Air conditioning systems that are further configured to be operable to heat a target space are now discussed below.

Configurations for and the Operation of Robust Air Conditioning Systems Incorporating Cold Thermal Energy Storage Devices and Operable to Provide Cooling and/or Heating Services In many embodiments, robust air conditioning systems incorporate integrated heating mechanisms such that they are operable to effectively and efficiently provide heating and/or cooling services. Any of a variety of heating mechanisms can be incorporated to heat the target space in accordance with many embodiments of the invention. For example, in many embodiments, condensing units are implemented that are operable to output heated vapor phase working fluid (e.g. by using a compressor), which can then be circulated to provide heating for a target space. In a number of embodiments, the condensing unit includes a distinct integrated heating mechanism, capable of heating the target space. In many embodiments, the heating mechanism does not require access to a power grid to operate. For example, in a number of embodiments, a gas heater is integrated into the air conditioning system and used to provide heating functionality. In this way, the air conditioning system can provide heating and cooling services without having to principally rely on a power grid. To be clear, any of a variety of heating mechanisms can be integrated into robust air conditioning systems in accordance with embodiments of the invention. For example, as alluded to above, condensing units that are operable to use an integrated compressor to compress an incoming vapor phase working fluid and thereby generate a heated vapor phase working fluid can be integrated into an air conditioning system.

Figure 2A:
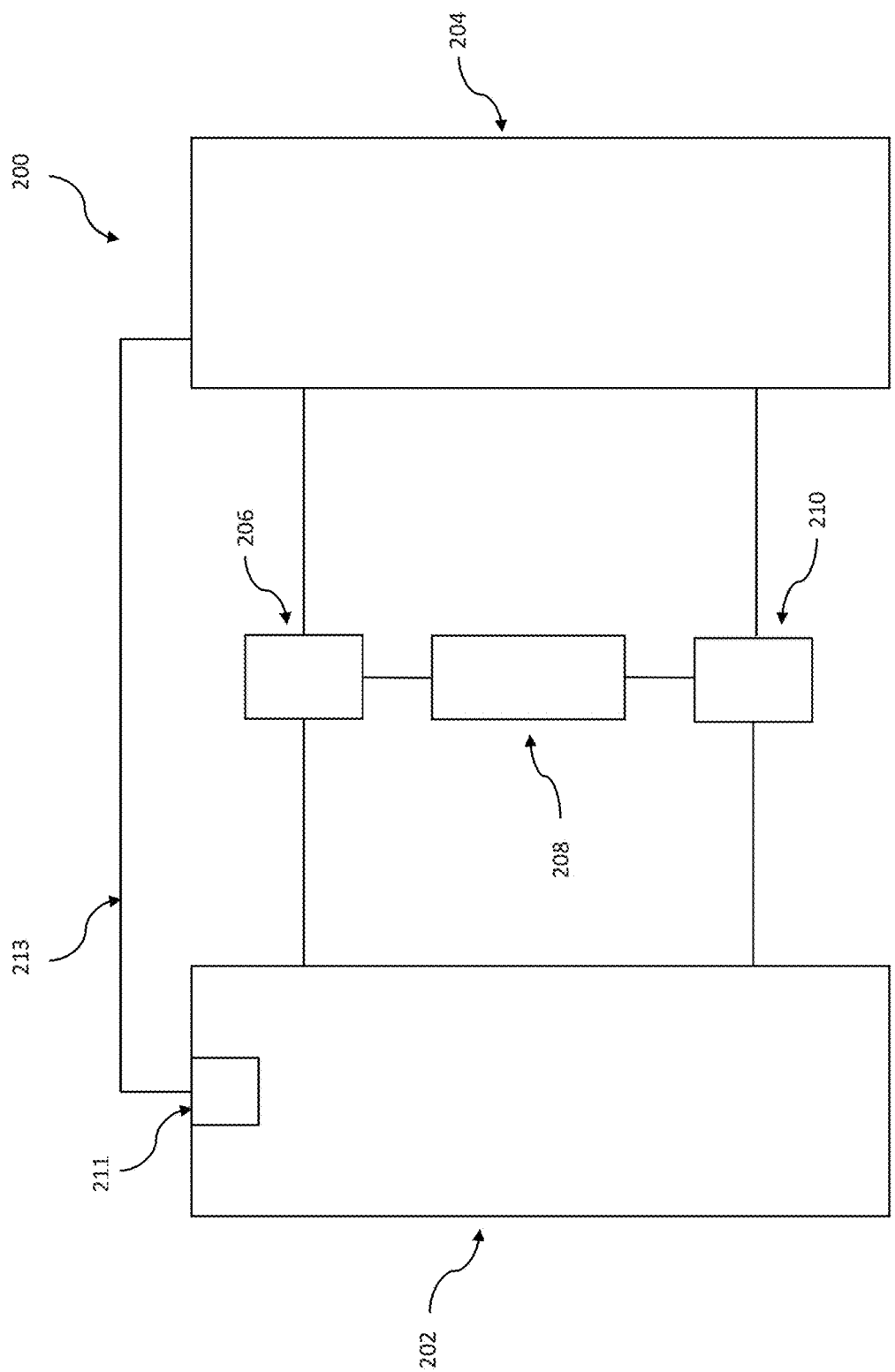

FIGS. 2A-2I illustrate a configuration for and the operation of a robust air conditioning system that includes an integrated heat source, as well as various modes of operation. In particular, FIG. 2A illustrates the robust air conditioning system including an integrated heat source within the condensing unit. More specifically, the structure of the air conditioning system 200 is similar to that seen with respect to FIG. 1A, insofar as it includes: a condensing unit 202, a target space 204, a liquid pressurizer and distributor ensemble 206, a cold thermal energy storage unit 208, and a suction gas/equalizer ensemble 210. The air conditioning system further includes a separate pipeline 213 that can channel heat, in the form of vapor phase working fluid, from the condensing unit 202 to the target space 204. In the illustrated embodiment, an integrated heating source 211 is assimilated within the condensing unit 202. As stated above, any of a variety of heating sources can be integrated. In many embodiments, the heating source is gas powered and therefore does not require access to a power grid in order to operate. In this way, the air conditioning system 200 can provide heating and/or cooling services (via thermal energy stored in the cold thermal energy storage unit 208) without principally relying on access to a power grid.

Figure 2B:
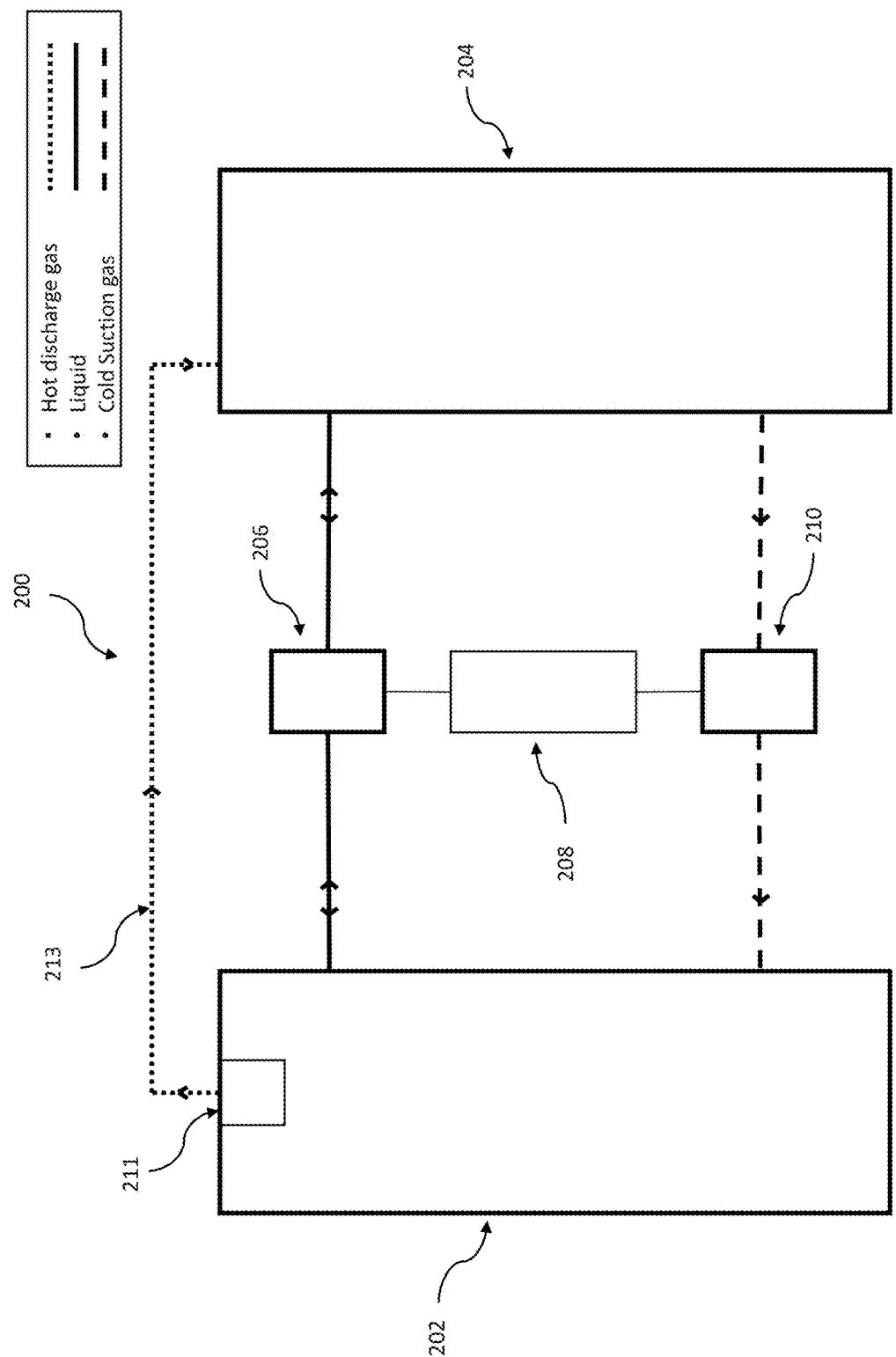

FIG. 2B illustrates the operation of the air conditioning system 200 depicted in FIG. 2A to cool and/or heat the target space 204. For example, in some instances it may be desired that a certain portion of the target space 204 be heated, while another portion be cooled. For instance, on many occasions it is desirable to prevent the buildup of frost within a freezer; accordingly, heat can be directed to those areas that are prone to frost development, while the other portions are kept cool. In other instances, in the context of air conditioning living quarters, it may be desirable to cool one floor of a building, but heat another floor of a building (e.g. a basement). In any case, the illustration is similar to that seen with respect to FIG. 1B insofar as it depicts the implementation of a vapor-compression cycle by the condensing unit 202 to cool the target space 204. In the illustrated embodiment, it is further depicted that, alternatively or simultaneously, the integrated heating source 211 can be used to heat and boil the working fluid such that it can be circulated via the dedicated pipeline 213 to those aspects of the target space 204 desiring heat. In the illustrated embodiment, it is depicted that the heated vapor phase working fluid condenses after rejecting the heat to the target space 204. Consequently, the condensed fluid can be recirculated through the condensing unit via the liquid pressurizer and distributor ensemble 206. In particular, it is depicted that target space 204 causes the condensation of the heated vapor phase working fluid, e.g. so that it is suitable to be controlled by the liquid pressurizer and distributor ensemble 206. In the illustrated embodiment, it is depicted that the pipelines running to and from the liquid pressurizer and distributor ensemble 206 are operable to allow for the flow of working fluid each way. As can be appreciated, when both heating and cooling cycles are implemented, the overall direction of the flow will be principally based on the extent of cooling being desired relative to the extent of heating being desired.

Figure 2C:
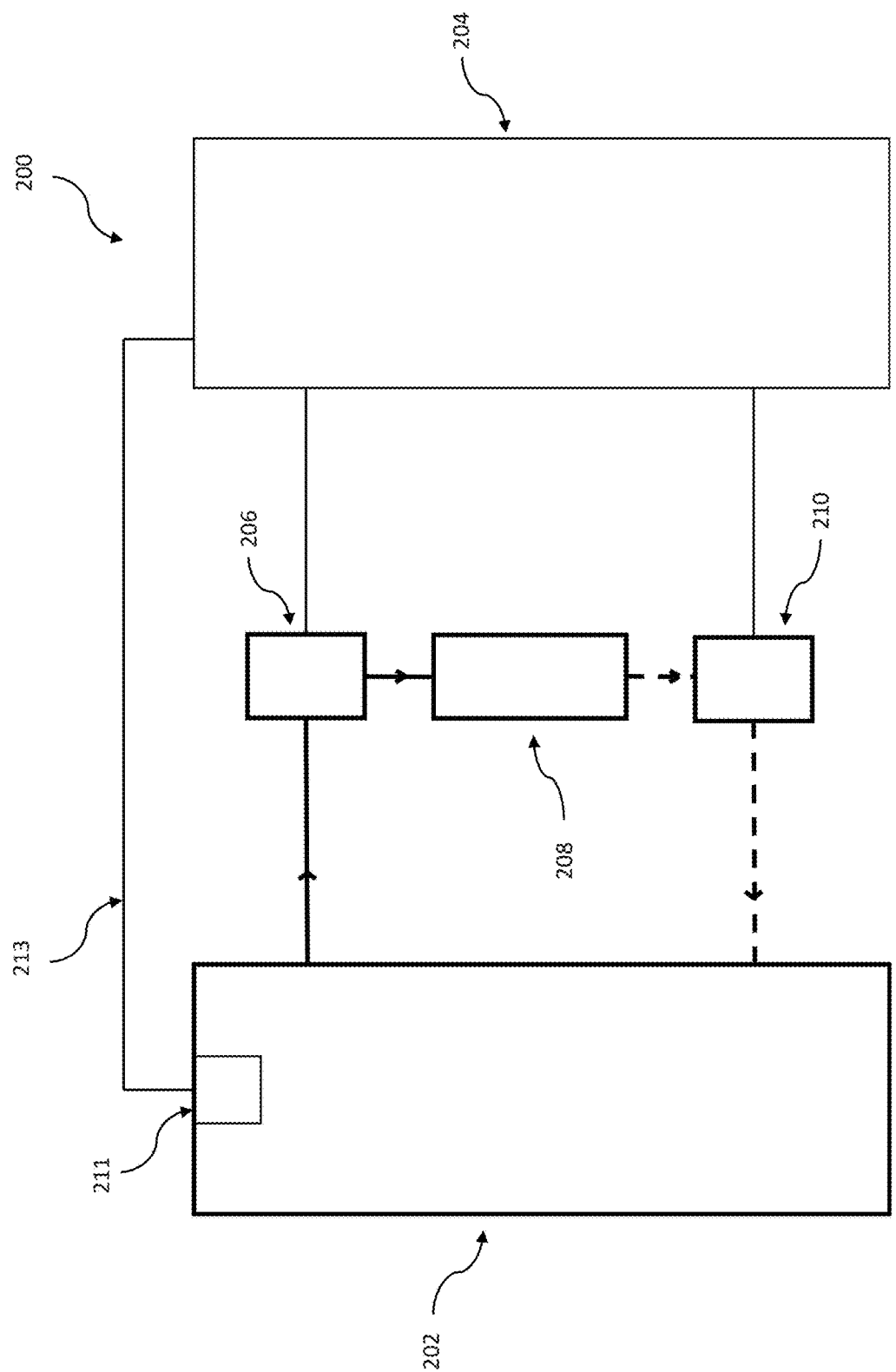

FIG. 2C illustrates the operation of the air conditioning system 200 store thermal energy within the cold thermal storage unit 208. As can be appreciated, the operation is similar to that seen in FIG. 1C insofar as it illustrates the implementation of a vapor-compression cycle to cool the cold thermal energy storage unit 208 to any desired temperature.

Figure 2D:
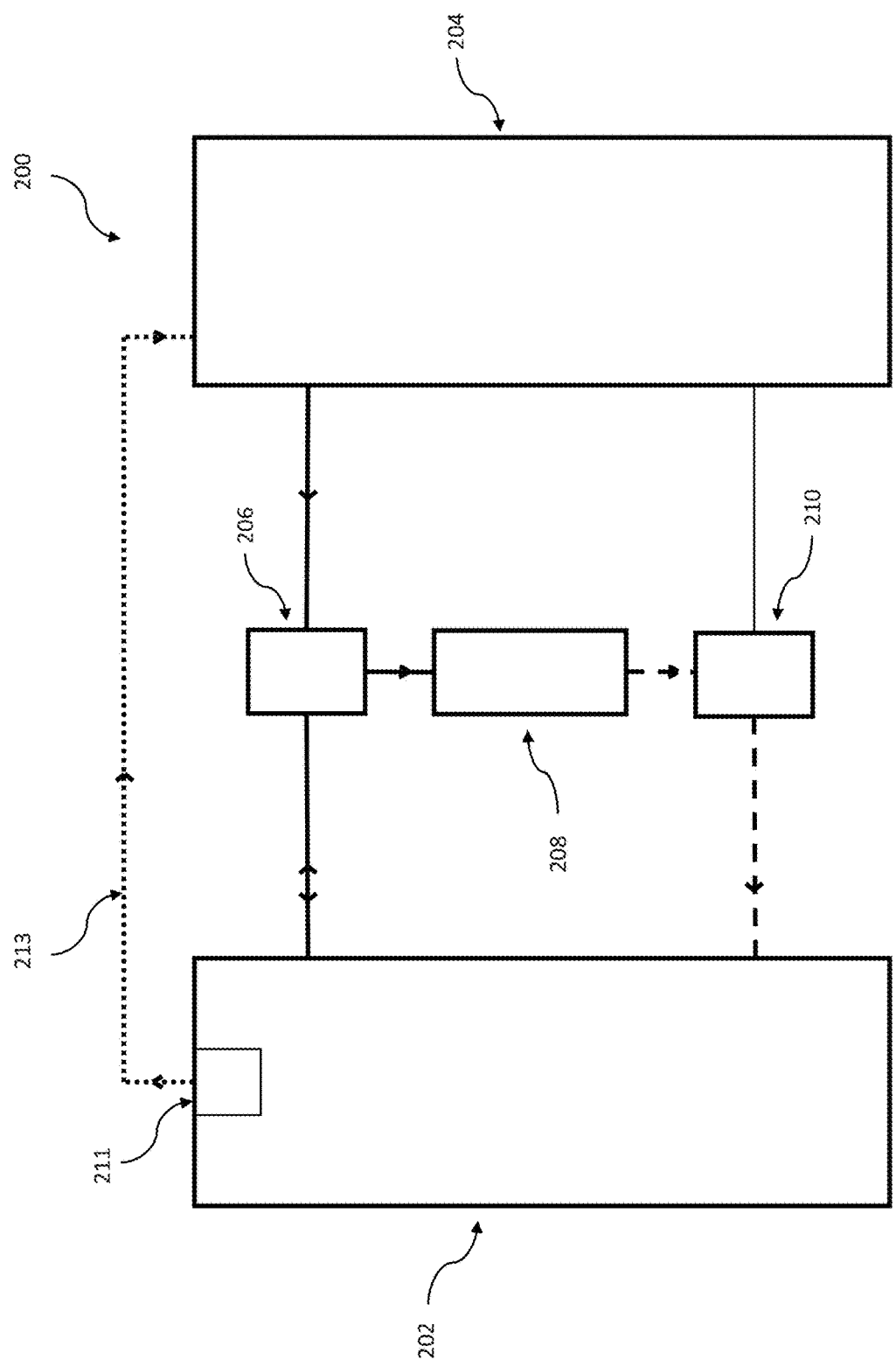

FIG. 2D illustrates the operation of the air conditioning system 200 depicted in FIG. 2A to charge the cold thermal storage unit 208, as well as provide heating for the target space 204. As can be appreciated, the illustration is similar to that seen in FIG. 2C insofar as it depicts the implementation of a vapor-compression cycle to cool the cold thermal energy storage unit 208 to a desired temperature. However, FIG. 2D also depicts the circulation of a heated fluid to heat the target space. Similar to before, when the heated vapor phase working fluid condenses, it can leverage the liquid pressurizer and distributor ensemble 206 to facilitate its circulation. Note that the associated pipelines are adapted for flow in both directions, such that it can return condensed liquid after it has heated the target space 204 and/or can deliver condensed liquid from the condensing unit 202 to the cold thermal storage unit 208.

Figure 2E:
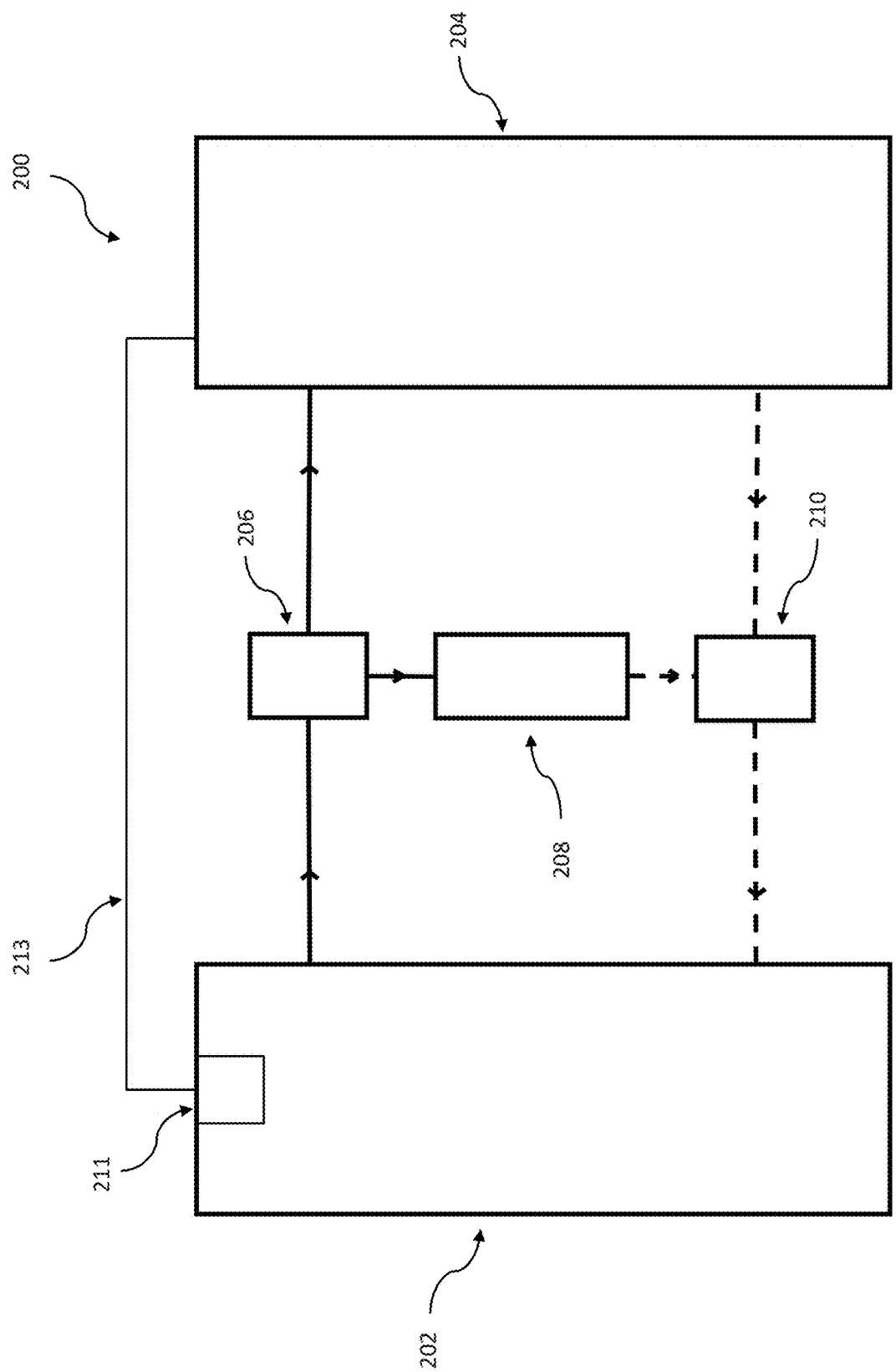

FIG. 2E illustrates the operation of the air conditioning system 200 to store thermal energy in the cold thermal energy storage unit 208 as well as provide cooling for the target space 204. As can be appreciated, the operation of the air conditioning system 200 in this respect is similar to that seen in FIG. 1E.

FIG. 2F illustrates the operation of the air conditioning system 200 depicted in FIG. 2A to store thermal energy in the cold thermal energy storage unit 208, to cool the target space 204, as well as to provide heat to the target space 204. As can be appreciated, the illustration is similar to that seen with respect to FIG. 2E, except that the illustration further depicts that a heated fluid is circulated through the target heated space. The illustration depicts that the liquid pressurizer and distributor ensemble 206 can control the liquid phase working fluid fluid circulation for each of the vapor-compression cycles (e.g. the vapor-compression cycle configured to cool the cold thermal energy storage unit 208 and the target space 204) as well as the circulation of the fluid used to heat the target space.

Figure 2G:
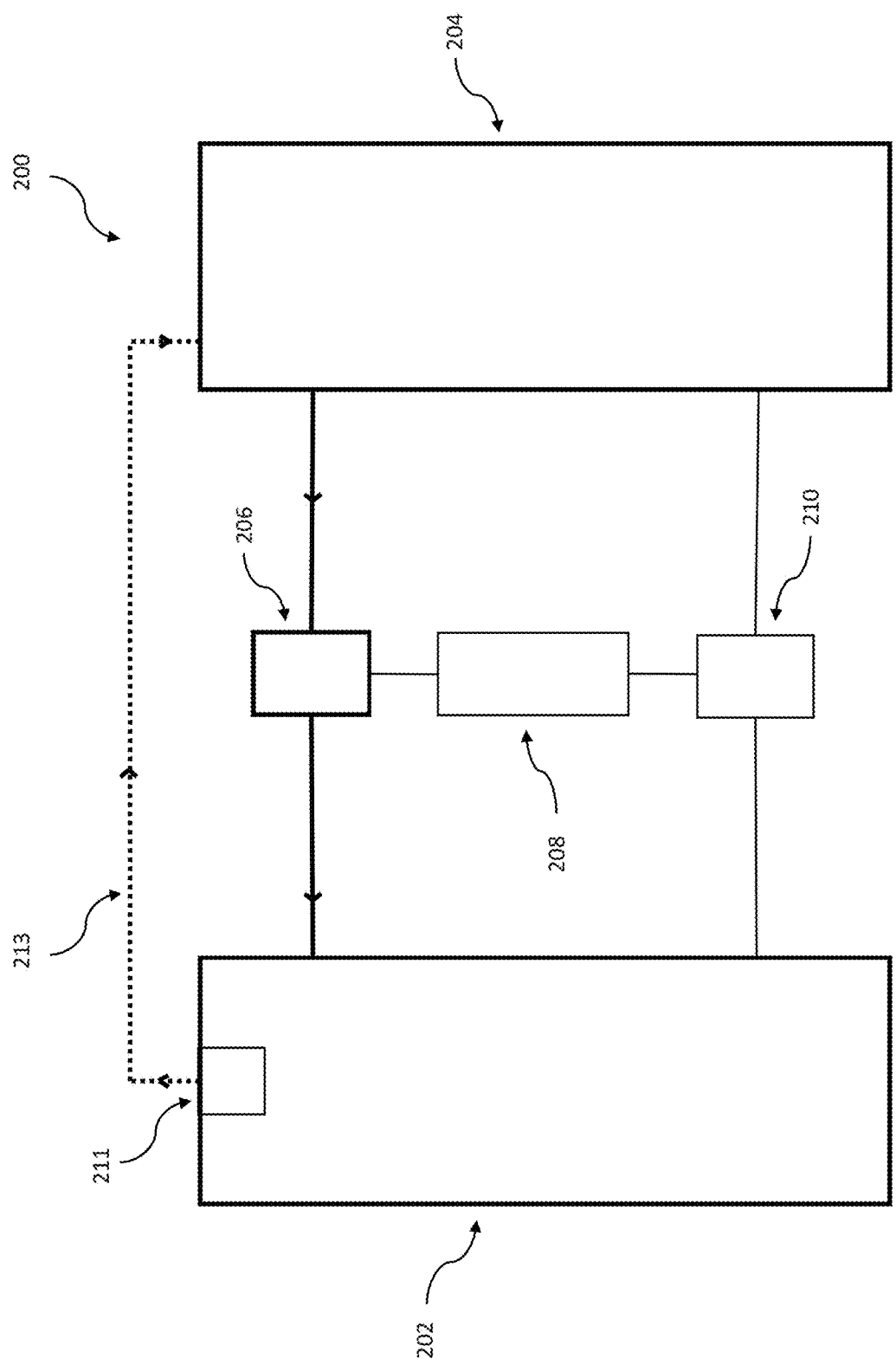

FIG. 2G illustrates the operation of the air conditioning system 200 to heat the target space 204. In particular, it is illustrated that the heating fluid (e.g. the boiled working fluid) is circulated through the integrated heat source 212 within the condensing unit 202, the target space 204, and the liquid pressurizer and distributor ensemble 206. Accordingly, the fluid can deliver heat generated by the integrated heat source 212 to the target space 208.

Figure 2H:
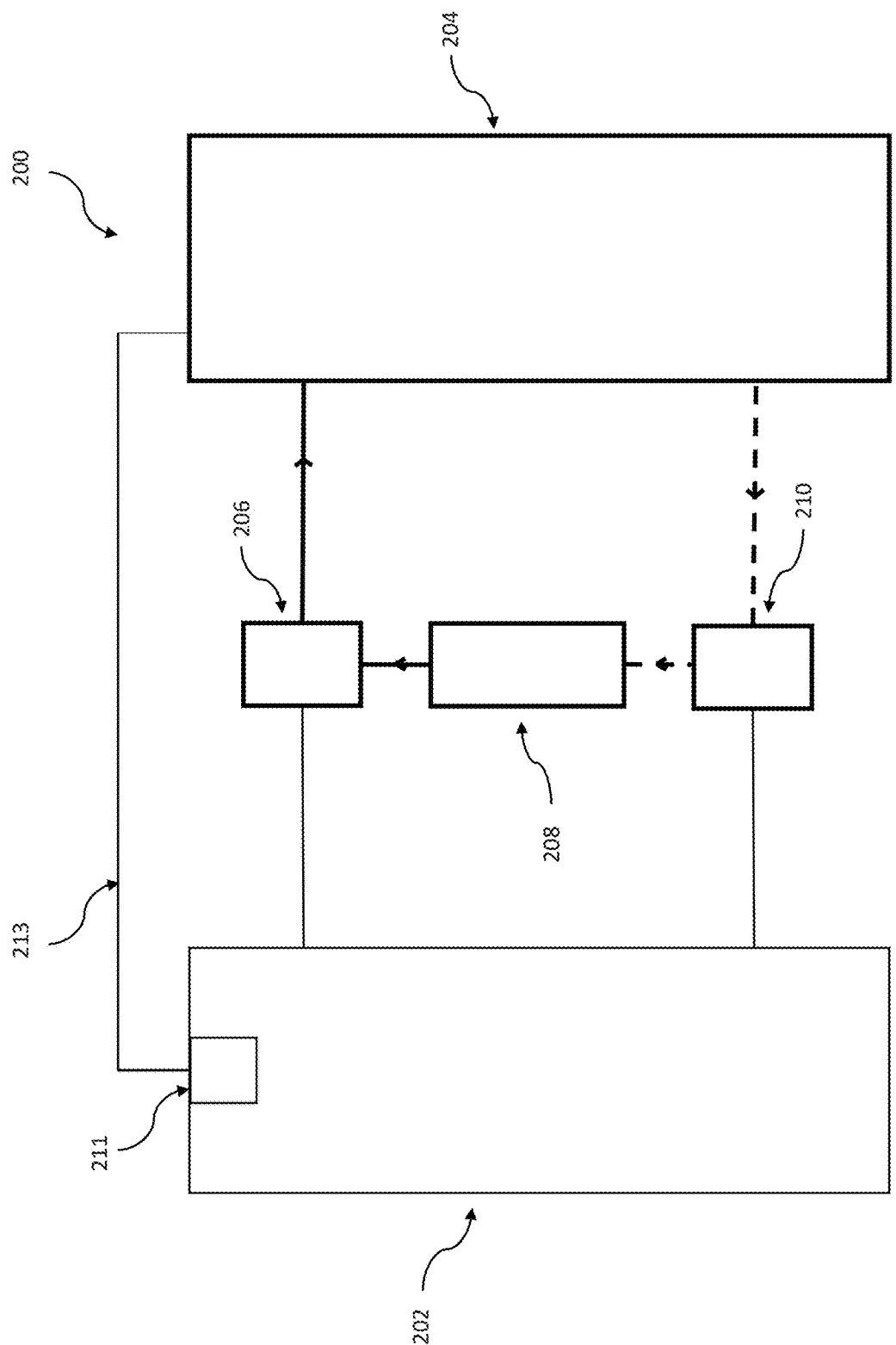

FIG. 2H illustrates the operation of the air conditioning system 200 to cool the target space 204 to the desired temperature using the cold thermal energy storage unit 208. As can be appreciated, the operation is similar to that depicted in FIG. 1E.

Figure 2I:
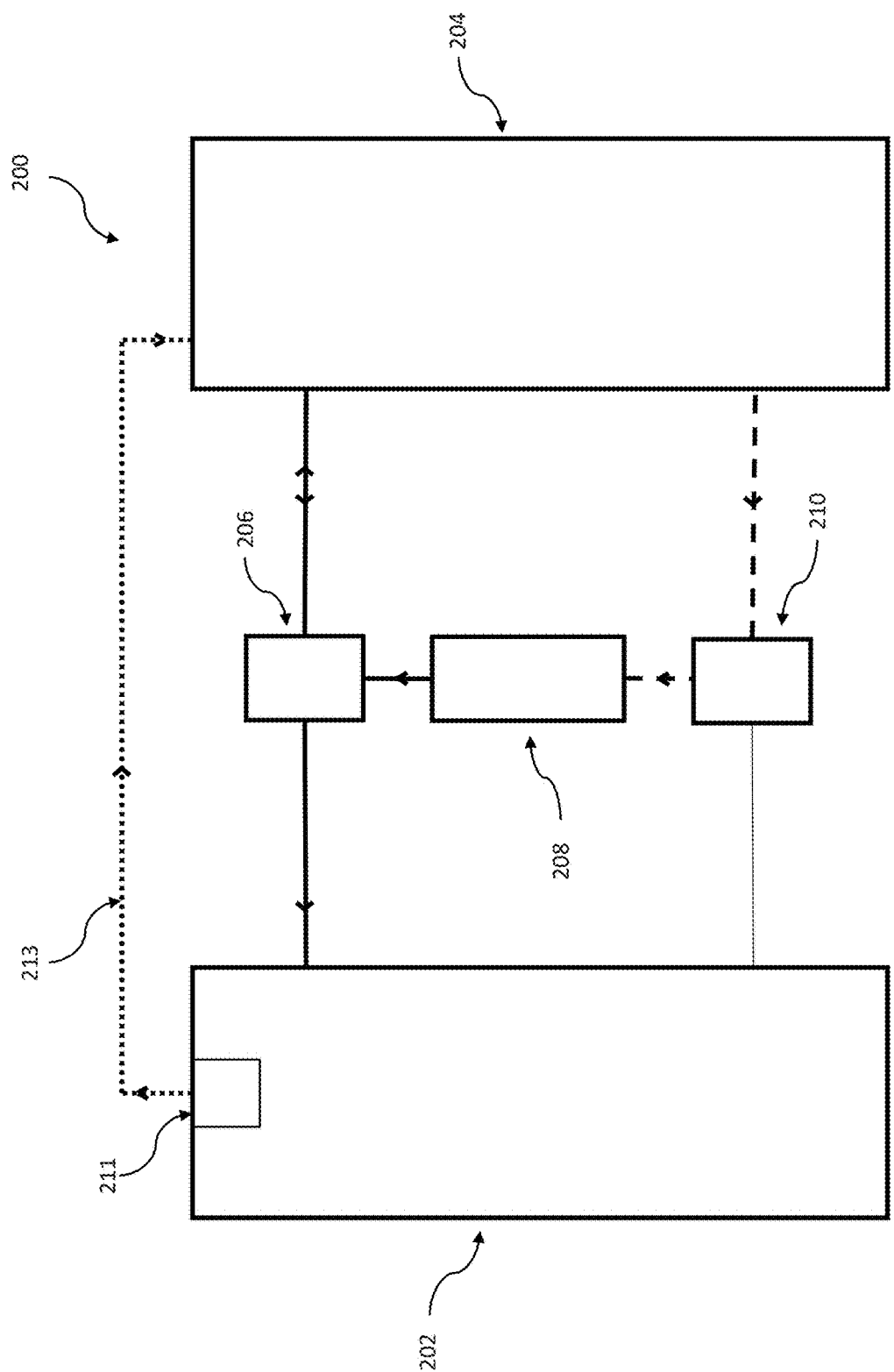

FIG. 2I illustrates the operation of the air conditioning system 200 depicted in FIG. 2A to cool the target space 204 using the cold thermal energy storage unit 208 as well as to deliver heat to the target space 204 using heat generated by the integrated heating source 211. As can be appreciated, the illustration is similar to that seen in FIG. 2H insofar as it depicts the circulation of a working fluid between the cold thermal energy storage unit 208 and the target space 204, except that it further depicts that a heated fluid is circulated through the condensing unit 202 and the target space 204. This mode of operation can be effectuated largely without access to a power grid (given that the integrated heating source can largely operate without access to a power grid). In general, as can be appreciated, the above described configurations offer a robust air conditioning solution that can continuously provide air conditioning services (both heating and cooling), even without principal reliance on a power grid.

While the above discussion has largely focused on robust air conditioning systems including an integrated heat source within a constituent condensing unit, it should be appreciated that integrated heat sources can be assimilated in any of a variety of ways in accordance with embodiments of the invention. In many embodiments, integrated heat sources can be incorporated within a robust air conditioning system outside of the constituent condensing unit. In a number of embodiments, the integrated heat source is associated with an entirely distinct circulation piping—e.g. without any overlap with piping used to implement a vapor-compression cycle. In several embodiments, the integrated heat source is not associated with the same liquid pressurizer and distributor ensemble that is used to facilitate the implementation of a vapor-compressor cycle; rather it is in fluid communication with a separate fluid circulation pump. As can be appreciated, the above-described configurations can be implemented in any of a variety of configurations in accordance with many embodiments of the invention.

Additionally, while the above embodiments have principally regarded the integration of a heat source within an air conditioning system, in a number of embodiments, a separate hot thermal energy storage unit is additionally incorporated within a robust air conditioning system, such that the air conditioning system can provide both heating and cooling functionalities via thermal energy storage units. Air conditioning systems incorporating heated thermal energy storage units are now discussed below in greater detail.

Configurations for and the Operation of Robust Air Conditioning Systems Incorporating Both Hot and Cold Thermal Energy Storage Units In many embodiments, a robust air conditioning system includes distinct hot and cold thermal energy storage units, and is operable to use them to heat and/or cool, a targeted space. For example, in many embodiments, a hot thermal energy storage unit is in fluid communication with an integrated heat source embedded within a condensing unit. The integrated heat source can be either one that is principally powered using access to the power grid, or one that can operate without access to a power grid. In many embodiments, the condensing unit itself provides the functionality of the integrated heat source. For example, in many embodiments, the condensing unit can be made to implement an operating mode whereby it can boil working fluid such that the vapor phase working fluid can be transmitted to the target space for the purposes of heating. This operating mode can be achieved, for instance, by using a compressor within the condensing unit to compress low temperature gas to high temperature gas. In this way, the condensing unit can be considered to be include an integrated heat source, insofar as the integrated compressor can be used to provide heat as desired. In effect, these configurations can operate to store thermal energy within the hot and cold thermal energy units using a powered condensing unit. In this way, a target space can be air conditioned either via the condensing unit, or either of the hot thermal energy storage unit or the cold thermal energy storage unit as appropriate.

Figure 3A:
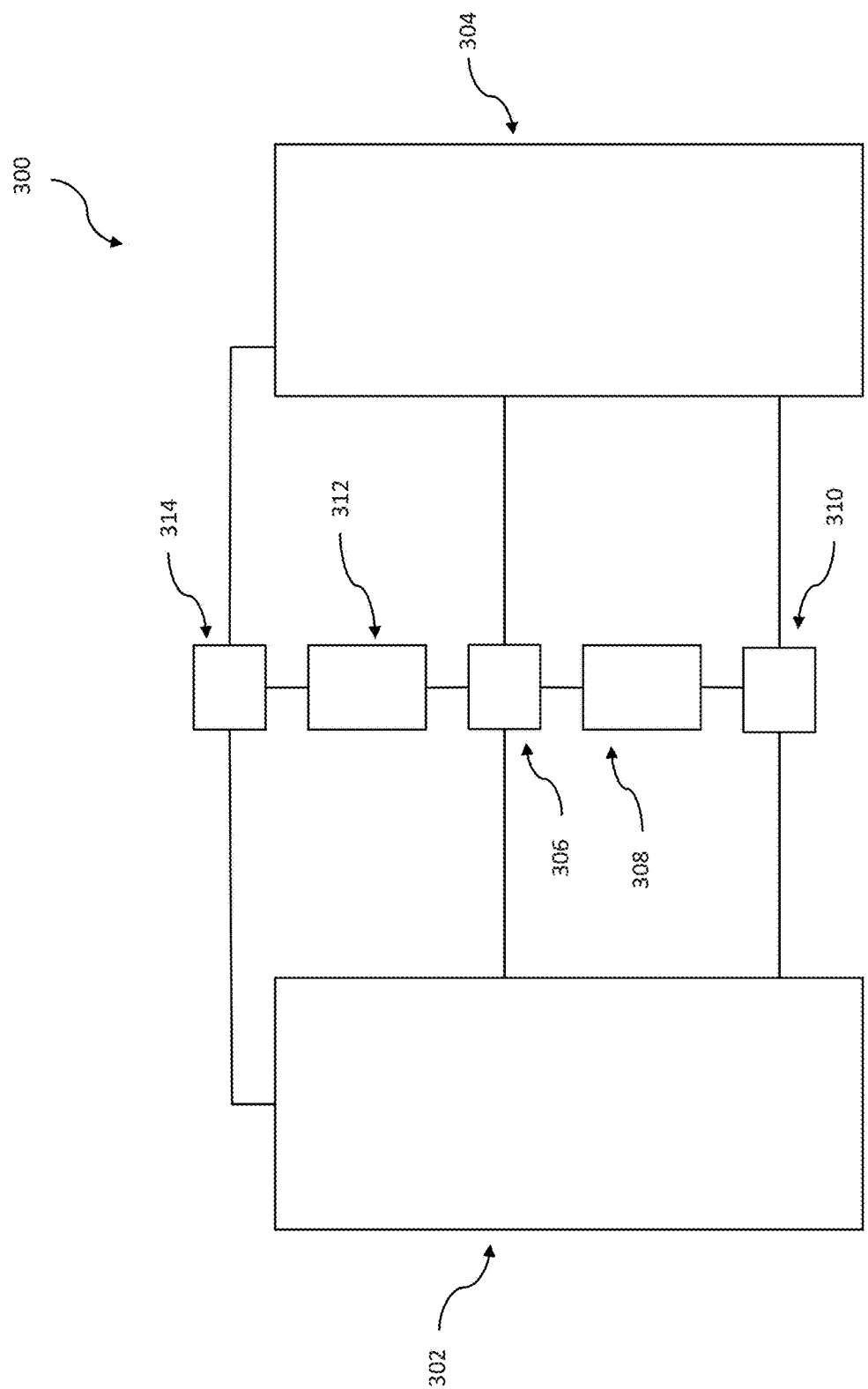

For example, FIGS. 3A-3K depict the operation of a robust air conditioning system that includes separate thermal energy storage units for heating and cooling a target space, in accordance with certain embodiments of the invention. In particular, FIG. 3A illustrates that the air conditioning system 300 is similar to that seen in FIG. 1A insofar as it includes: a condensing unit 302, a target space 304, a liquid pressurizer and distributor ensemble 306, a cold thermal energy storage unit 308, and a suction gas conditioner/distributor 310. FIG. 3A further depicts that the air conditioning system 300 further includes a hot thermal energy storage unit 312, and a discharge gas distributor 314. Note that in the illustrated embodiment, the condensing unit 302 is operable to heat (e.g. boil) working fluid so that the heated fluid can be used to heat either the hot thermal energy storage unit 312 or the target space 304. The condensing unit 302, the discharge gas distributor 314, the hot thermal storage unit 312, the target space 304, and the liquid pressurizer and distributor ensemble 306 are operatively connected by piping so as to allow for the circulation of a heated fluid through the target space 304 to heat it, as well as allow the circulation of a heated fluid through the hot thermal energy storage unit 312 to store thermal energy. As can be appreciated, the hot thermal energy storage unit 312 can be implemented in any of a variety of ways. For instance, in many embodiments, the hot thermal energy storage unit includes a thermal storage medium encased in thermal insulation. Further examples of some hot thermal energy storage units that can be incorporated in accordance with embodiments of the invention are discussed below.

Figure 3B:
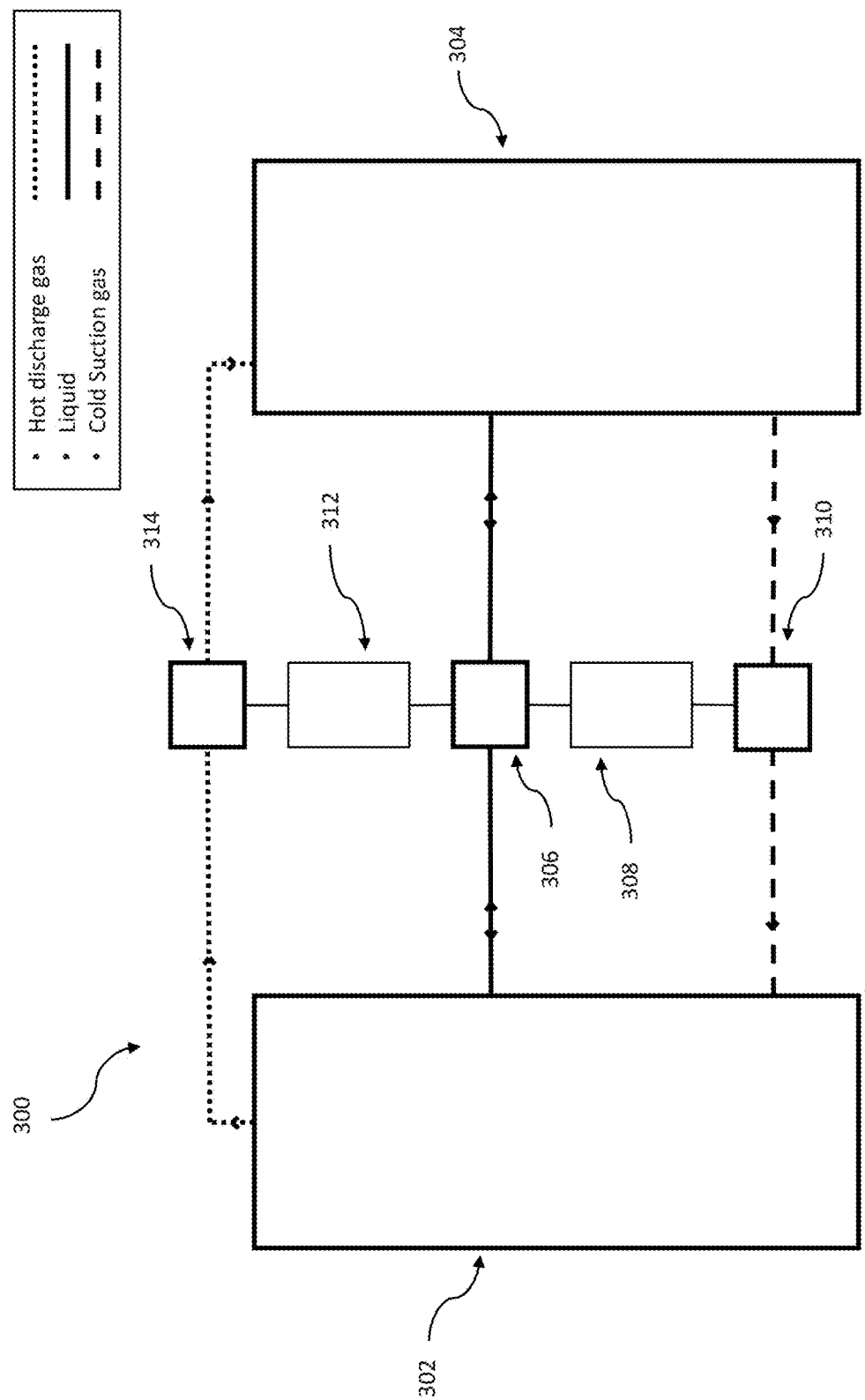

FIG. 3B depicts the operation of the air conditioning system 300 to provide both heating and cooling services to the target space 304 using the condensing unit 302. In the illustrated embodiment, the condensing unit 302 is powered and is configured to effectuate a vapor-compression cycle to provide cooling services to the target space 304—e.g. as seen above with respect to FIG. 1B. Concurrently or alternatively, the condensing unit 302 is powered to create heated vapor phase working fluid that can be circulated, e.g. via the discharge gas distributor 314, through the target space. The heat transfer that occurs between the heated vapor phase working fluid and the target space 304, typically works to condense the fluid into a liquid, which can then be returned to the condensing unit via the liquid pressurizer and distributor ensemble 306. In particular, it is depicted that in the illustrated embodiment, the liquid pressurizer and distributor ensemble 306 controls the flow of the working fluid implementing the vapor-compression cycle as well as the condensed fluid that was used to heat the target space. In this way, the condensing unit 302 can operate to provide both heating and cooling services to the target space 304.

Figure 3C:
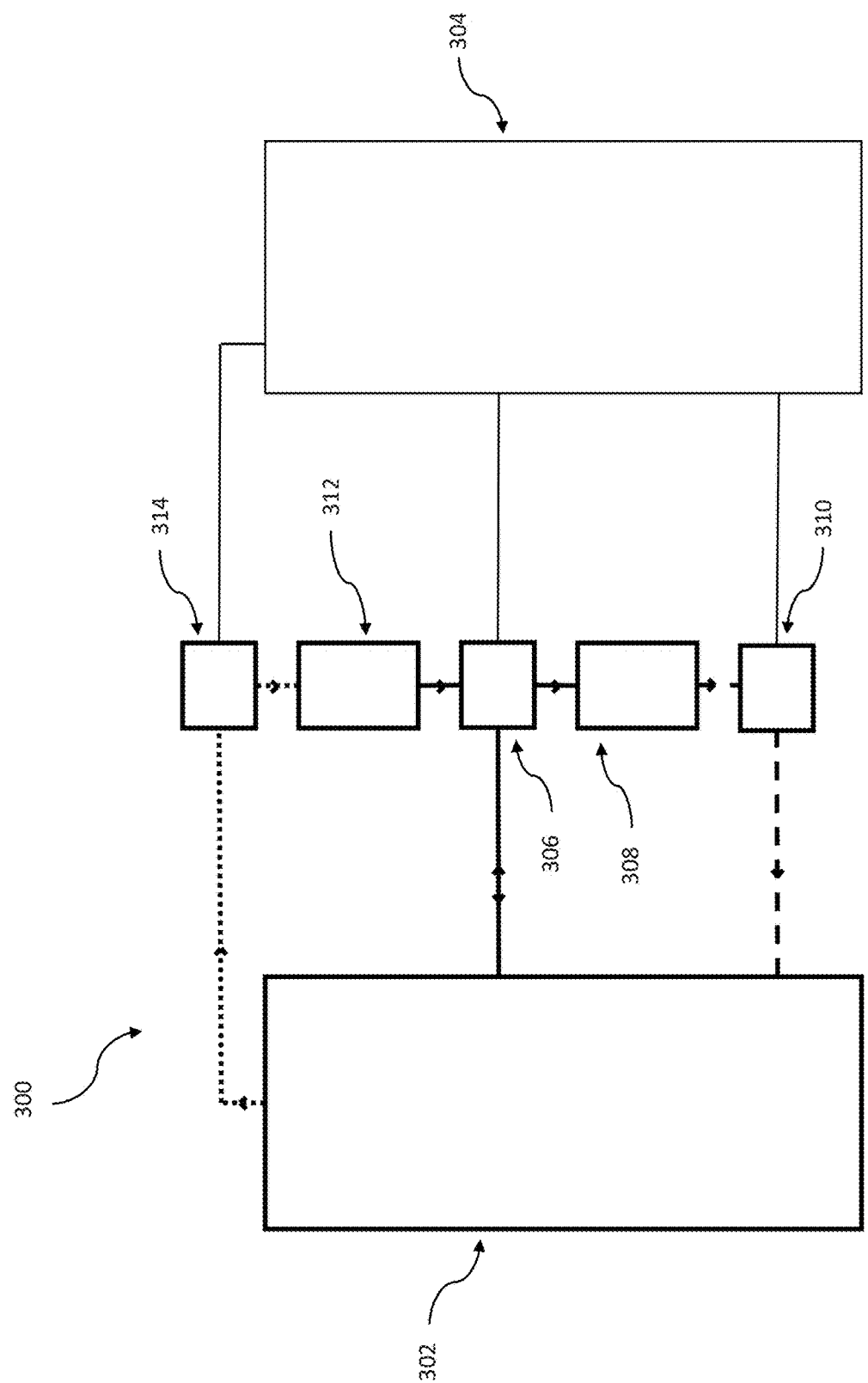

FIG. 3C illustrates the operation of the air conditioning system 300 to store thermal energy in the hot thermal energy storage unit 312 as well as store thermal energy in the cold thermal energy storage unit 308. As can be appreciated, the process is similar to that seen in FIGS. 1C and 2C, insofar as a vapor-compression cycle is implemented to cool the cold thermal energy storage unit 308 to a temperature less than that desired for a target space 304. However, the illustrated embodiment further depicts that a heated fluid (e.g. compressed vapor phase heating fluid) is generated within the condensing unit and directed to the discharge gas distributor 314, which then redirects the heated gas to the hot thermal energy storage unit, which is configured to be operable to absorb the heat, and retain it for subsequent use. In the illustration, this mode of operation does not provide any air conditioning for the target space 304.

Figure 3D:
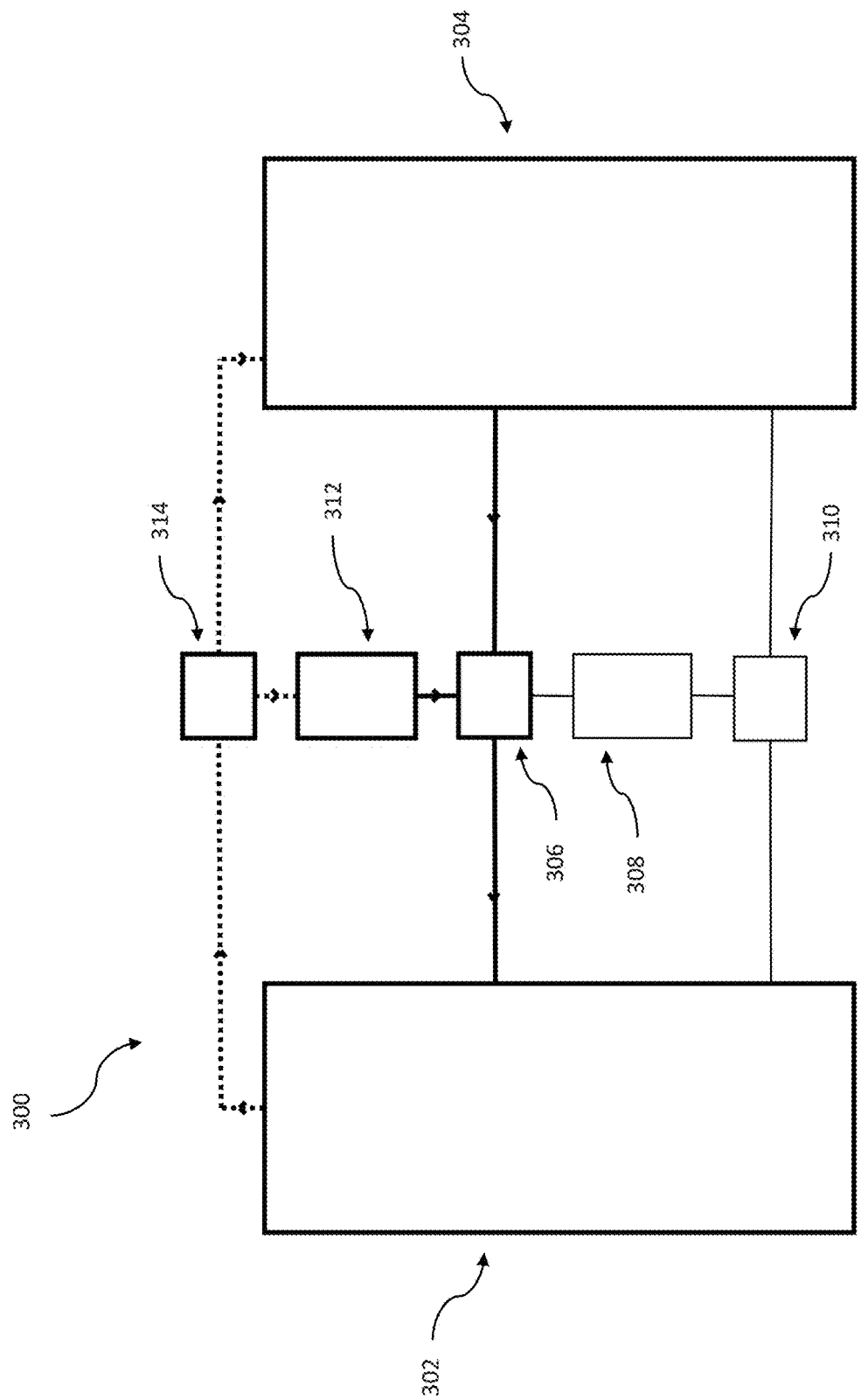

FIG. 3D depicts the heating of the target space 304 in conjunction with the simultaneous storing of thermal energy within the hot thermal energy storage unit 312. The illustration is similar to that seen above with respect to FIG. 3C insofar as it depicts the storing of thermal energy within the hot thermal energy storage unit 312; however, FIG. 3D further illustrates that a portion of the heated fluid is used to provide heating for the target space 304. The liquid pressurizer and distributor ensemble 306 is used to aggregate the condensed fluid that previously served to heat the target space 304 and the hot thermal energy storage unit 312 to deliver it to the condensing unit for heating and further circulation.

FIG. 3E depicts the heating of the target space 304, as well as the implementation of a cooling vapor compression cycle to store thermal energy within the cold thermal energy storage unit 308. As can be appreciated, the illustrated operation mode is similar to that seen with respect to FIG. 3B, except that the condensing unit 302 is used to implement a vapor compression cycle with respect to the cold thermal energy storage unit 308 as opposed to the target space 304.

FIG. 3F depicts the inverse scenario where the air conditioning system 300 is being operated to store thermal energy in the hot thermal energy storage unit 312 and to cool the target space 304 using the condensing unit 302. As can be appreciated, the illustrated operation mode is similar to that seen with respect to FIG. 3B, except that the heated fluid is being circulated through the hot thermal energy storage unit 312 as opposed to the target space 304.

Figure 3G:
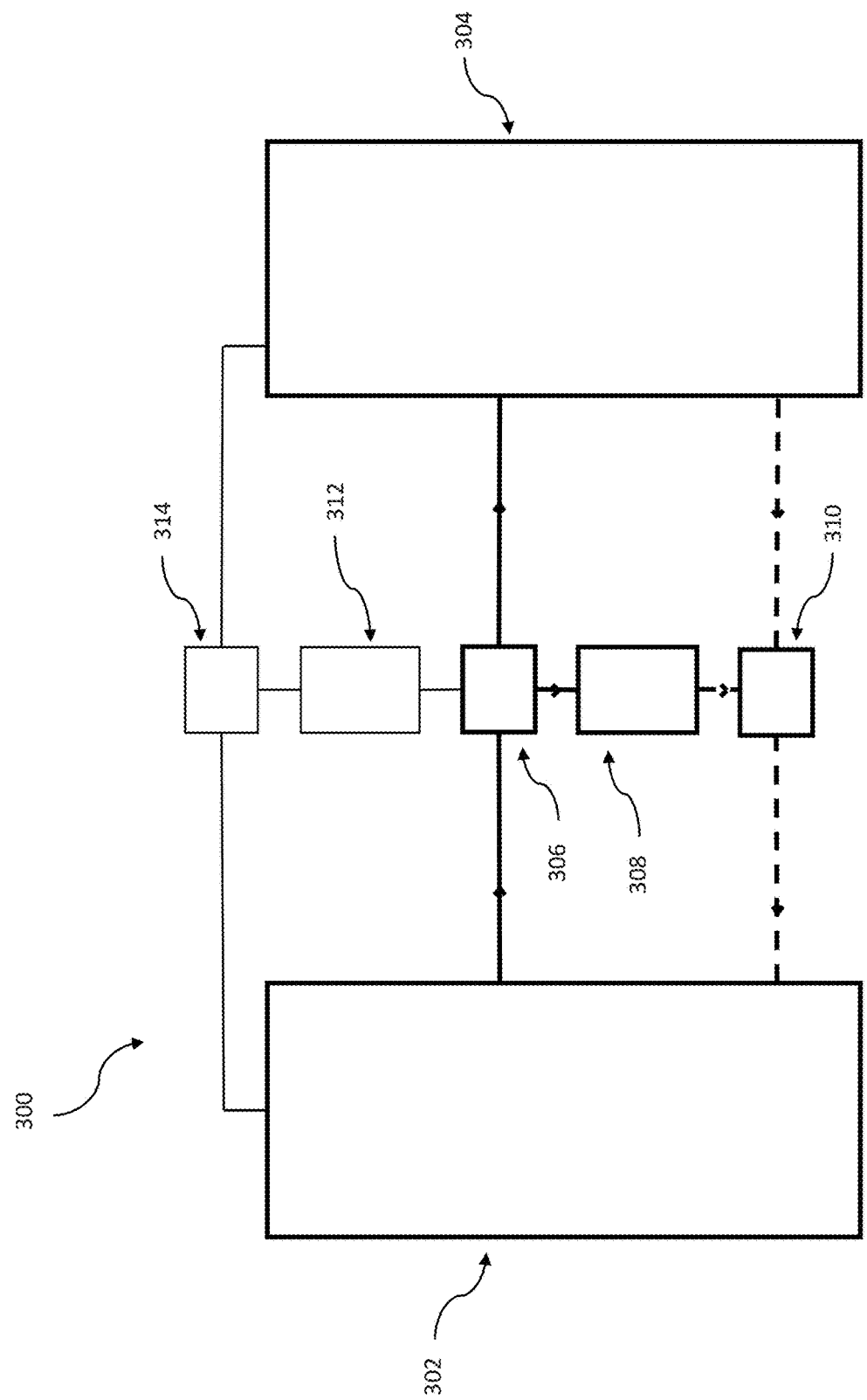
Figure 31:
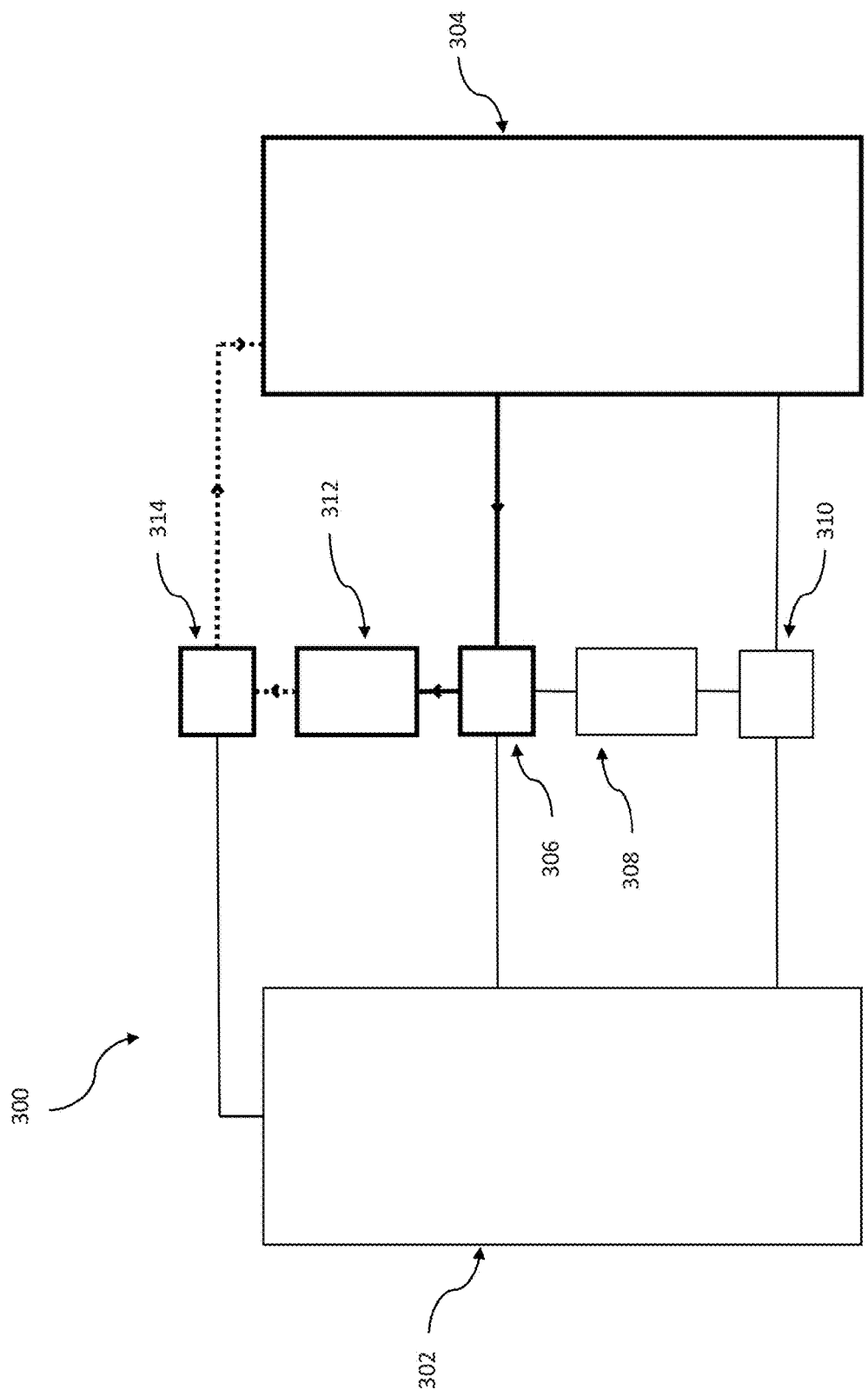

FIG. 3G depicts the operation of the air conditioning system 300 to simultaneously cool the cold thermal energy storage unit 308 as well as the target space 304. The operation mode is similar to that seen with respect to FIG. 1D.

FIG. 3H depicts the operation of the air conditioning system 300 to provide heating/cooling to the target space 304 as well as to store thermal energy within the hot thermal energy storage unit 312 and the cold thermal energy storage unit 308. As can be appreciated, the illustrated operating mode is similar to that seen with respect to FIG. 3B, except that portions of the circulated heated fluid and the working fluid are redirected via the gas discharge distributor 314 and the liquid pressurizer distributor ensemble 306 to the hot thermal energy storage unit 312 and the cold thermal energy storage unit 308, respectively.

FIG. 3I depicts the operation of the air conditioning system 300 to heat the target space 304 using the hot thermal energy storage unit 312. In particular, the figure depicts that the working fluid is circulated through the hot thermal energy storage unit 312, the discharge gas distributor 314, into the target space 304 and back to the liquid pressurizer and distributor ensemble 306.

FIG. 3J depicts the operation of the air conditioning system 300 to cool the target space using the cold thermal energy storage unit 308. As can be appreciated, the operation of the air conditioning system 300 is similar to that seen above with respect to FIG. 1E.

Figure 3K:
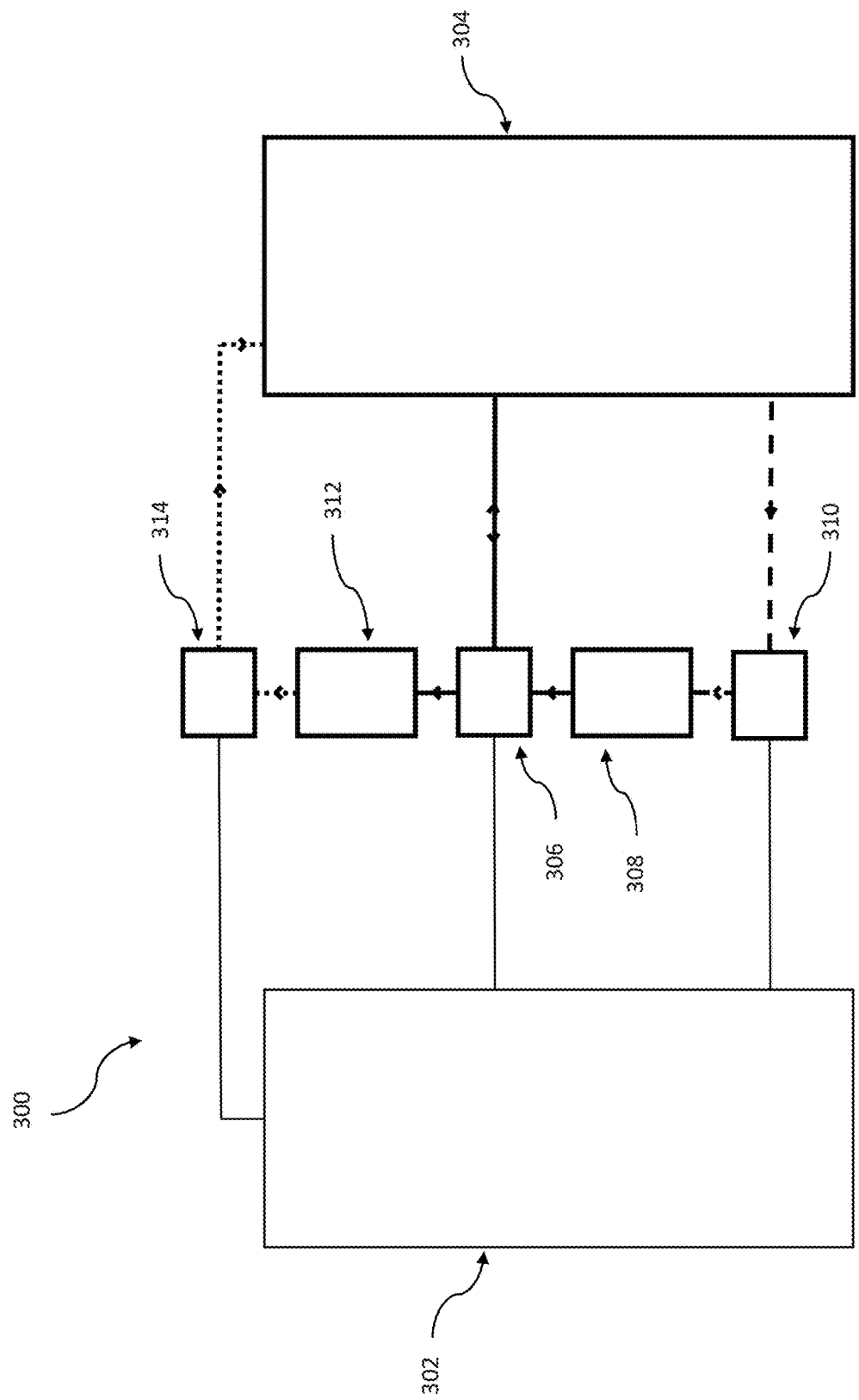

FIG. 3K depicts the operation of the air conditioning system 300 to provide both heating and cooling services to the target space 304 using the hot and cold thermal energy storage units, 312 and 308, respectively. As can be appreciated, the illustrated mode of operation effectively superimposes the modes of operation depicted in FIGS. 3I and 3J.

Several implementations of various components that can be implemented in robust air conditioning systems in accordance with embodiments of the invention are now discussed below.

Condensing Units for Implementation within Robust Air Conditioning Systems

In many embodiments, condensing units are implemented that are suitable to be incorporated within many of the above described air conditioning system configurations.

For example, FIGS. 4A-4E illustrate a configuration for and operation of a condensing unit of robust air conditioning systems. In operation, a condensing unit of robust air conditioning systems can function in five distinct modes of being unused, cooling only, mostly cooling with supplemental heating, heating with supplemental cooling and heating only represented by FIGS. 4A, 4B, 4C, 4D and 4E respectively.

Figure 4A:
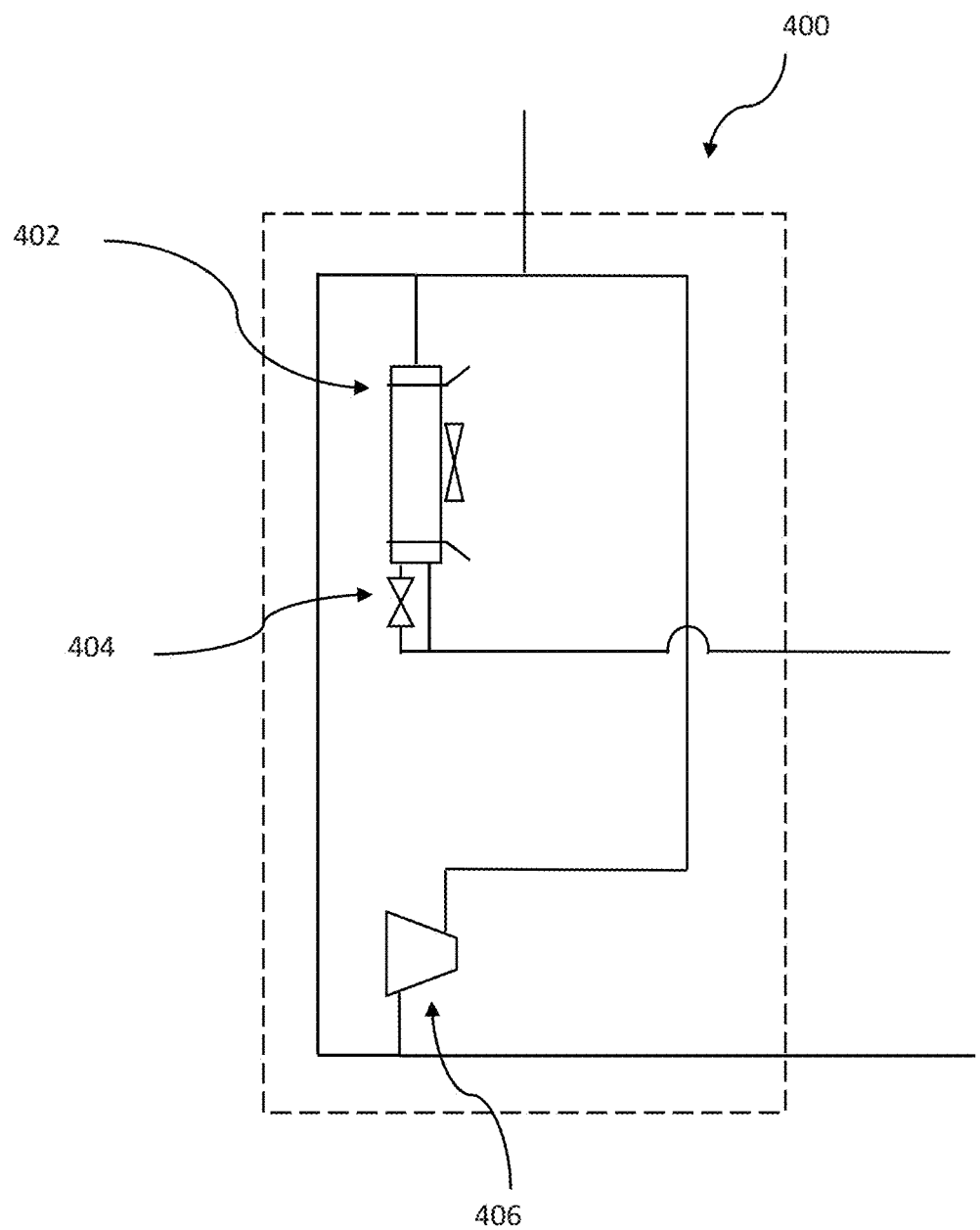
FIGS. 4A-4E illustrate a configuration for and operation of a condensing unit of robust air conditioning systems in accordance with certain embodiments of the invention.

In particular, FIG. 4A illustrates the configuration of a condensing unit 400 which includes a dual use condenser/evaporator 402, an expansion valve 404 and a compressor 406, all of which are operatively interconnected by piping. The condensing unit 400 generally operates to generate heating or cooling services in the form of high pressure vapor working fluid or high pressure liquid working fluid when used as a component of a robust air condition system. As is the case with all figures, although not depicted, valves and other components can be incorporated to facilitate the operation of the condensing unit 400 in accordance with many embodiments of the invention.

The dual use evaporator/condenser 402 generally operates to exchange heat between a working fluid and some other media in a manner that either extracts heat from the media and boils the working fluid or provides heat to the media and condenses the working fluid. Although the dual use evaporator/condenser 402 is schematically depicted it should be appreciated that it can be implemented using any of a variety of schemes. For example, in many embodiments, the dual use evaporator/condenser 402 comprise coils of a thermally conductive material through which the working fluid passes. In another scheme, the dual use evaporator/condenser 402 consists of a braze plate heat exchanger through which the working and target media are circulated.

The expansion device 404 generally operates to expand a higher pressure fluid to a lower pressure. Although the expansion device 404 is depicted schematically it should be appreciated that it can be implemented using any of a variety of schemes. For example, in many embodiments, the expansion device 404 comprises an electronic expansion valve. In another scheme, the expansion device 404 comprises a turbine. In any case, it should be clear that any suitable device can be used as an expansion device in accordance with embodiments of the invention.

The compressor 406 generally operates to compress a low pressure gas to higher pressure. Although the compressor 406 is depicted schematically it should be appreciated that it can be implemented using a variety of schemes. For example, in many embodiments, the compressor 406 comprises a positive displacement device. In another scheme, the compressor 406 comprises a dynamic compressor device such as a jet, centrifugal or axial compressor.

Figure 4B:
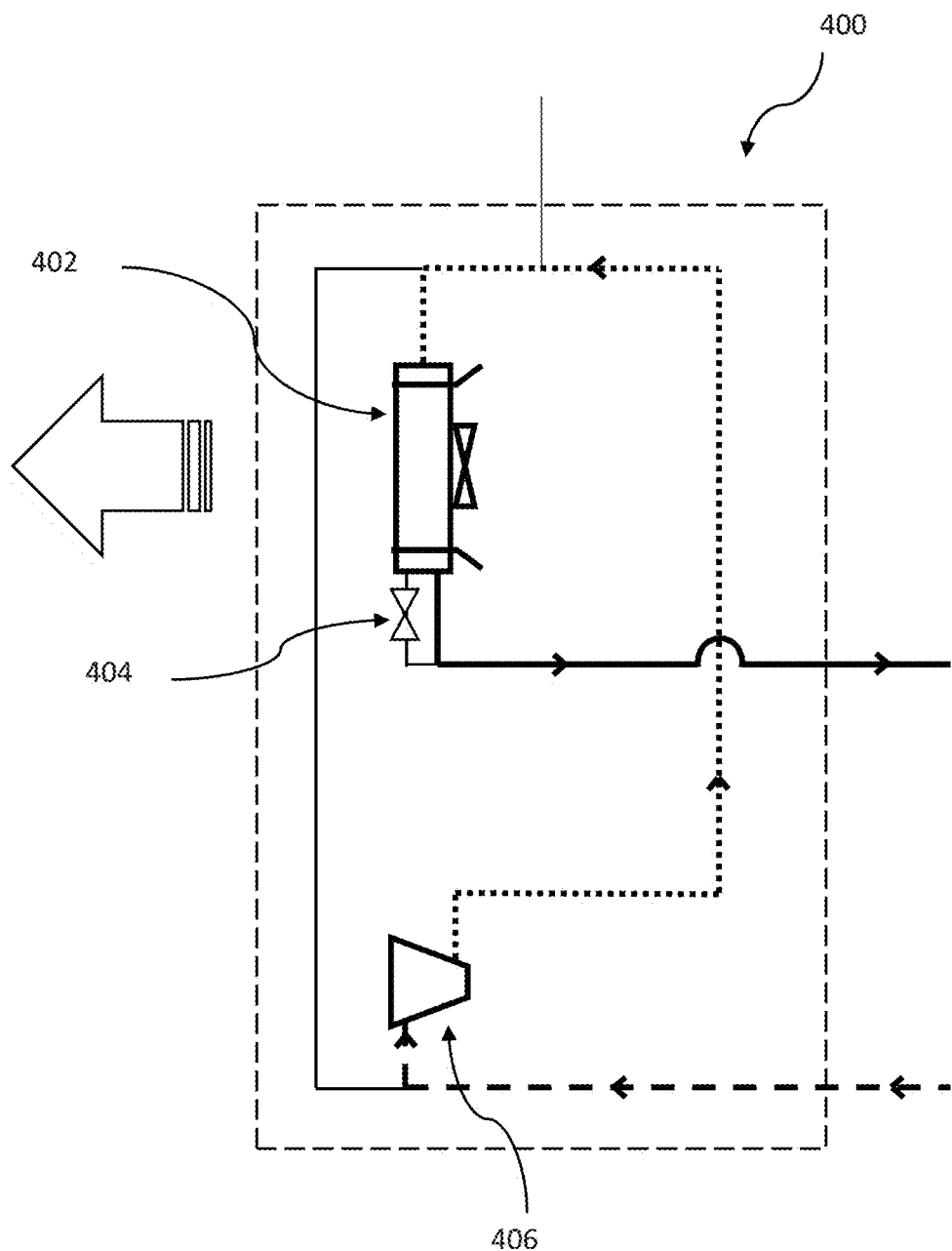

FIG. 4B illustrates how the condensing unit 400 can operate to provide cooling in the form of exiting high pressure liquid working fluid (i.e. to the liquid pressurizer/distributor or the like). In particular, the bolded lines (and arrows) depict the circulation of a working fluid. Incoming low pressure vapor working fluid is pressurized by the compressor 406 into a hotter high pressure vapor. The vapor then travels through the dual use evaporator/condenser 402 where it rejects its heat and condenses into a high pressure liquid. The resulting liquid then exits the condensing unit 400.

Figure 4C:
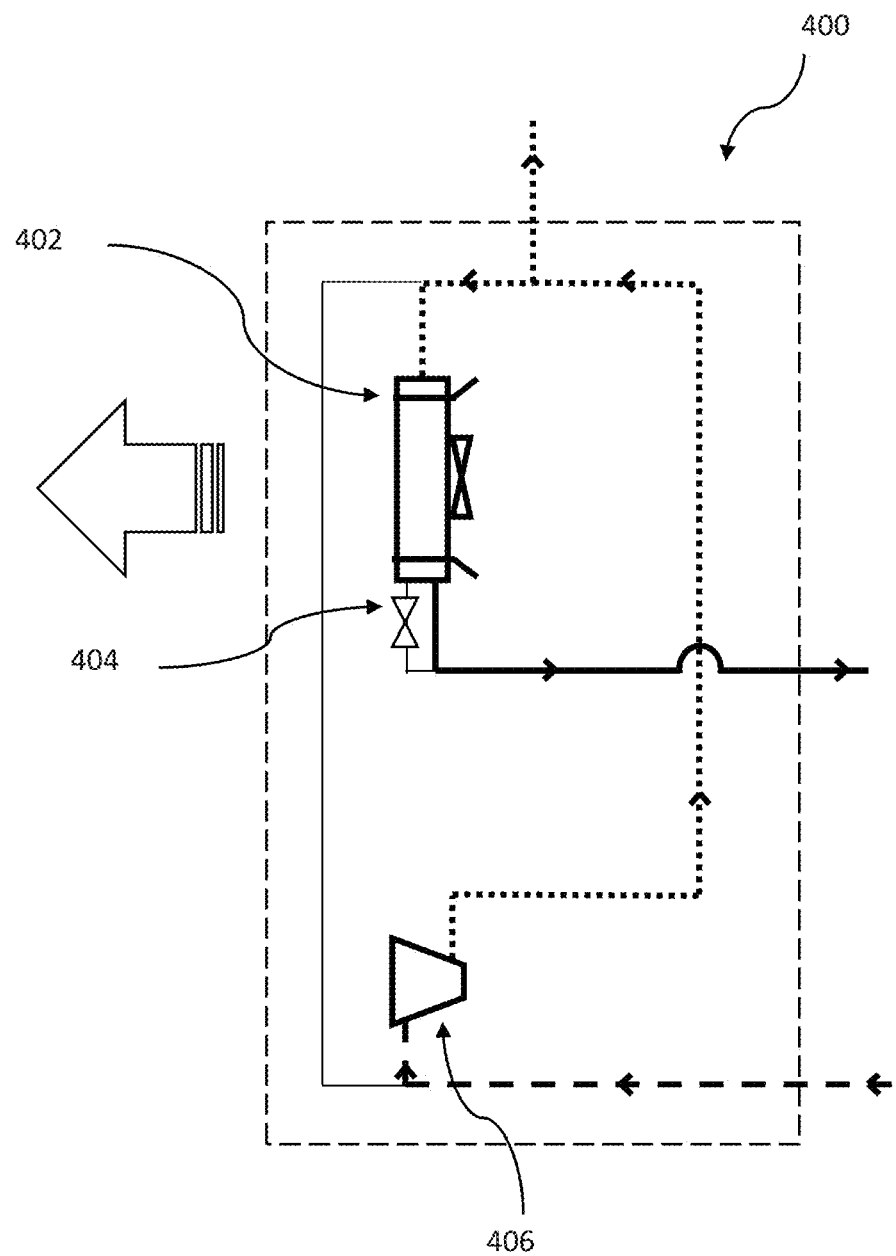

FIG. 4C illustrates how the condensing unit 400 can operate to provide mostly cooling with supplemental heating in the form of exiting high pressure liquid working fluid (i.e. to the liquid pressurizer/distributor or the like) and high pressure vapor phase working fluid (i.e to the discharge gas distributor or the target space or the like). In particular, the bolded lines (and arrows) depict the circulation of a working fluid. Incoming low pressure vapor working fluid is pressurized by the compressor 406 into a hotter high pressure vapor. Some portion of the vapor phase working fluid leaves the condensing unit 400 while another portion travels to the dual use evaporator/condenser 402 where it is condensed into liquid before exiting.

Figure 4D:
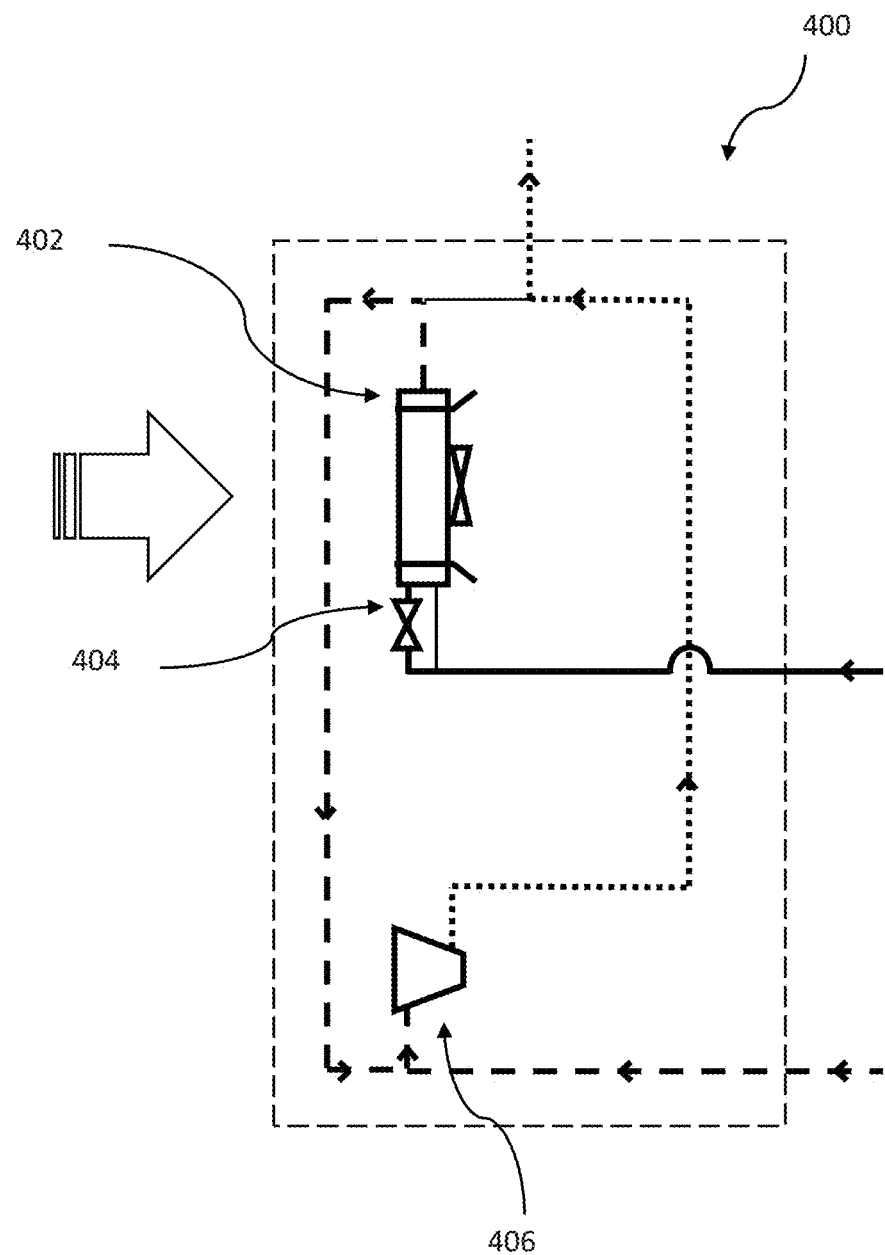

FIG. 4D illustrates how the condensing unit 400 can operate to provide heating with supplemental cooling in the form of exiting hot vapor phase working fluid (i.e to the discharge gas distributor or the target space or the like). During this operational mode the condensing unit 400 takes in low pressure vapor phase working fluid as well as high pressure liquid. The bolded lines (and arrows) depict the circulation of a working fluid. Incoming liquid phase working fluid travels through an expansion valve 404 and into the dual use evaporator/condenser 402 where it is evaporated into a low pressure gas. This gas stream then joins additional low pressure gas received by the condensing unit 400 (i.e. from a suction gas equalizer/distributor or the like) and is pressurized by the compressor 406. This hot high pressure vapor phase working fluid then exits the condensing unit 400.

Figure 4E:
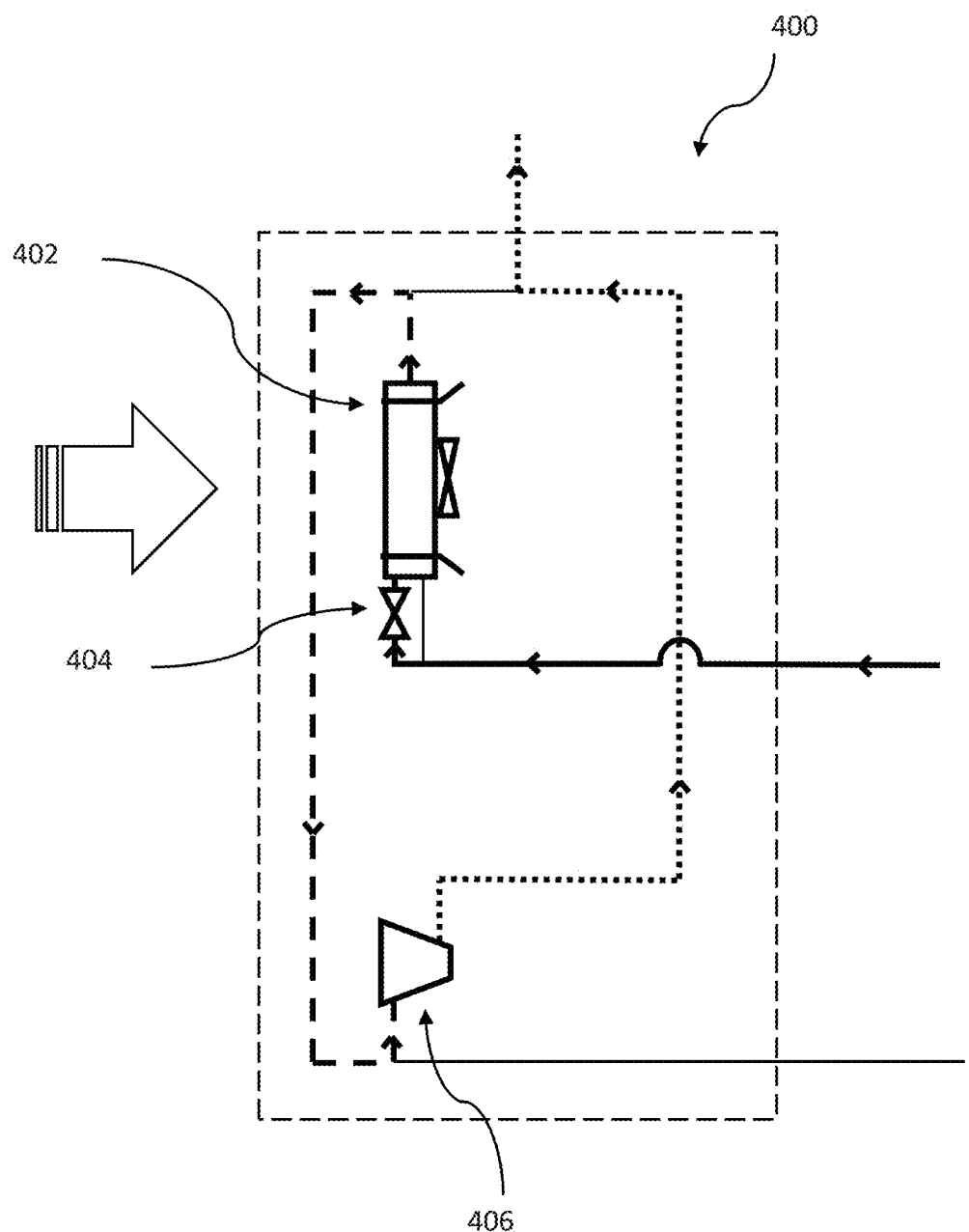

FIG. 4E illustrates how the condensing unit 400 can operate to provide heating in the form of exiting hot high pressure vapor phase working fluid (i.e. to the discharge gas/distributor or the like). In particular, the bolded lines (and arrows) depict the circulation of a working fluid. During this operational mode the condensing unit 400 takes in high pressure liquid. The bolded lines (and arrows) depict the circulation of a working fluid. Incoming liquid phase working fluid travels through an expansion valve 404 and into the dual use evaporator/condenser where it is evaporated into a low pressure gas. This gas stream is then pressurized by the compressor 406 and the resulting hot high pressure vapor phase working fluid then exits the condensing unit 400.

Figure 5:
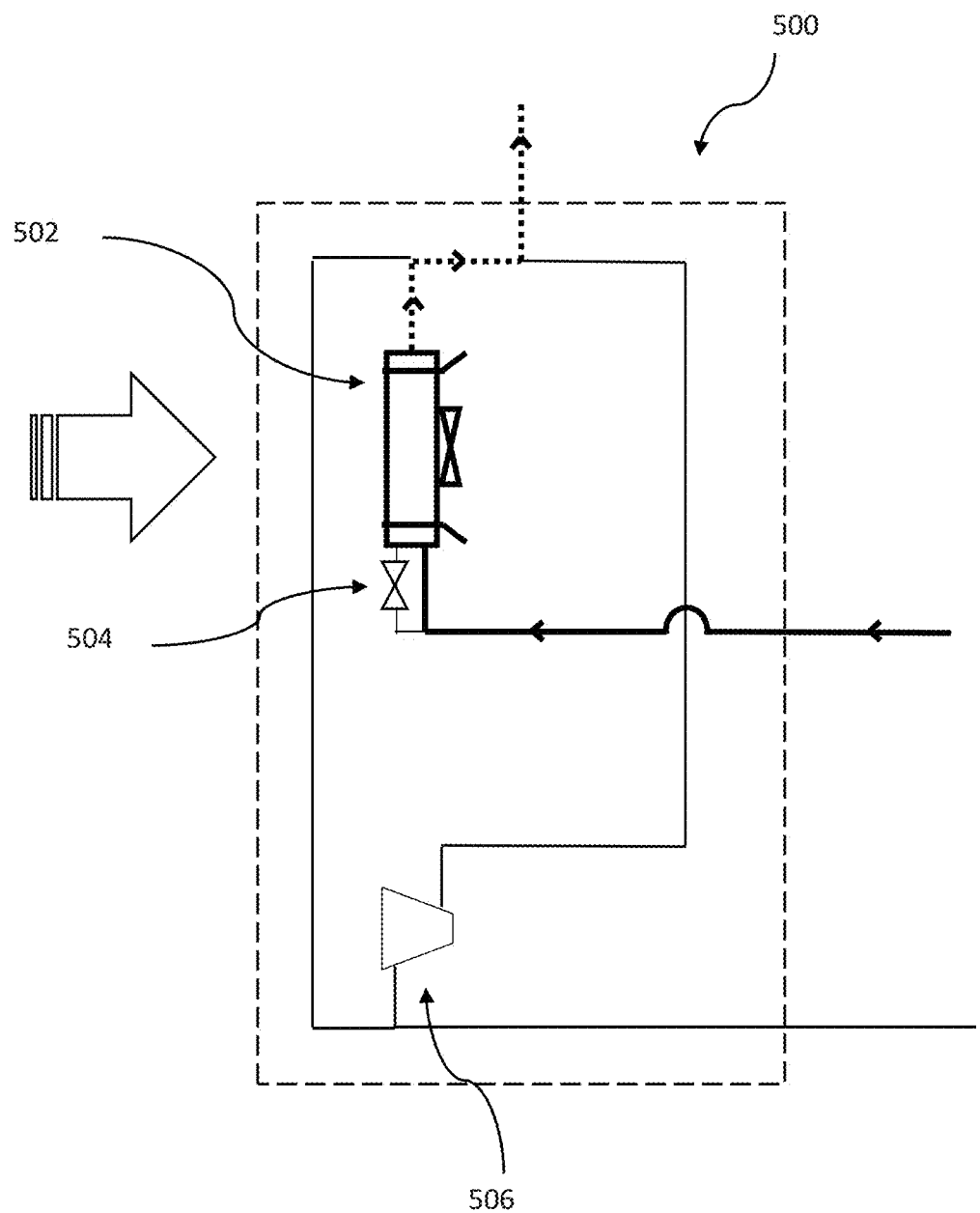
FIG. 5 illustrates a configuration for a condensing unit of robust air conditioning systems incorporating cold thermal energy storage devices operable to provide cooling and/or heating services in accordance with certain embodiments of the invention.

FIG. 5 illustrates a configuration for a condensing unit with integrated heating of robust air conditioning systems incorporating cold thermal energy storage devices operable to provide cooling and/or heating services. More specifically, the structure of the condensing unit with integrated heating 500 is similar to that seen with respect to FIG. 4A, insofar as it includes: a dual use condenser/evaporator 502, an expansion valve 504 and a compressor 506, all of which are operatively interconnected by piping. In operation, heating services in the form of hot vapor phase working fluid can be provide without the use of the compressor 506. Incoming high pressure liquid passes directly through the dual use evaporator/condenser 502 and boils before exiting the condensing unit with integrated heating 500. Though not depicted, other suitable components such as receivers, flow control valves, sensors, circulation devices, etc., can be added without departing from the scope of the condensing unit with integrated heating 500 in accordance with many embodiments.

Figure 6A:
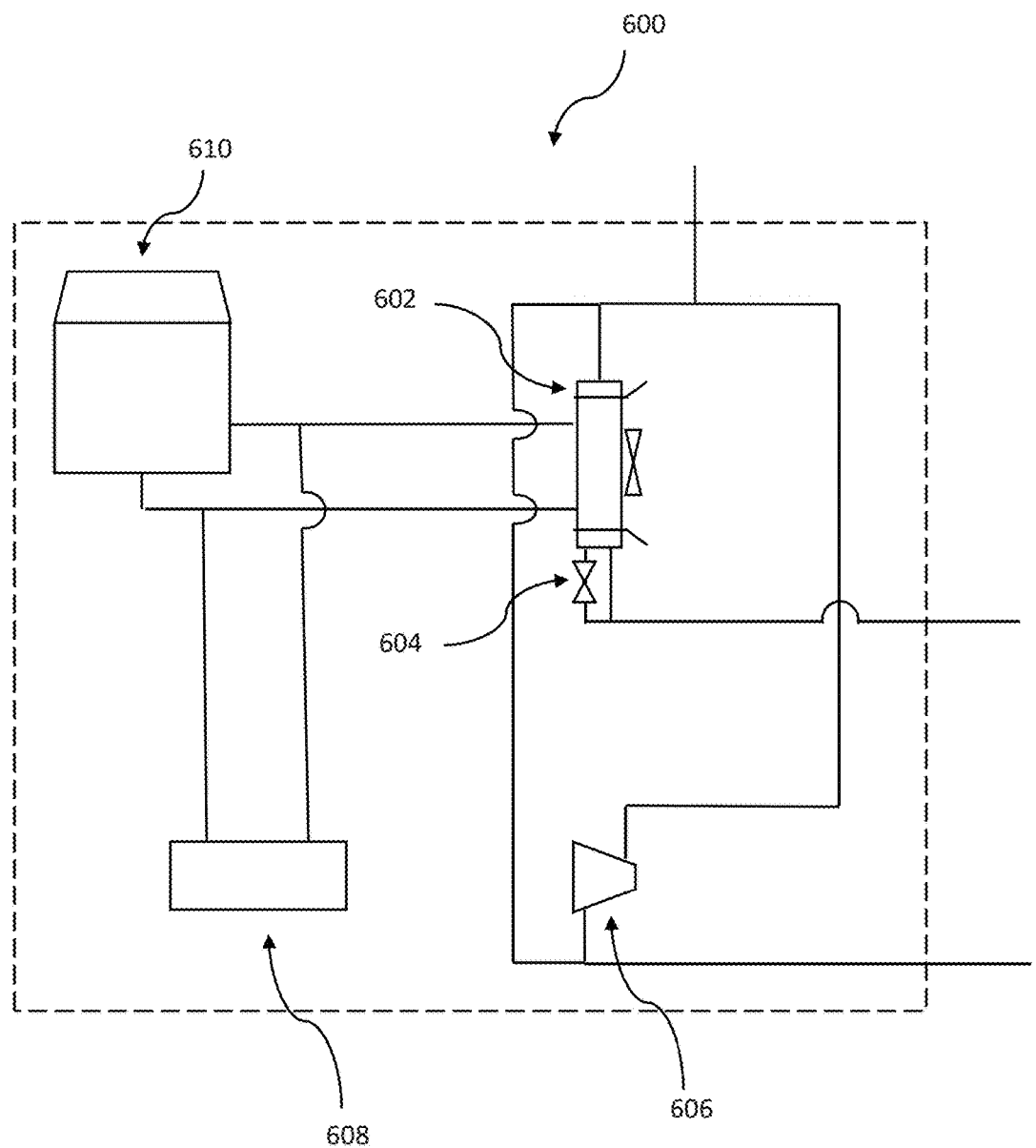
FIGS. 6A-6C illustrate a configuration for and operation of a condensing unit with a secondary heat transfer loop and integrated heat source of robust air conditioning systems incorporating cold thermal energy storage devices operable to provide cooling and/or heating services in accordance with certain embodiments of the invention.
Figure 6B:
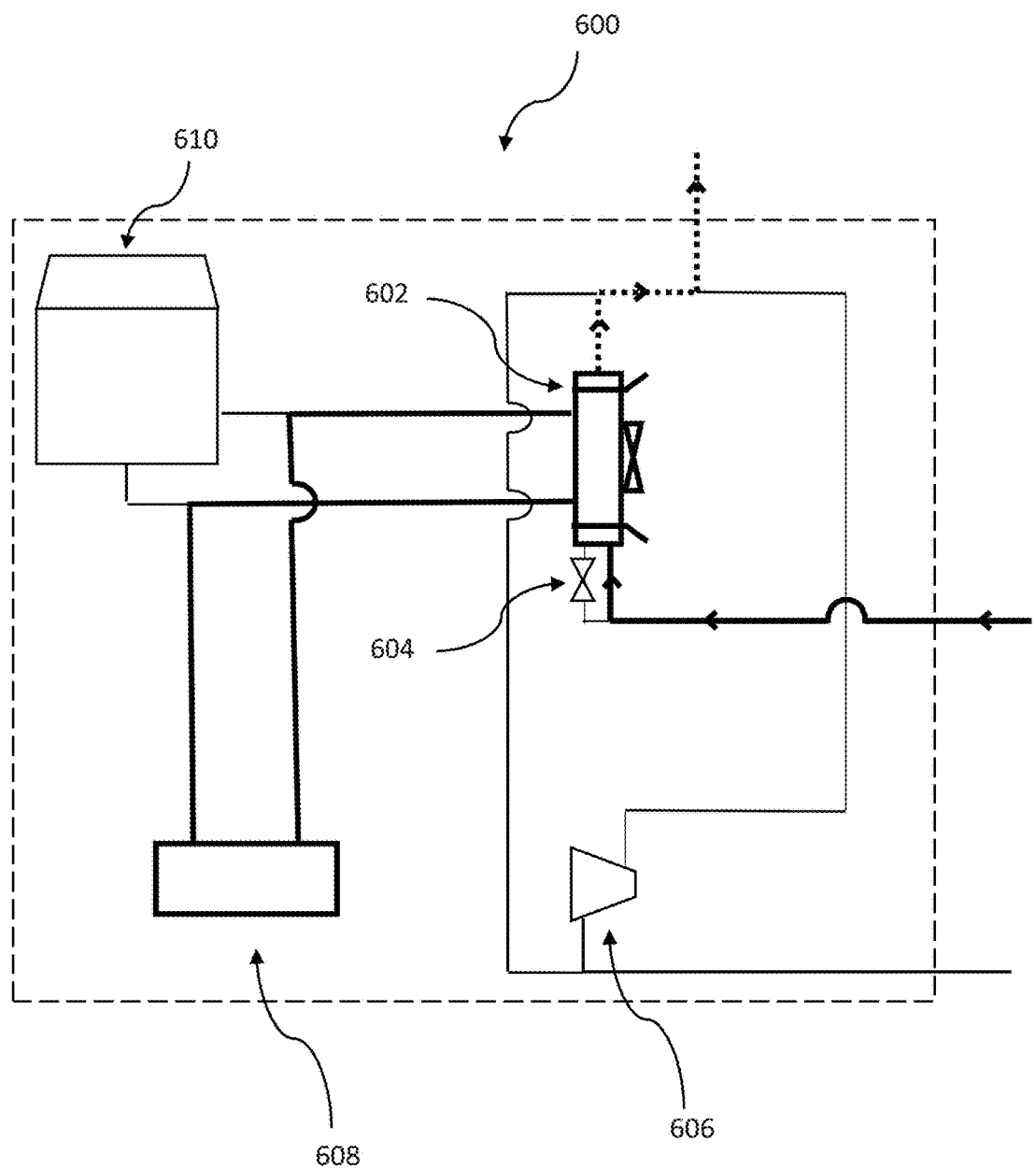
Figure 6C:
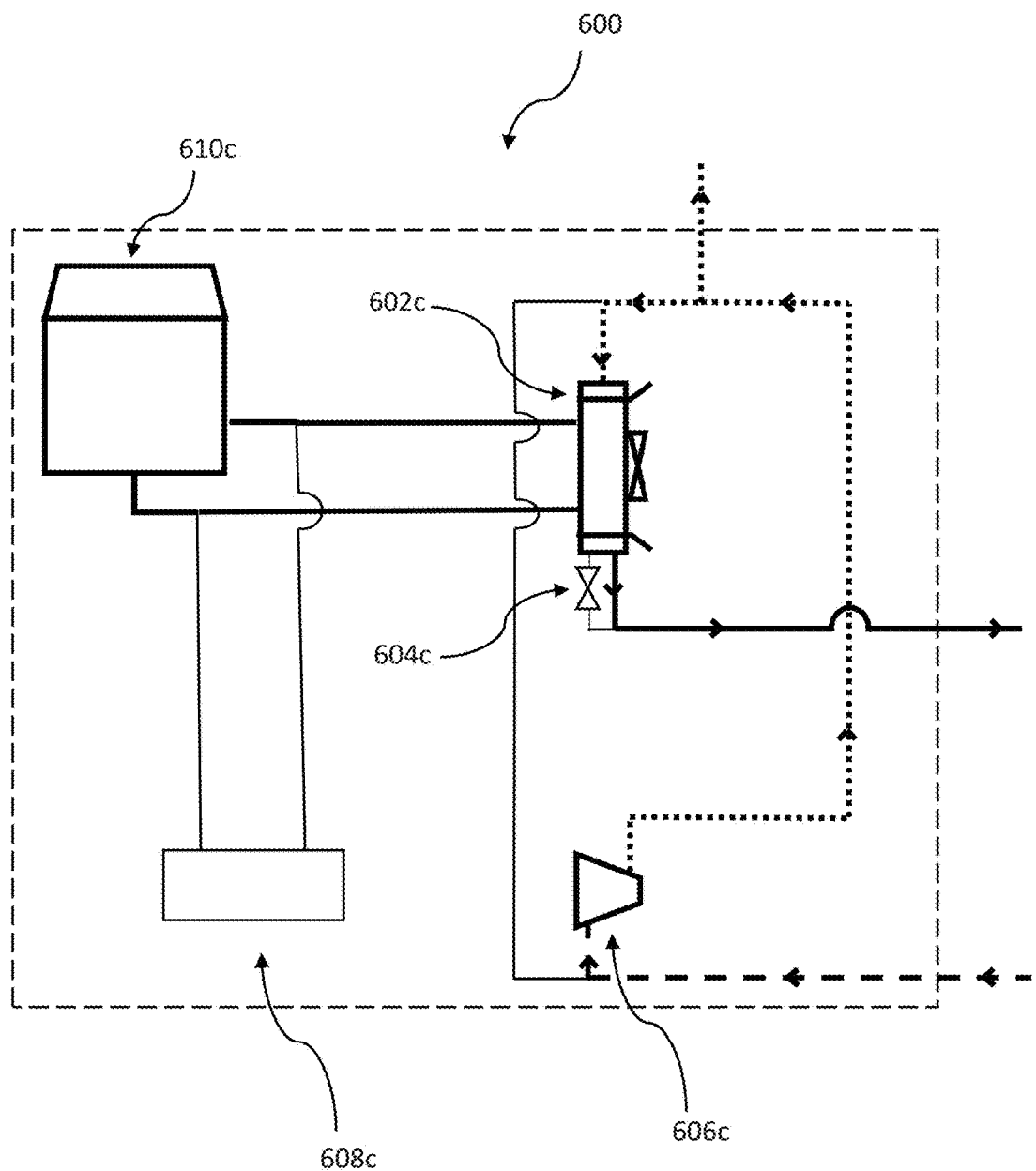

FIGS. 6A-6C illustrate a configuration for and operation of a condensing unit with a secondary heat transfer loop and integrated heat source of robust air conditioning systems incorporating cold thermal energy storage devices operable to provide cooling and/or heating services.

In particular, FIG. 6A illustrates the configuration of a condensing unit 600. More specifically, the structure of the condensing unit with integrated heating 600 is similar to that seen with respect to FIG. 4A insofar as it includes: a dual use condenser/evaporator 602, an expansion valve 604 and a compressor 606, all of which are operatively interconnected by piping. The condensing unit 600 additionally includes a fluid cooled condenser 610 and heat source 608 connected to the dual use evaporator/condenser by a secondary heat transfer fluid. Though not depicted, other suitable components such as receivers, flow control valves, sensors, circulation devices, etc. can be added without departing from the scope of the condensing unit with integrated heating 600 in accordance with many embodiments.

FIG. 6B depicts the condensing unit 600 in an integrated heating mode whereby the compressor is not required to run to provide hot high pressure vapor phase working fluid. In operation incoming high pressure liquid passes directly through the dual use evaporator/condenser 602 which boils before exiting the condensing unit with integrated heating 600. The dual use evaporator/condenser 602 is provided heat by the heat source 608 which is in thermal communication via a secondary heat transfer fluid.

FIG. 6C depicts the condensing unit 600 in heating and cooling mode whereby incoming low pressure vapor working fluid is pressurized by the compressor 606 into a hotter high pressure vapor. Some portion of the vapor phase working fluid leaves the condensing unit 600 while another portion travels to the dual use evaporator/condenser 602 where it is condensed into liquid before exiting. The dual use evaporator/condenser 602 removes heat from the working fluid by employing a fluid cooled condenser 610 which is in thermal communication via a secondary heat transfer fluid loop.

Figure 7:
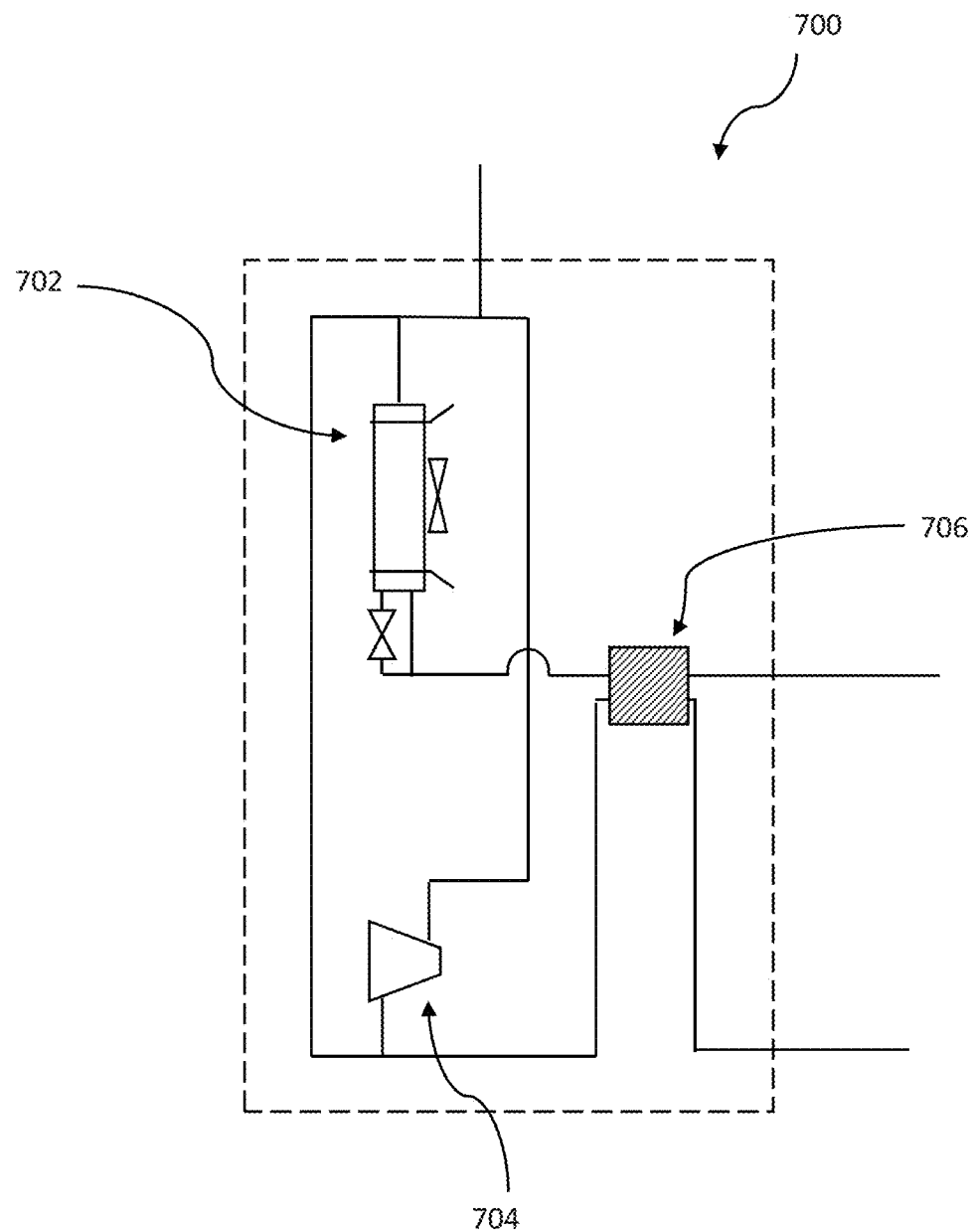
FIG. 7 illustrates a configuration for a condensing unit employing a suction line heat exchanger of robust air conditioning systems incorporating cold thermal energy storage devices in accordance with certain embodiments of the invention.

FIG. 7 illustrates a configuration for a condensing unit employing a suction line heat exchanger of robust air conditioning systems. In particular, FIG. 7 depicts the configuration of a condensing unit 700 the structure of which is similar to that seen with respect to FIG. 4A insofar as it includes: a dual use condenser/evaporator 702, an expansion valve 704 and a compressor 706, all of which are operatively interconnected by piping. The condensing unit 700 additionally employs a suction line heat exchanger 706. As can be appreciated, although not depicted, valves or other components can be incorporated to facilitate the operation of the condensing unit 700 and a condensing unit employing a suction line heat exchanger can be effectuated in any of a variety of ways in accordance with embodiments of the invention.

The suction line heat exchanger 706 generally operates to transfer heat between liquid phase working fluid and vapor phase working fluid. Although the suction line heat exchanger 706 is depicted schematically it should be appreciated that it can be implemented using any of a variety of schemes. For example, in many embodiments, the suction line heat exchanger 706 comprises a brazed plate heat exchanger. In another scheme, the suction line heat exchanger 706 comprises a spiral heat exchanger. In any case, it should be clear that any suitable heat exchanging device can be used as a suction line heat exchanger in accordance with embodiments of the invention.

While several examples of condensing units that are suitable for implementation within many of the above described robust air conditioning systems are described, it can be appreciated that any of a variety of condensing units can be implemented that are suitable for incorporation in a number of the above-described robust air conditioning systems in accordance with many embodiments of the invention.

Target Spaces for Implementation within Robust Air Conditioning Systems

In many embodiments, target spaces are implemented that are suitable to be incorporated within many of the above described air conditioning system configurations.

Figure 8:
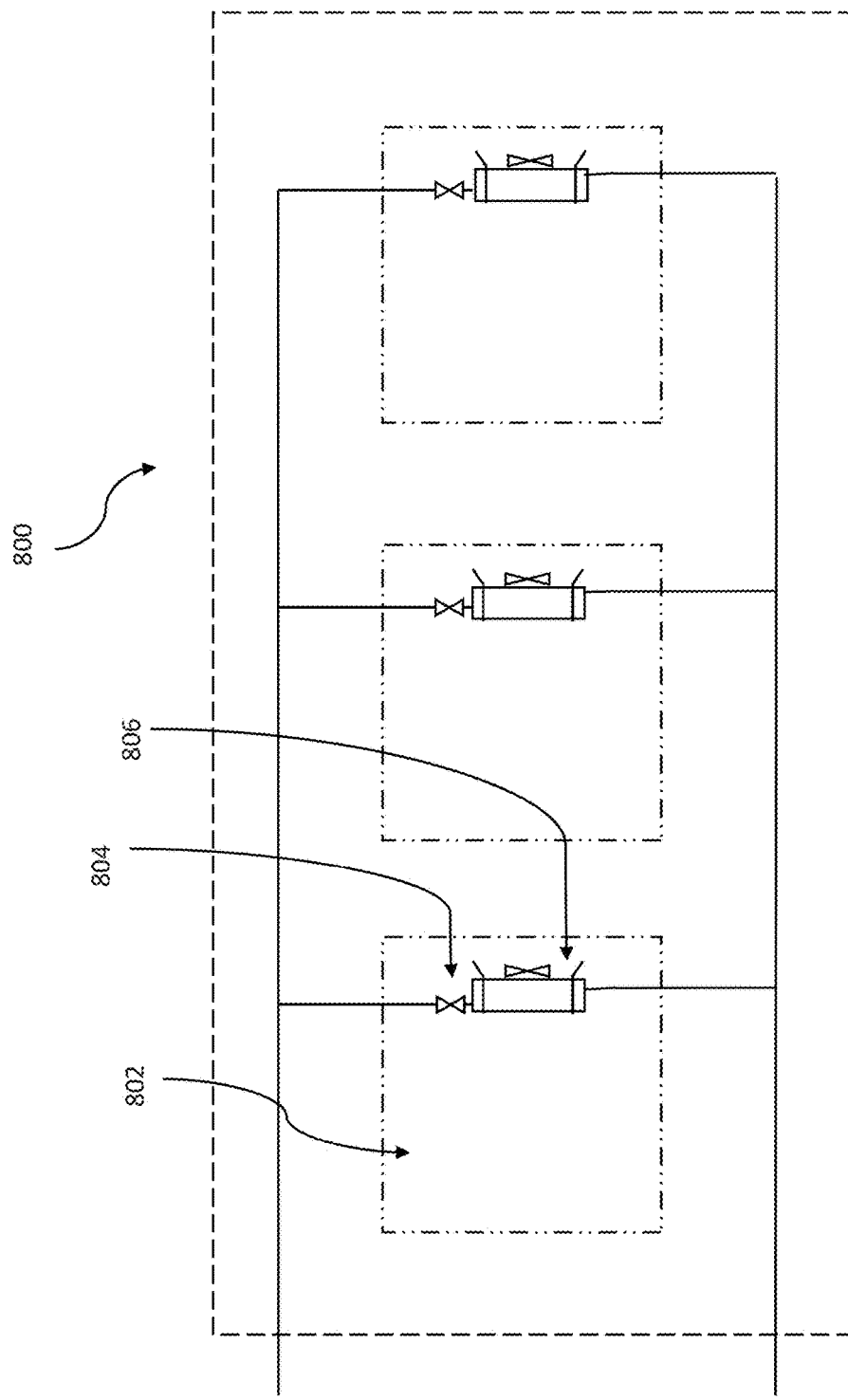
FIG. 8 depicts a configuration for a target space accepting cooling services of robust air conditioning systems incorporating cold thermal energy storage devices in accordance with certain embodiments of the invention.

For example, FIG. 8 depicts a configuration for a target space 800 which includes enclosures 802, expansion devices 804 and evaporators 806. In many embodiments the target space 800 is configured to accept pressurized liquid (i.e. from a liquid pressurizer/distributor ensemble or the like), expand it to a lower pressure via the expansion devices 804 and allow it to absorb heat from within the enclosures 802 via the evaporators 806. The low pressure vapor phase working fluid then exits the target space 800 (i.e. to a suction gas equalizer/distributor ensemble or the like). As can be appreciated, although not depicted, valves or other components can be incorporated to facilitate the operation of the target space 800 in accordance with many embodiments of the invention. Of course, to be clear, a target space can be effectuated in any of a variety of ways in accordance with embodiments of the invention.

The enclosures 802 of the target space 800 provide a designated volume in which thermal services are received. Although the enclosures 802 are depicted schematically it should be appreciated that they can be implemented using any of a variety of schemes. For example, in many embodiments, the enclosures 802 comprise refrigeration display cases. In another scheme, the enclosures comprise rooms in office buildings. In yet another scheme, the enclosures 802 comprise general areas or zones where thermal services are applied.

The expansion devices 804 generally operate to expand a higher pressure fluid to a lower pressure. Although the expansion devices 804 are depicted schematically it should be appreciated that they can be implemented using any of a variety of schemes. For example, in many embodiments, the expansion devices 804 comprise electronic expansion valves. In another scheme, the expansion devices 804 comprise turbines. In any case, it should be clear that any suitable devices can be used as an expansion devices in accordance with embodiments of the invention.

The evaporators 806 generally operate to exchange heat between a working fluid and some other media in a manner that extracts heat from the media and boils the working fluid. Although the evaporators 806 are schematically depicted it should be appreciated that they can be implemented using any of a variety of schemes. For example, in many embodiments, the evaporators 806 comprise coils of a thermally conductive material through which the working fluid passes. In another scheme, the evaporators 806 consist of a braze plate heat exchangers through which the working fluid and target media of the enclosures 802 are circulated.

Figure 9:
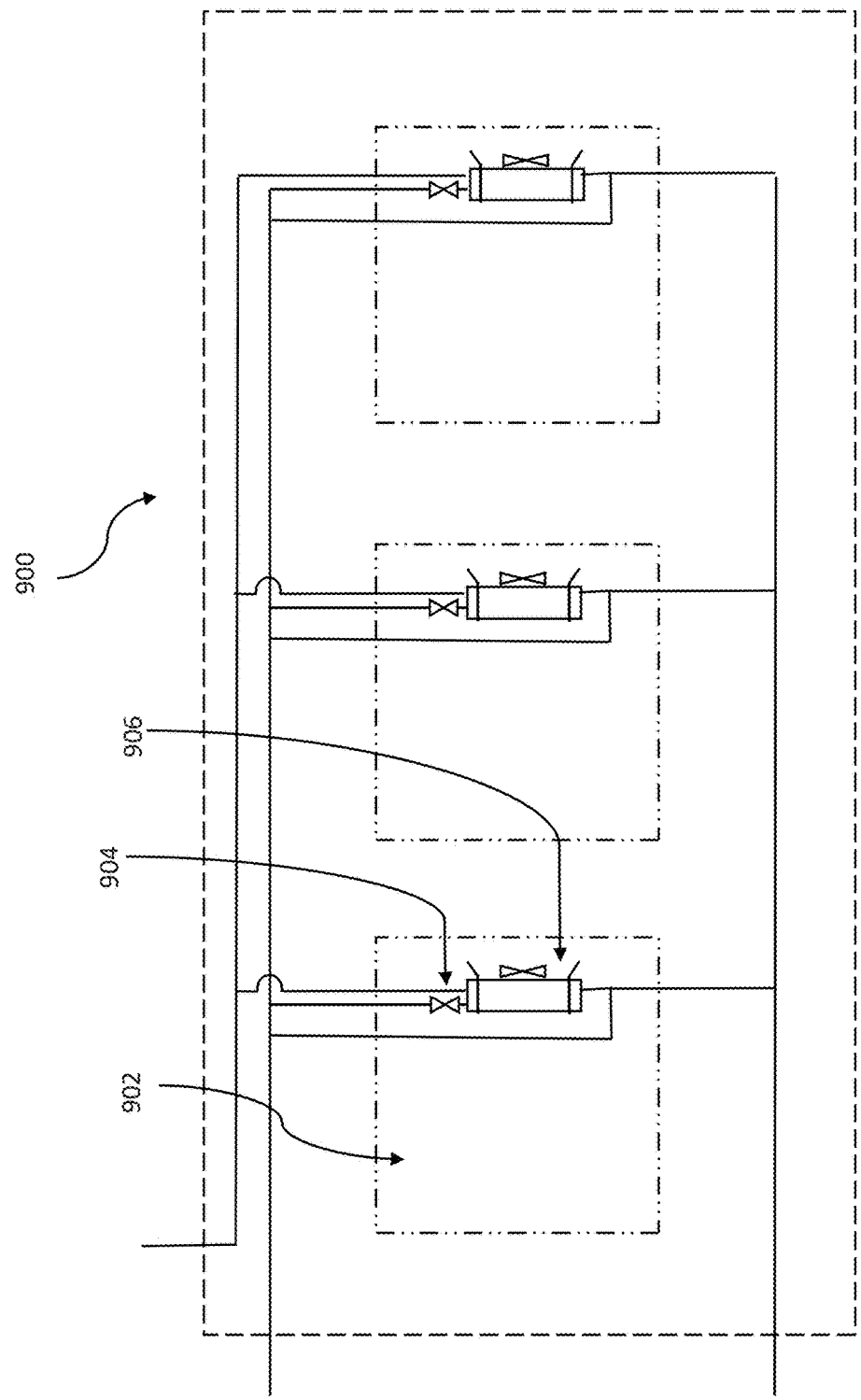
FIG. 9 illustrates a configuration of target space accepting heat and cooling services of robust air conditioning systems incorporating cold thermal energy storage devices in accordance with certain embodiments of the invention.

FIG. 9 illustrates a configuration of a target space 900 which is similar to that seen with respect to FIG. 8, insofar as it includes: enclosures 902, expansion valves 904. In addition the target space configuration 900 includes dual use evaporators/condensers 906. In operation the target space configuration 900 is able to provide cooling or heating to the enclosures 902 by either expanding an incoming liquid working fluid and evaporating it or condensing a higher pressure vapor phase working fluid. During cooling, flow is directed from a main liquid line to a specified dual use evaporators/condenser 906. The low pressure suction gas is then directed out of the target space 900 (i.e. to a suction gas equalizer/distributor ensemble or the like). During heating, hot vaporized working fluid is directed through the dual use evaporators/condensers 906 where it is condensed into a high pressure liquid and is sent to the shared liquid line. From the shared liquid line, liquid can be directed to another dual use evaporators/condenser to provide cooling or leave the target space (e.g. to the liquid pressurizer/distributor ensemble or the like) to be reheated to provide continued heating services. As can be appreciated, although not depicted, valves or other components can be incorporated to facilitate the operation of the target space 900 in accordance with many embodiments of the invention. Of course, to be clear, a target space can be effectuated in any of a variety of ways in accordance with embodiments of the invention.

Figure 10:
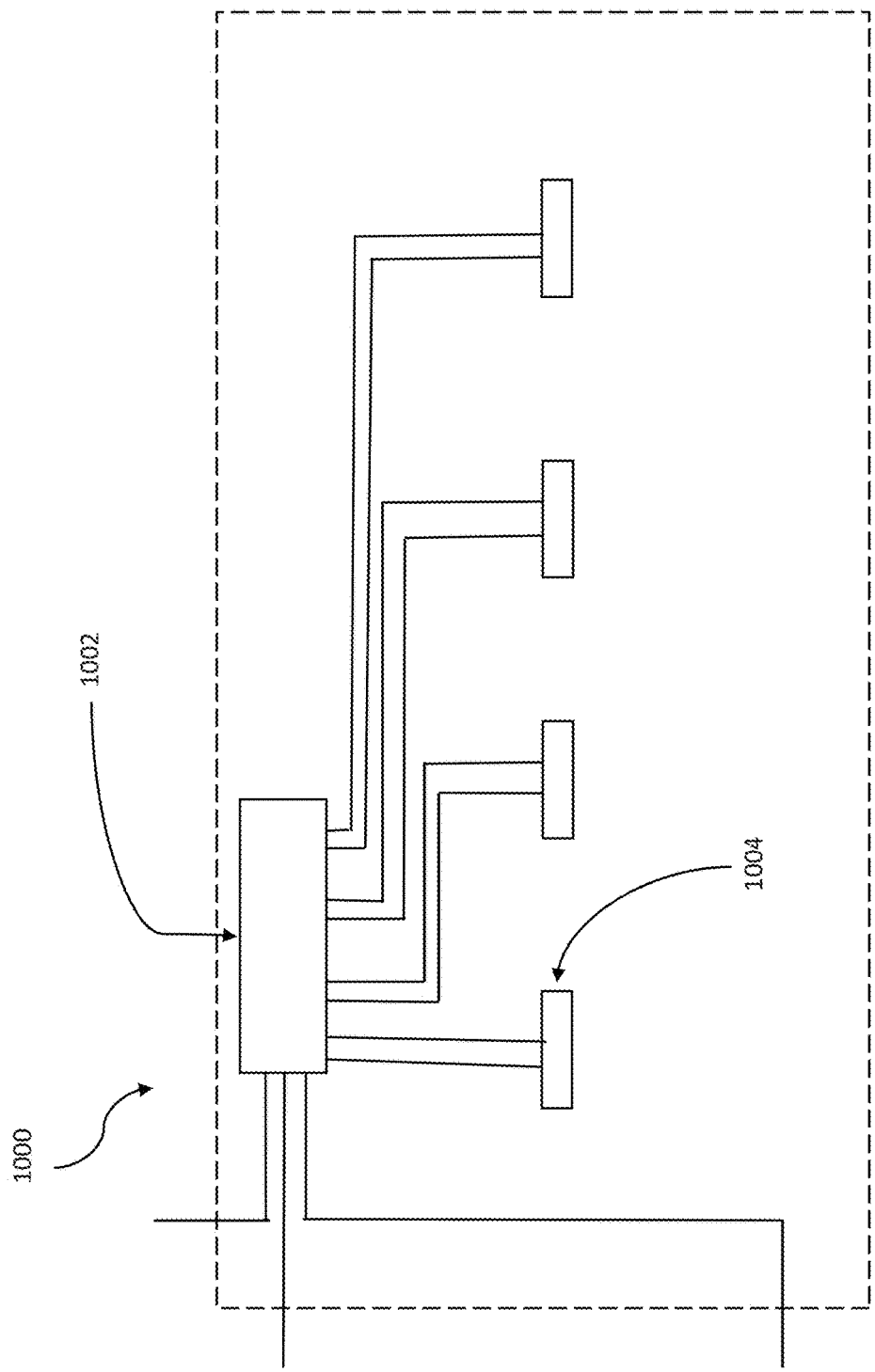
FIG. 10 illustrates a target space utilizing a branch selectors and terminal units of robust air conditioning systems incorporating cold thermal energy storage devices in accordance with certain embodiments of the invention.

FIG. 10 illustrates a target space utilizing a branch selectors and terminal units 1000. The target space 1000 consists of a branch selector 1002 and terminal units 1004 whereby the branch selector 1002 is connected to terminal units 1004 by piping. In operation the target space 1000 takes in hot pressurized vapor and high pressure liquid working fluid which is directed to a branch connectors 1002. At the branch selector, either a liquid phase or gas phase working fluid is directed to the terminal units 1004 depending on their individual heating or cooling requirements. Either a low pressure vapor or a high pressure liquid working fluid returns from the terminal unit 1004. In the case that liquid is returned it may be reused by other terminal units 1004 connected to the branch selector as needed. As can be appreciated, although not depicted, valves or other components can be incorporated to facilitate the operation of the target space 1000 in accordance with many embodiments of the invention.

While several examples of target spaces that are suitable for implementation within many of the above described robust air conditioning systems are described, it can be appreciated that any of a variety of target spaces can be implemented that are suitable for incorporation in a number of the above-described robust air conditioning systems in accordance with many embodiments of the invention.

Liquid Pressurizer and Distributor Ensembles for Implementation within Robust Air Conditioning Systems In many embodiments, liquid pressurizer and distributor ensembles are implemented that are suitable to be incorporated within many of the above described air conditioning system configurations.

Figure 11:
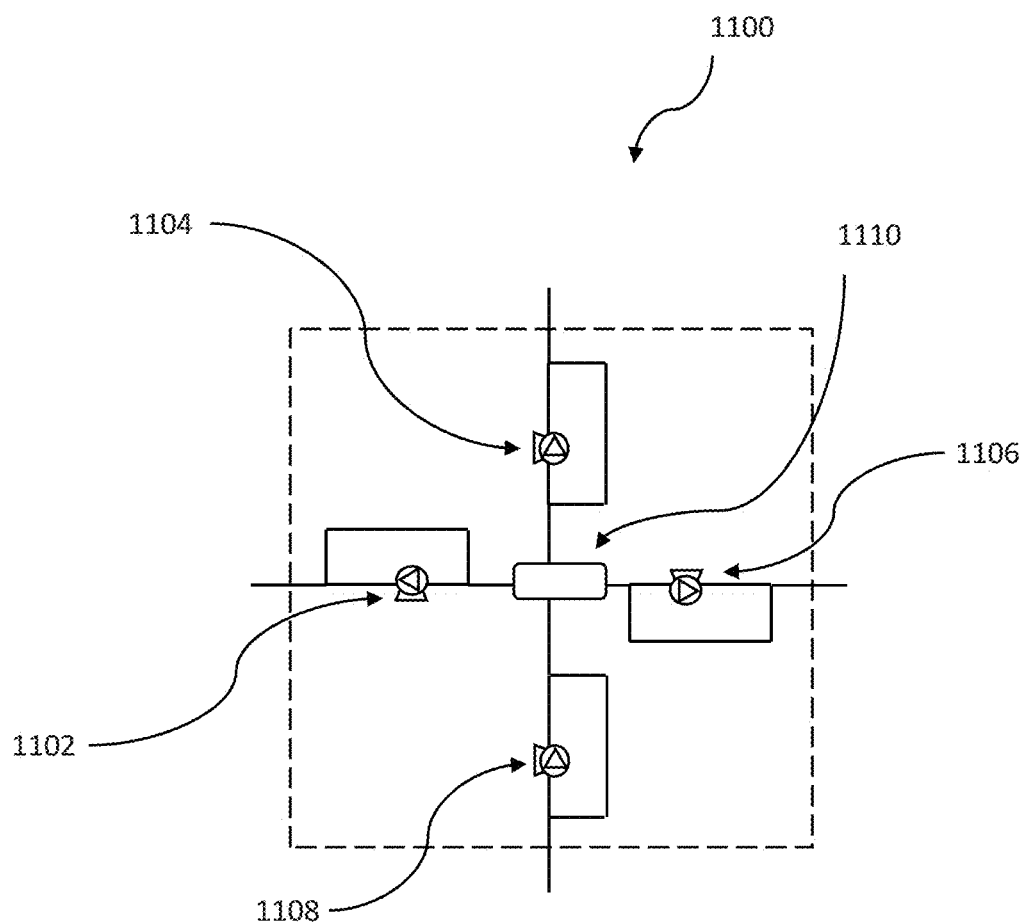
FIG. 11. Illustrates a configuration for a liquid pressurizer and distributor ensemble of robust air conditioning systems incorporating cold thermal energy storage devices in accordance with certain embodiments of the invention.

FIG. 11 Illustrates a configuration for a liquid pressurizer and distributor ensemble 1100 which includes pressurizing devices 1102, 1104, 1106, and 1108 and a liquid receiver 1110. In many embodiments the liquid pressurizer and distributor ensemble is configured to accept liquid working fluid from any of its branches, store it temporarily in the receiver 1110, pressurize the working fluid via any of its pressurizing devices 1102, 1104, 1106 and 1108 to required specifications and distribute it to the appropriate connected robust air condition system component. In many embodiments, a liquid pressurizer and distributor ensemble requires fewer pressurizing devices and/or no receiver. Although the liquid pressurizer and distributor ensemble 1100 is depicted schematically, it should be clear that a liquid pressurizer and distributor ensemble 1100 can be effectuated in any of a variety of ways in accordance with embodiments of the invention. As can be appreciated, although not depicted, valves or other inline components can be incorporated to facilitate the operation of the liquid pressurizer and distributor ensemble 1100 in accordance with many embodiments of the invention.

The pressurizing devices 1102, 1104, 1106, and 1108 generally operate to add pressure to an incoming stream of liquid. Although the pressurizing devices 1102, 1104, 1106, and 1108 are depicted schematically, it should be appreciated that they can be implemented using a variety of schemes. For example, in many embodiments, the pressurizing devices 1102, 1104, 1106, and 1108 comprise kinetic pumping devices. In another scheme, the pressurizing devices 1102, 1104, 1106, and 1108 comprise positive displacement pumping devices.

The receiver 1110 generally operates to provide a buffer storage volume to the working fluid circuit as to enable the pressurizing devices 1102, 1104, 1106, and 1108 to operate smoothly irrespective of the inlet conditions to the liquid pressurizer and distributor ensemble. Although the receiver 1110 is schematically depicted, it should be appreciated it can be implemented using a variety of schemes. For example, in many embodiments, the receiver 1110 comprises a pressure vessel. In another scheme, the receiver comprises extended piping.

While several examples of liquid pressurizer and distributor ensembles that are suitable for implementation within many of the above described robust air conditioning systems are described, it can be appreciated that any of a variety of liquid pressurizer and distributor ensembles can be implemented that are suitable for incorporation in a number of the above-described robust air conditioning systems in accordance with many embodiments of the invention.

Cold Thermal Energy Storage Units for Implementation within Robust Air Conditioning Systems In many embodiments, cold thermal energy storage units are implemented that are suitable to be incorporated within many of the above described air conditioning system configurations.

Figure 12A:
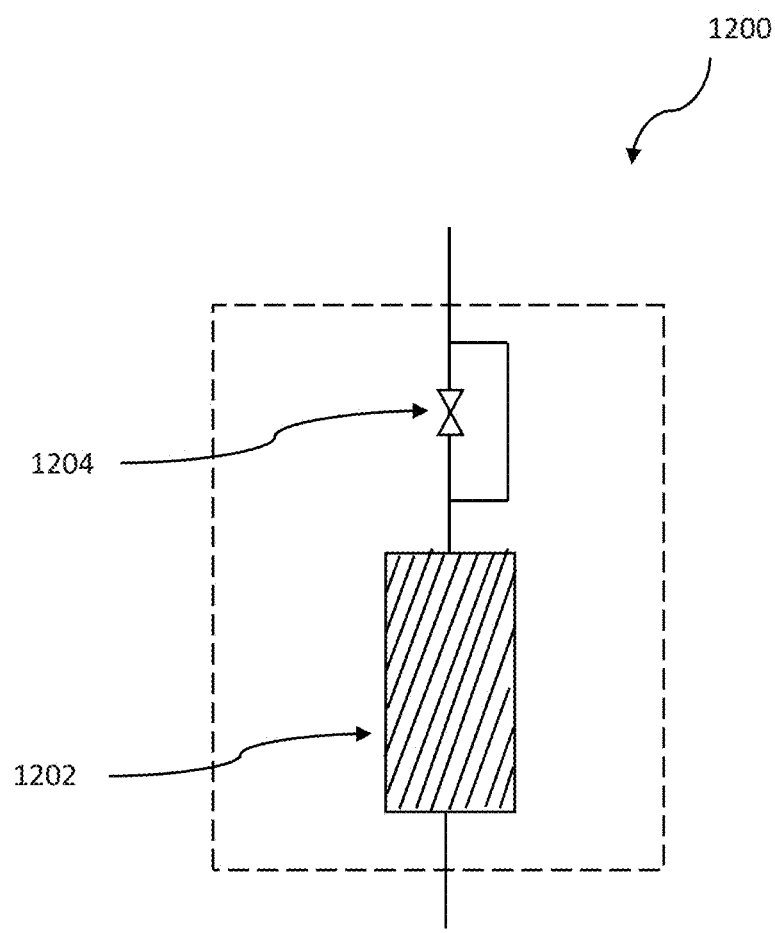
FIGS. 12A-12C illustrate a cold thermal store of robust air conditioning systems incorporating cold thermal energy storage devices in accordance with certain embodiments of the invention.
Figure 12B:
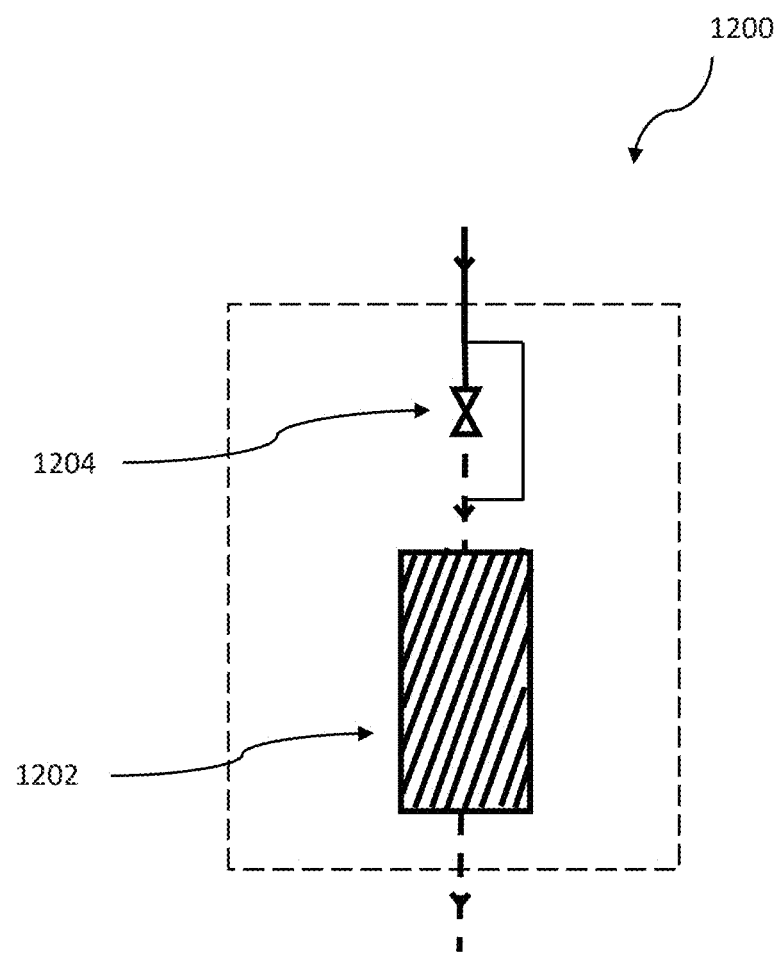
Figure 12C:
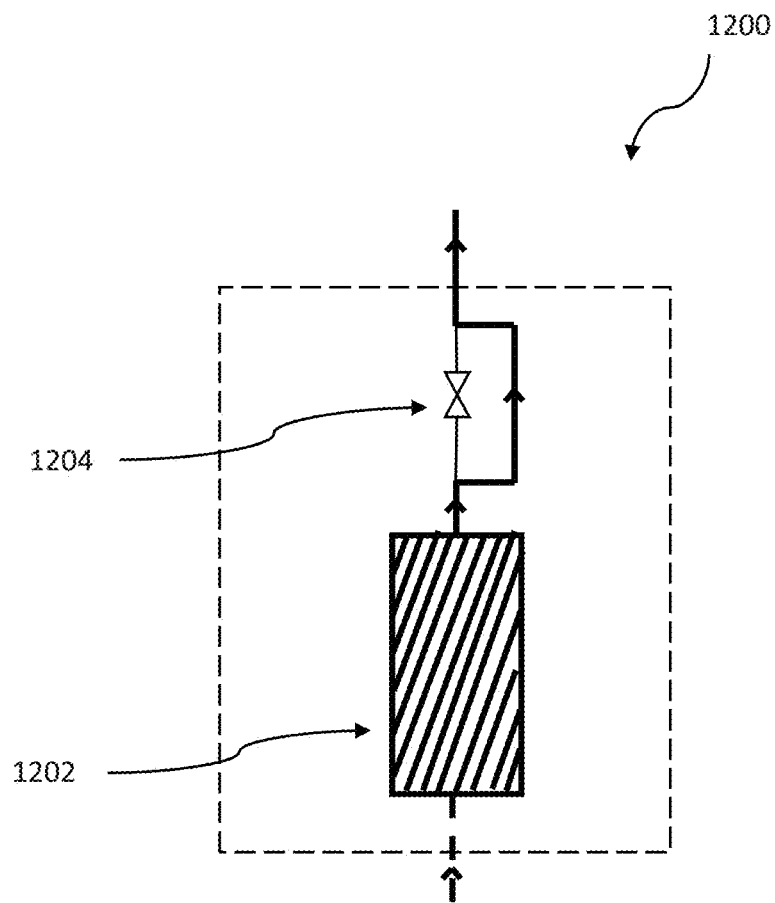

For example, FIGS. 12A-12C illustrate a configuration for and operation of a cold thermal store (in general, within the context of the instant application, the terms "thermal store" and "thermal energy storage unit" are synonymous) of robust air conditioning systems. In operation, a cold thermal store of a robust air conditioning systems can function in the three distinct modes of being unused, charging, and discharging represented by FIGS. 12A, 12B and 12C respectively.

In particular, FIG. 12A illustrates the configuration of a cold thermal store 1200 which includes a cold storage medium 1202 and an expansion device 1204, all of which are operatively interconnected by piping. As is the case with all figures, although not depicted, valves can be incorporated to facilitate the operation of the cold thermal store 1200 in accordance with many embodiments of the invention.

The cold storage medium 1202 generally operates to store thermal potential in the sensible or latent heat of an embedded material. Although the cold storage medium 1202 is depicted schematically it should be appreciated that it can be implemented using any of a variety of schemes. For example, in many embodiments, the cold storage medium 1202 comprises a heat exchanger in thermal contact with an embedded phase change material. In another scheme, the cold storage medium 1202 comprises an insulated bulk material through which circulating refrigerant can directly pass. Of course, to be clear, a cold thermal store can be effectuated in any of a variety of ways in accordance with embodiments of the invention.

The expansion device 1204 generally operates to expand a higher pressure fluid to a lower pressure. Although the expansion device 1204 is depicted schematically it should be appreciated that it can be implemented using any of a variety of schemes. For example, in many embodiments, the expansion device 1204 comprises an electronic expansion valve. In another scheme, the expansion device 1204 comprises a turbine. In any case, it should be clear that any suitable device can be used as an expansion device in accordance with embodiments of the invention.

FIG. 12B illustrates how the cold thermal store 1200 can operate to store thermal potential for later use. In particular, the bolded lines (and arrows) depict the circulation of a working fluid so as to direct fluid to cool the cold storage medium 1202. More specifically, in the illustrated embodiment, the expansion device 1204 acts to expand incoming high pressure liquid phase working fluid (e.g. from a liquid pressurizer/distributor ensemble or the like) to a lower pressure and temperature. The working fluid then passes into the cold storage medium 1202 which is cooled as the working fluid absorbs heat and is evaporated. The low pressure, low temperature gas then passes out of cold thermal store 1200 (e.g. to a suction gas equalizer/distributor ensemble or the like).

FIG. 12C illustrates how the cold thermal store 1200 can operate to release stored thermal potential on demand. In particular, the bolded lines (and arrows) depict the circulation of a working fluid so as to release the stored thermal potential in the cold storage medium 1202 and provide condensed liquid working fluid (e.g. to a liquid pressurizer/distributor ensemble or the like). More specifically, in the illustrated embodiment, cold low pressure gas working fluid enters the cold storage medium 1202 (e.g from a suction gas equalizer/distributor ensemble or the like) and is condensed into a low pressure liquid which then leaves the cold thermal store 1200. Though not depicted, other suitable components such as receivers, valves, and sensors can be added without departing from the scope of the cold thermal store 1200 in accordance with many embodiments.

Figure 13A:
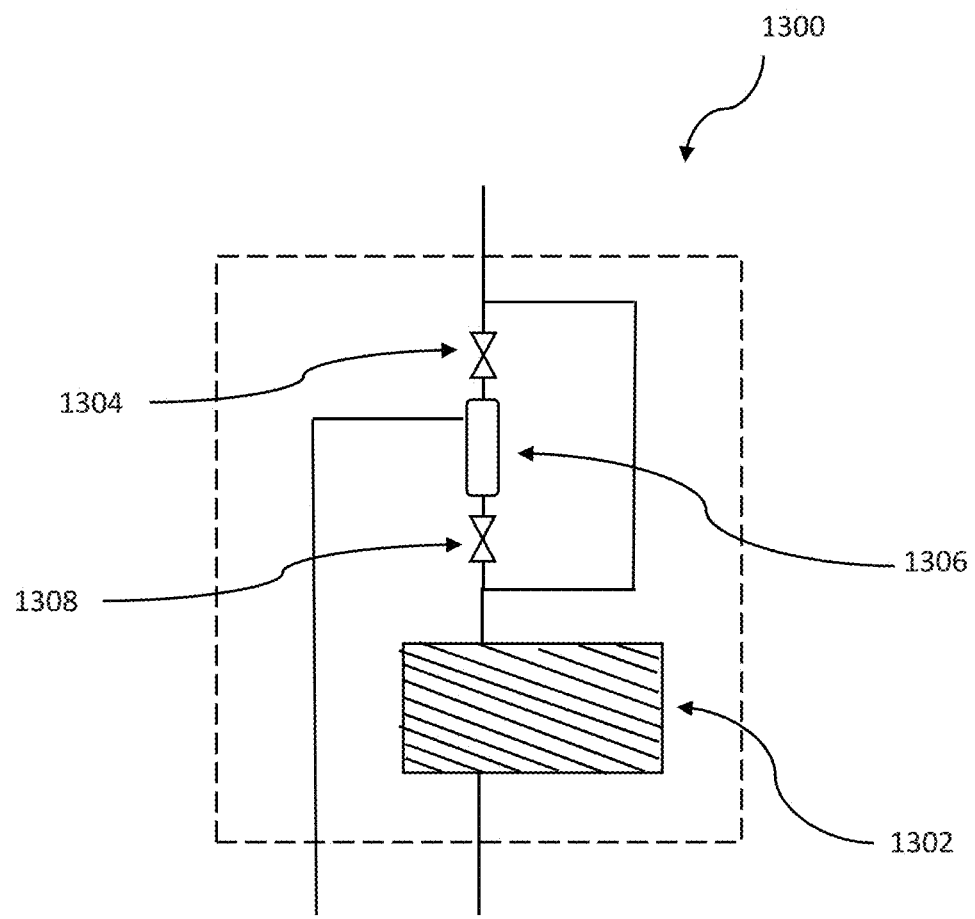
FIGS. 13A-13C illustrate a cold thermal store employing two stage expansion of robust air conditioning systems incorporating cold thermal energy storage devices in accordance with certain embodiments of the invention.
Figure 13B:
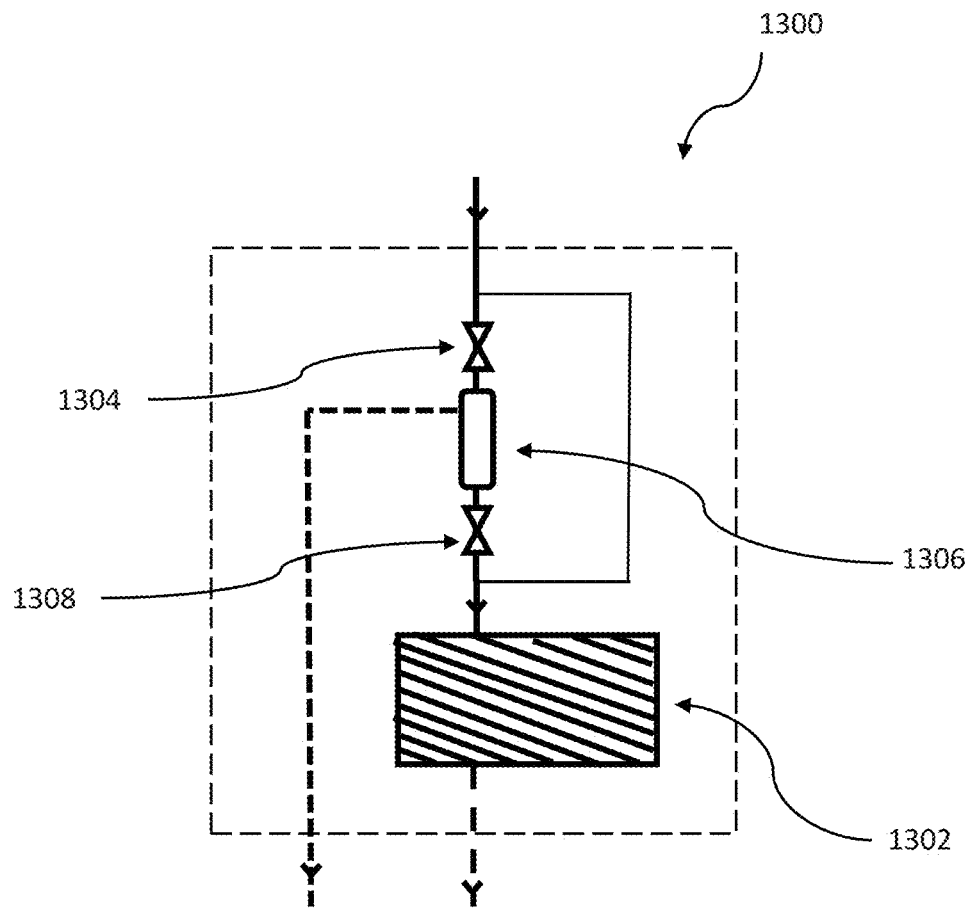
Figure 13C:
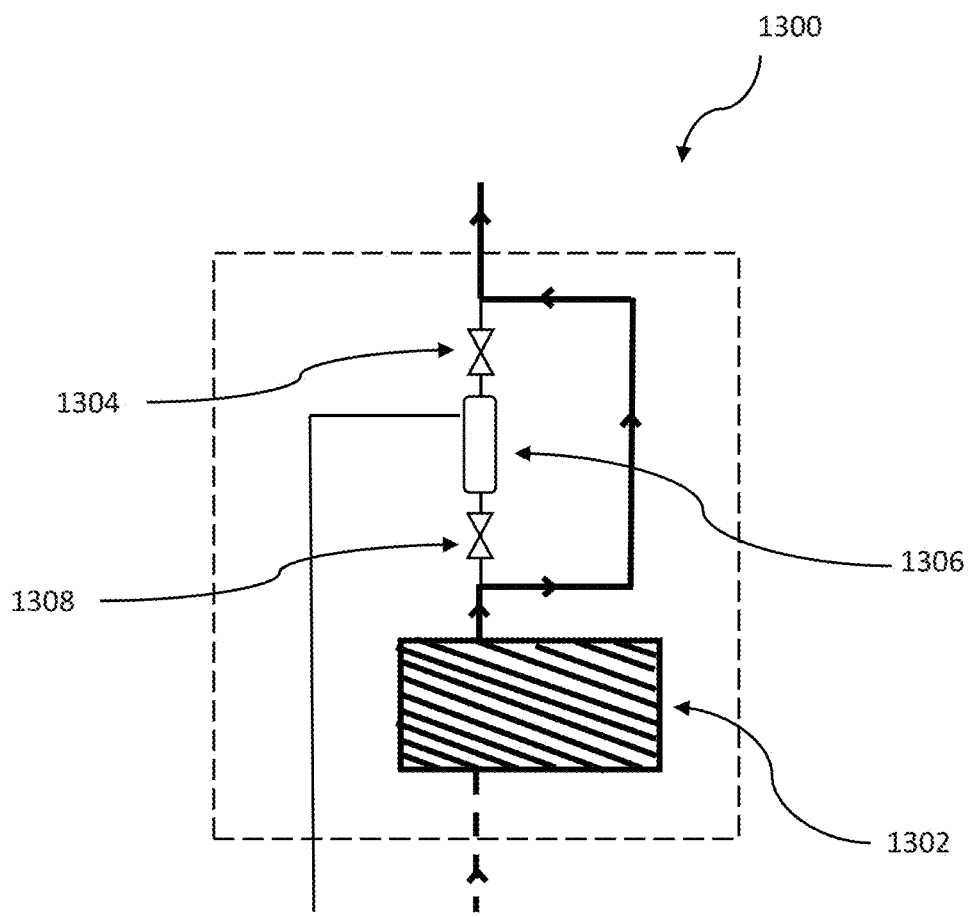

FIGS. 13A-13C illustrate a configuration for and operation of a cold thermal store employing two stage expansion of robust air conditioning systems. In operation, a cold thermal store employing two stage expansion can function in the three distinct modes of being unused, charging, and discharging represented by FIGS. 13A, 13B and 13C respectively.

In particular, FIG. 13A illustrates the configuration of a cold thermal store 1300. More specifically, the structure of the cold thermal store 1300 is similar to that seen with respect to FIG. 12A, insofar as it includes: a cold storage medium 1302 and an expansion device 1304. The cold thermal store 1300 further includes a second expansion device 1308 and a liquid gas separator 1306 that can separate a mixed phase flow into its constituent liquid and gas phases with some effectiveness. Components are operatively interconnected by piping in accordance with many embodiments. Though not depicted, other suitable components such as receivers, flow control valves, sensors and circulation devices can be added without departing from the scope of the cold thermal store 1300 in accordance with many embodiments.

FIG. 13B illustrate the operation of the cold thermal store 1300 to store thermal potential for later use. In particular, the bolded lines (and arrows) depict the circulation of a working fluid so as to direct fluid (i.e. from a liquid pressurizer/distributor ensemble or the like) to cool the cold storage medium 1302. More specifically, in the illustrated embodiment, the expansion device 1304 acts to expand incoming liquid phase working fluid that is high pressure into a lower pressure and temperature. The likely mixed phase working fluid is then separated into liquid and gas streams. The gas stream exits at an intermediate pressure (i.e. to a suction gas equalizer/distributor ensemble or the like). The remaining liquid is expanded again by the second expansion device 1308 to a lower pressure and temperature. The working fluid then passes into the cold storage medium 1302 which is cooled as the working fluid absorbs heat and is evaporated. The low pressure, low temperature gas then passes out of cold thermal store 1300 via a separate line at a lower pressure (i.e. to a suction gas equalizer/distributor ensemble or the like).

FIG. 13C illustrates how the cold thermal store 1300 can operate to release stored thermal potential on demand. In particular, the bolded lines (and arrows) depict the circulation of a working fluid so as to release the stored thermal potential in the cold storage medium 1302 and provide condensed liquid working fluid (i.e. to a liquid pressurizer/distributor ensemble). More specifically, in the illustrated embodiment, cold low pressure gas working fluid enters the cold storage medium 1302 (e.g. from a suction gas equalizer/distributor ensemble) and is condensed into a low pressure liquid which then leaves the cold thermal store 1300.

Figure 14A:
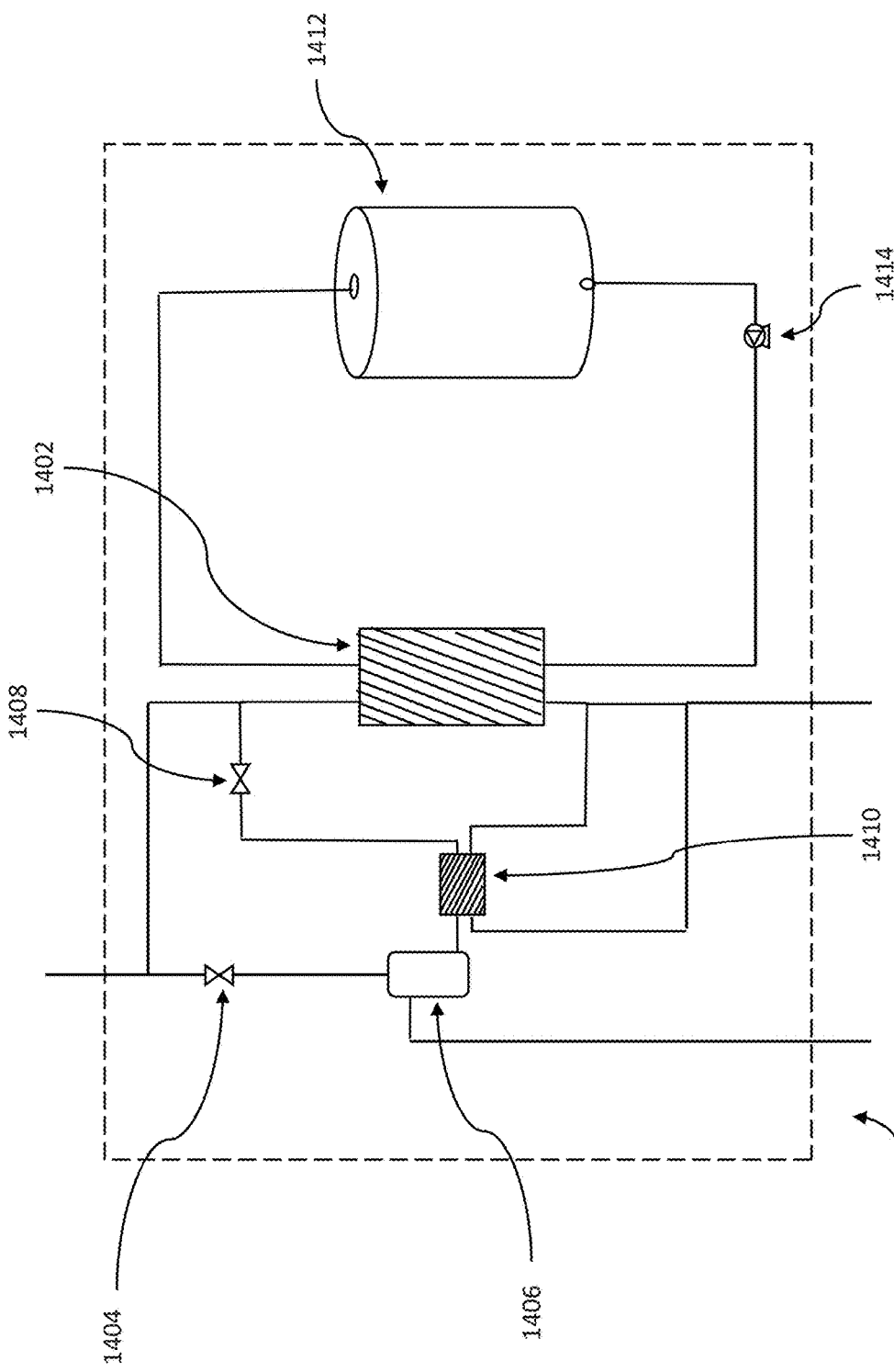
FIGS. 14A-14C illustrate a cold thermal store employing two stage expansion and a secondary heat transfer fluid store of robust air conditioning systems incorporating cold thermal energy storage devices in accordance with certain embodiments of the invention.
Figure 14B:
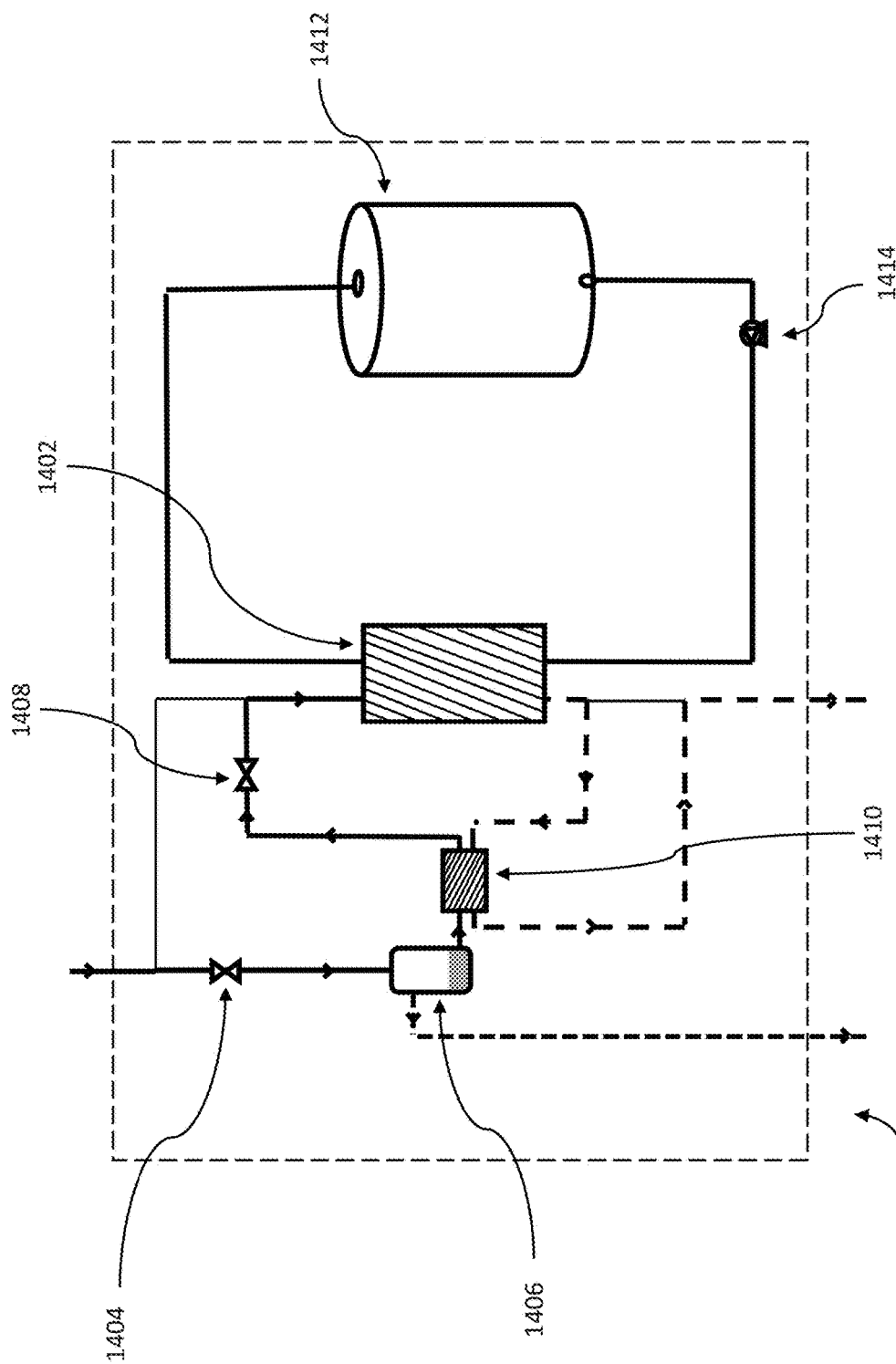
Figure 14C:
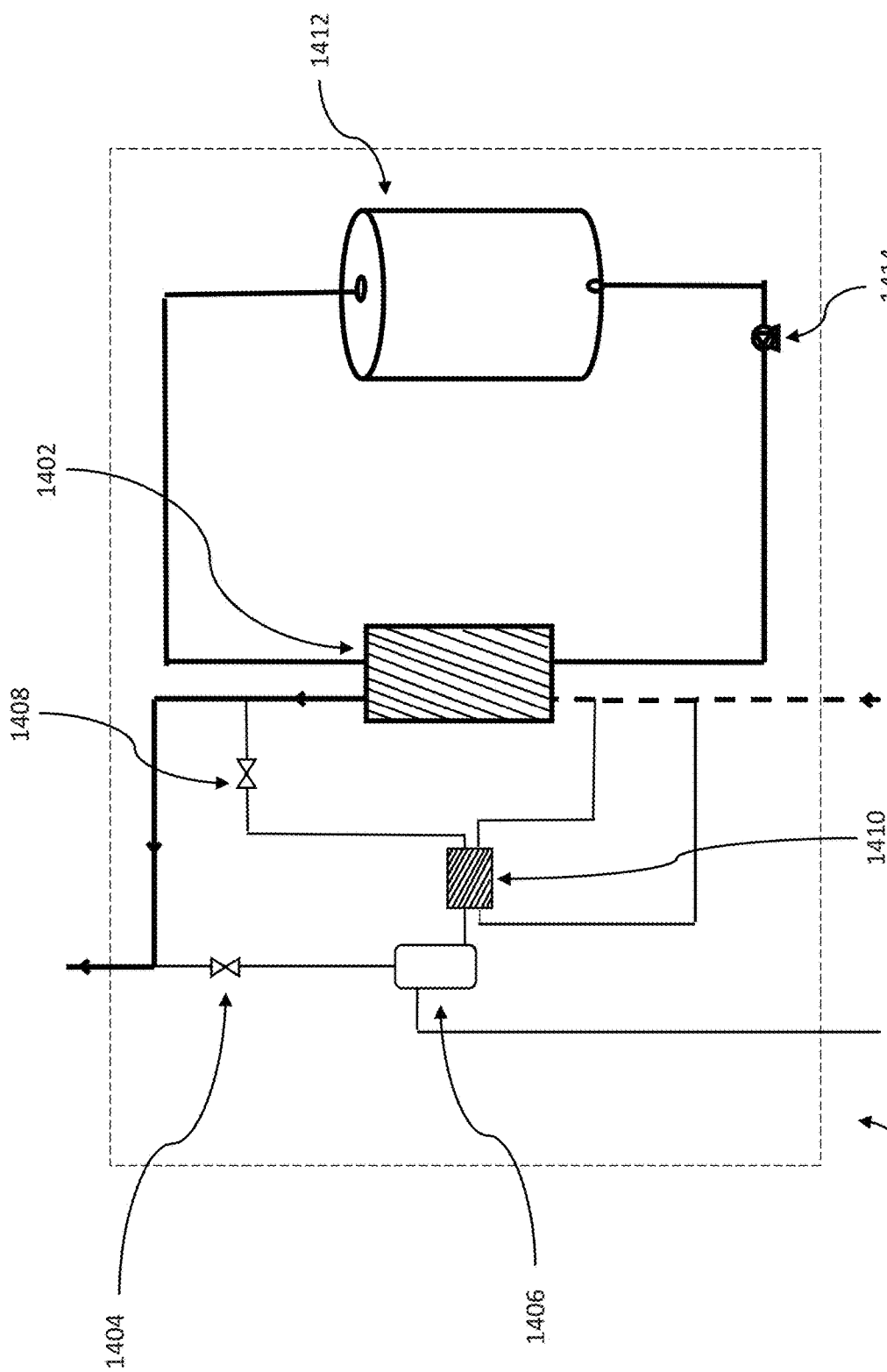

FIGS. 14A-14C illustrate a configuration for and operation of a cold thermal store employing two stage expansion and a secondary heat transfer fluid of robust air conditioning systems incorporating cold thermal energy storage devices. In operation, a cold thermal store employing two stage expansion and a secondary heat transfer fluid can function in the three distinct modes of being unused, charging, and discharging represented by FIGS. 14A, 14B and 14C respectively.

In particular, FIG. 14A illustrates the configuration of a cold thermal store 1400. More specifically, the structure of the cold thermal store 1400 is similar to that seen with respect to FIG. 13A, insofar as it includes: two expansion devices 1404 and 1408, and a liquid gas separator 1406. The cold thermal store 1400 further includes a primary heat exchanger 1402, a suction line heat exchanger 1410, a thermal energy store 1412, and a circulation pumping device 1414. The expansion devices 1404 and 1408, the liquid gas separator 1406, the suction line heat exchanger 1410 and the primary heat exchanger 1402 are operatively connected by piping and are thermally connected via the primary heat exchanger 1402 to a second loop comprising the primary heat exchanger 1402, the thermal energy store 1412 and a circulation pumping device 1414. As is the case with all figures, although not depicted, valves and other inline components can be incorporated to facilitate the operation of the cold thermal store 1400 in accordance with many embodiments of the invention. Of course, to be clear, a cold thermal store 1400 can be effectuated in any of a variety of ways in accordance with embodiments of the invention.

The primary heat exchanger 1402 generally operates to transfer heat between the working fluid and a secondary heat transfer fluid. Although the primary heat exchanger 1402 is depicted schematically it should be appreciated that it can be implemented using any of a variety of schemes. For example, in many embodiments, the primary heat exchanger 1402 comprises a brazed plate heat exchanger. In another scheme, the primary heat exchanger 1402 comprises a shell and tube heat exchanger. In any case, it should be clear that any suitable heat exchanging device can be used as a primary heat exchanger in accordance with embodiments of the invention.

The suction line heat exchanger 1410 generally operates to transfer heat between liquid phase working fluid and vapor phase working fluid. Although the suction line heat exchanger 1410 is depicted schematically it should be appreciated that it can be implemented using any of a variety of schemes. For example, in many embodiments, the suction line heat exchanger 1410 comprises a brazed plate heat exchanger. In another scheme, the suction line heat exchanger 1410 comprises a spiral heat exchanger. In any case, it should be clear that any suitable heat exchanging device can be used as a suction line heat exchanger in accordance with embodiments of the invention.

The thermal energy store 1412 is similar to the cold storage medium 1302 as seen in FIGS. 13A-13C in that it serves a similar function as the primary means for the storage of thermal potential, however it is different in that it is in primary thermal communication with a secondary heat transfer fluid other than the system working fluid. Although the thermal energy store 1412 is depicted schematically it should be appreciated that it can be implement using any of a variety of schemes. For example, in many embodiment, the thermal energy store 1412 comprises a tank filled with a phase change material in thermal communication with coils capable of carrying any number of secondary heat transfer fluids. In another scheme, the thermal energy store 1412 comprises a tank full of capsules filled with a phase changing material where by the secondary heat transfer can percolate through the matrix. In yet another scheme, the thermal energy store 1412 is an insulated tank that can hold a solid phase of the secondary heat transfer fluid while allowing the liquid phase to pass through.

FIG. 14B illustrates the operation of the cold thermal store 1400 to store thermal potential for later use. In particular, the bolded lines (and arrows) depict the circulation of a working fluid so as to direct fluid (i.e. from a liquid pressurizer/distributor ensemble) to cool the thermal energy store 1412. As in FIG. 13B, working fluid goes through a two stage expansion process to transfer cooling to the thermal energy store 1412. Unlike in 13B, the heat is transferred through the primary heat exchanger from a secondary heat transfer loop that is connected to the thermal energy store 1412.

FIG. 14C illustrates how the cold thermal store 1400 can operate to release stored thermal potential on demand. In particular, the bolded lines (and arrows) depict the circulation of a working fluid so as to release the stored thermal potential in the cold storage medium 1402 and provide condensed liquid working fluid (i.e. to a liquid pressurizer/distributor ensemble). More specifically, in the illustrated embodiment, cold low pressure gas working fluid enters the primary heat exchanger 1402 (e.g. from a suction gas equalizer/distributor ensemble) and is condensed into a low pressure liquid which then leaves the cold thermal store 1400. The heat from the incoming vapor phase refrigerant is absorbed by a secondary heat transfer fluid in the primary heat exchanger 1402 in thermal communication with the thermal energy store 1412.

Figure 15A:
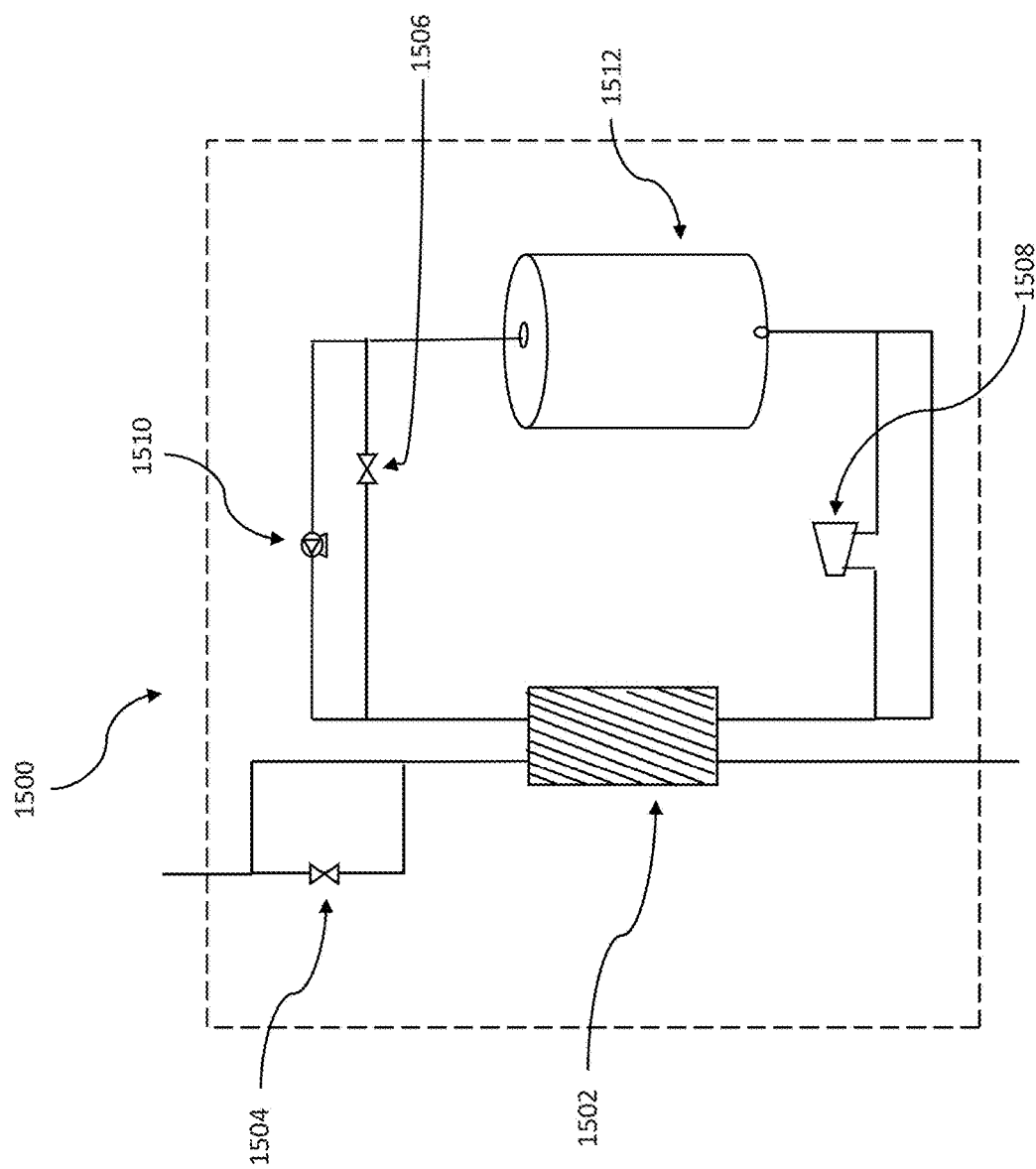
FIGS. 15A-15C illustrate a configuration for and operation of a cold thermal store employing a cascade vapor compression cycle of robust air conditioning systems incorporating cold thermal energy storage devices in accordance with certain embodiments of the invention.
Figure 15B:
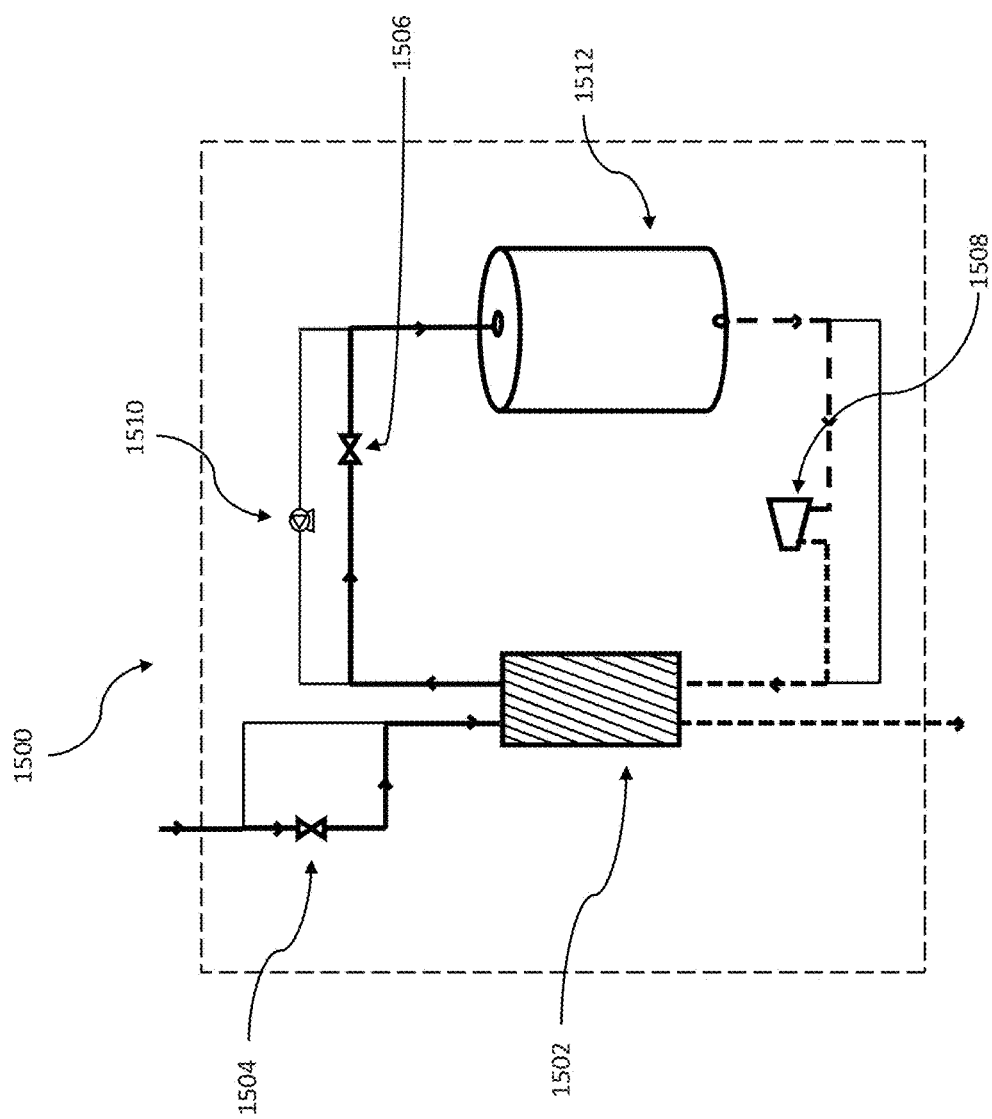
Figure 15C:
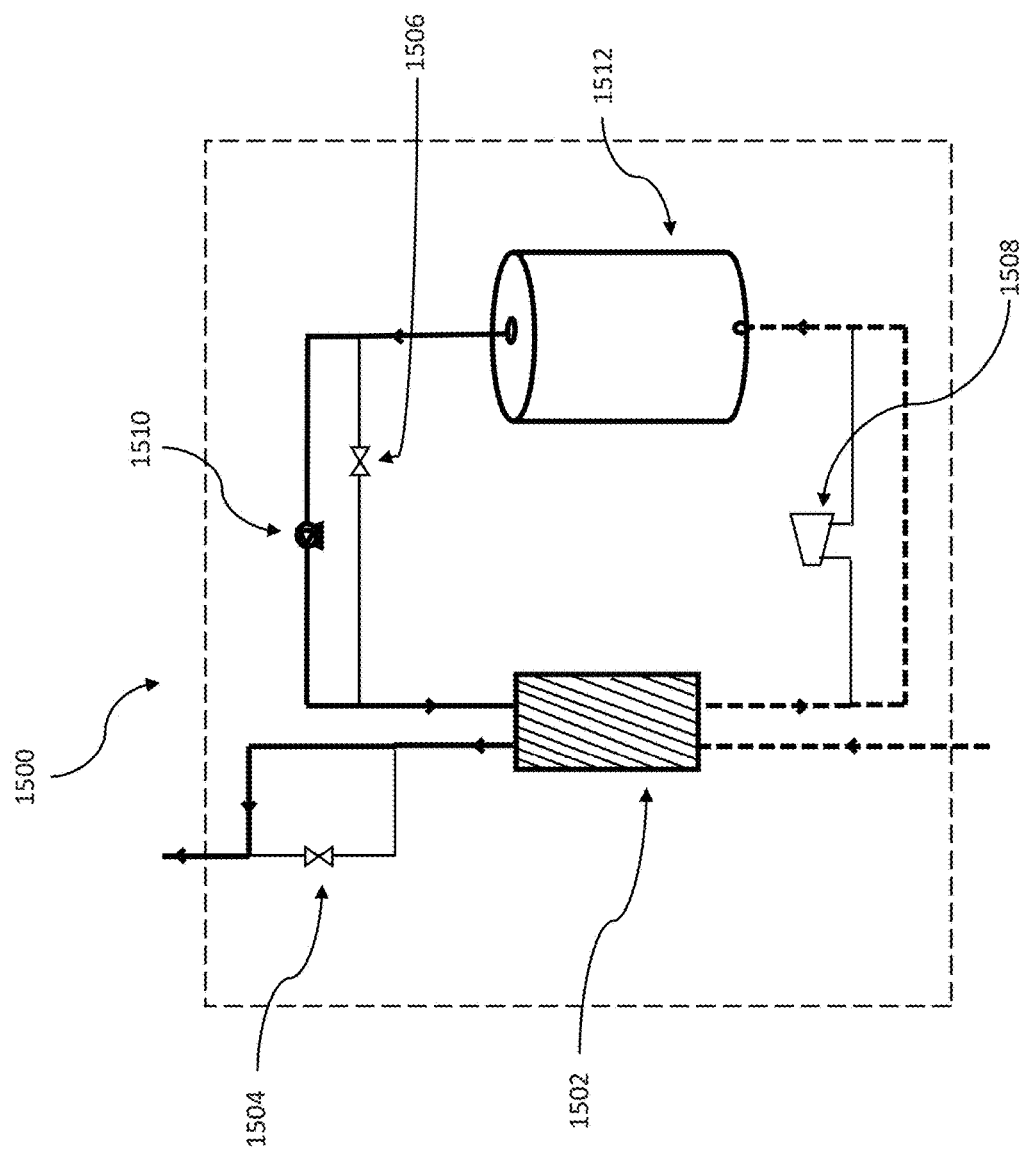

FIGS. 15A-15C illustrate a configuration for and operation of a cold thermal store employing a cascade vapor compression cycle of robust air conditioning systems incorporating cold thermal energy storage devices. In operation, a cold thermal store employing a cascade vapor compression cycle can function in the three distinct modes of being unused, charging, and discharging represented by FIGS. 15A, 15B and 15C respectively.

In particular, FIG. 15A illustrates the configuration of a cold thermal store 1500. More specifically, the structure of the cold thermal store 1500 is similar to that seen with respect to FIG. 14A, insofar as it includes: expansion devices 1504 and 1506, a primary heat exchanger 1502, a circulation pumping device 1510 and a thermal energy store 1512. The cold thermal store 1500 further includes a compressor 1508. The expansion device 1504 and the primary heat exchanger 1502 are operatively connected by piping and are thermally connected via the primary heat exchanger 1502 to a second loop comprising the primary heat exchanger 1502, the thermal energy store 1512, a compressor 1508 and an expansion device 1506 piped to implement a vapor compression cycle. In addition, the circulation pumping device 1510 is piped in parallel with the expansion device and the compressor 1508 can be bypassed via a piping pathway. As is the case with all figures, although not depicted, valves and other inline components can be incorporated to facilitate the operation of the cold thermal store 1500 and, a cold thermal store 1500 can be effectuated in any of a variety of ways in accordance with embodiments of the invention.

FIG. 15B illustrates the operation of the cold thermal store 1500 to store thermal potential for later use. In particular, the bolded lines (and arrows) depict the circulation of a working fluid so as to direct fluid (i.e. from a liquid pressurizer/distributor ensemble) to cool the thermal energy store 1512. As depicted in FIG. 15B, high pressure liquid working fluid (i.e. from a liquid pressurizer/distributor or the like) is expanded by the expansion device 1504 to a low pressure fluid, is evaporated in the primary heat exchanger 1502 and exits the cold thermal store 1500 (i.e. to a suction gas equalizer/distributor). In this way the primary heat exchanger 1502 operates as a condenser for a secondary working fluid circuit that is piped as to enable a vapor compression cycle consisting of the compressor 1508, an expansion device 1506 and the thermal energy store 1512 acting as the evaporator. The secondary working fluid vapor compression cycle allows the thermal energy store 1512 to be cooled to a lower temperature than the evaporation temperature of the primary working fluid.

FIG. 15C illustrates how the cold thermal store 1500 can operate to release stored thermal potential on demand. In particular, the bolded lines (and arrows) depict the circulation of a working fluid so as to release the stored thermal potential in the thermal energy store 1512 and provide condensed liquid working fluid (i.e. to a liquid pressurizer/distributor ensemble). More specifically, in the illustrated embodiment, cold low pressure gas working fluid enters the primary heat exchanger 1502 (e.g. from a suction gas equalizer/distributor ensemble) and is condensed into a low pressure liquid which then leaves the cold thermal store 1500. The heat from the incoming vapor phase refrigerant is absorbed by a secondary working fluid which changes phase from a cold liquid to a vapor in the primary heat exchanger 1502. The secondary working fluid vapor bypasses the compressor 1508 and travels to the thermal energy store 1512 where it is condensed into a liquid and is pumped back to the primary heat exchanger 1502 while bypassing the expansion device 1506 and completing the circuit.

Figure 16A:
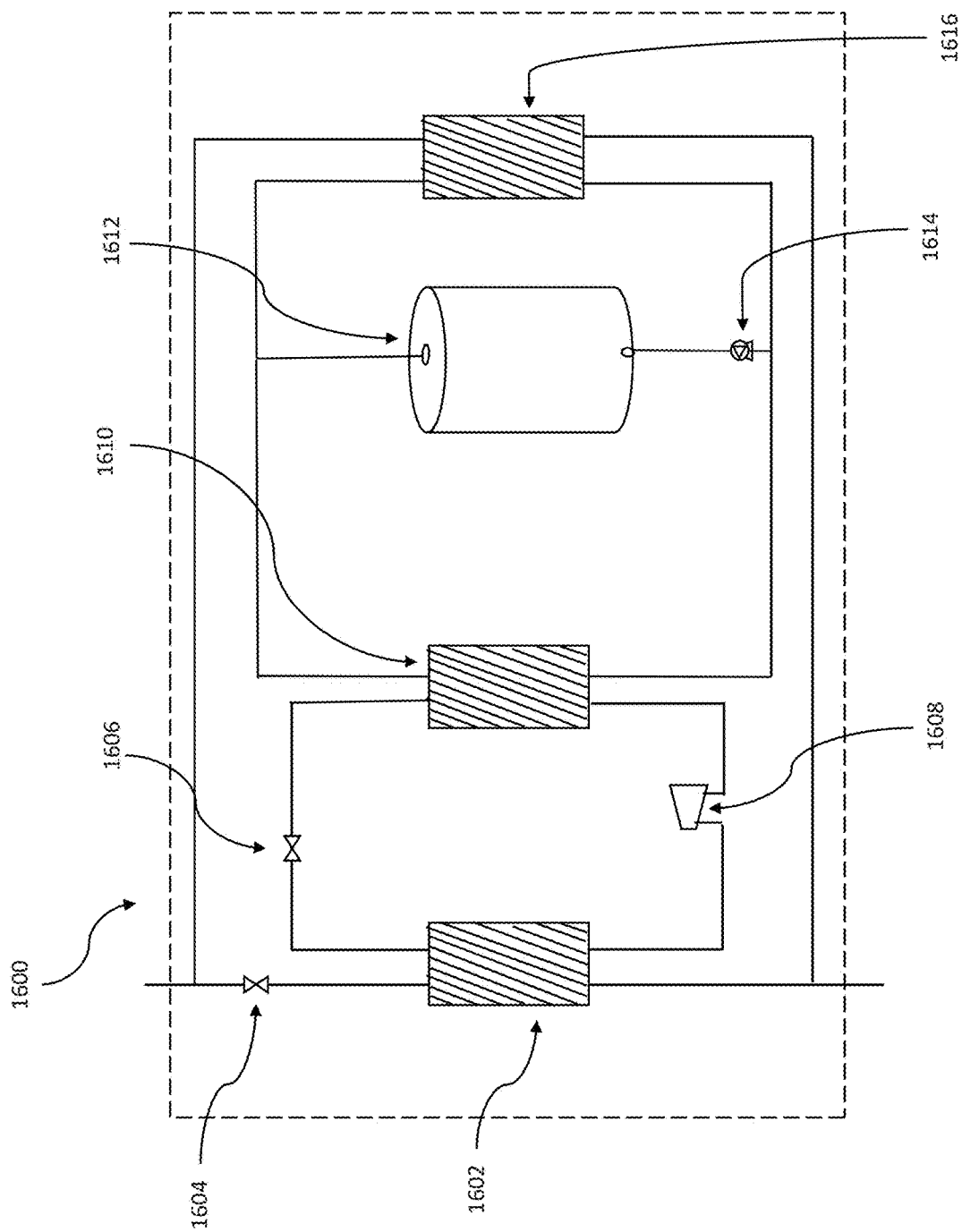
FIGS. 16A-16C illustrate a configuration for and operation of a cold thermal store employing a cascade vapor compression cycle and a secondary heat transfer loop of robust air conditioning systems incorporating cold thermal energy storage devices in accordance with certain embodiments of the invention.
Figure 16B:
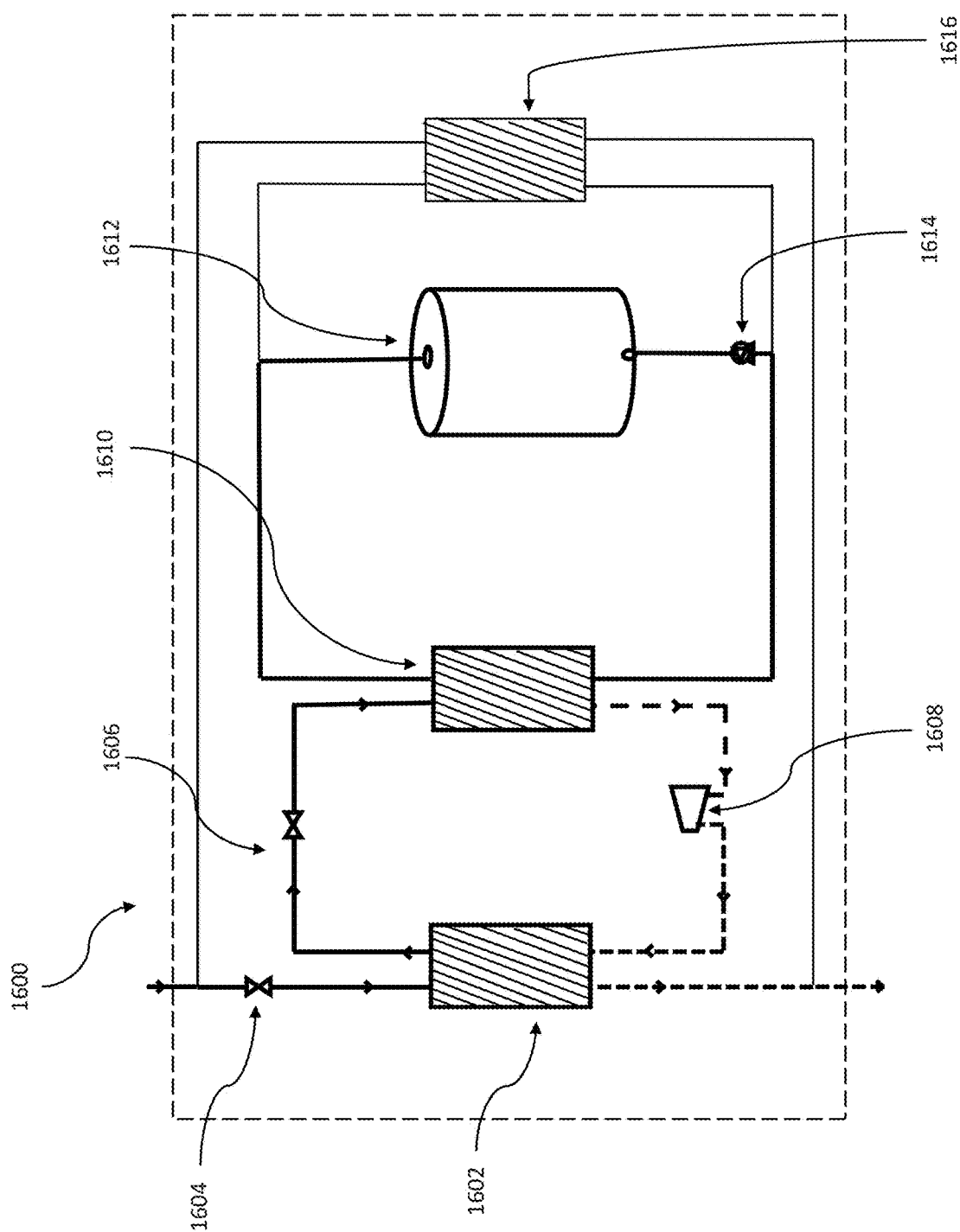
Figure 16C:
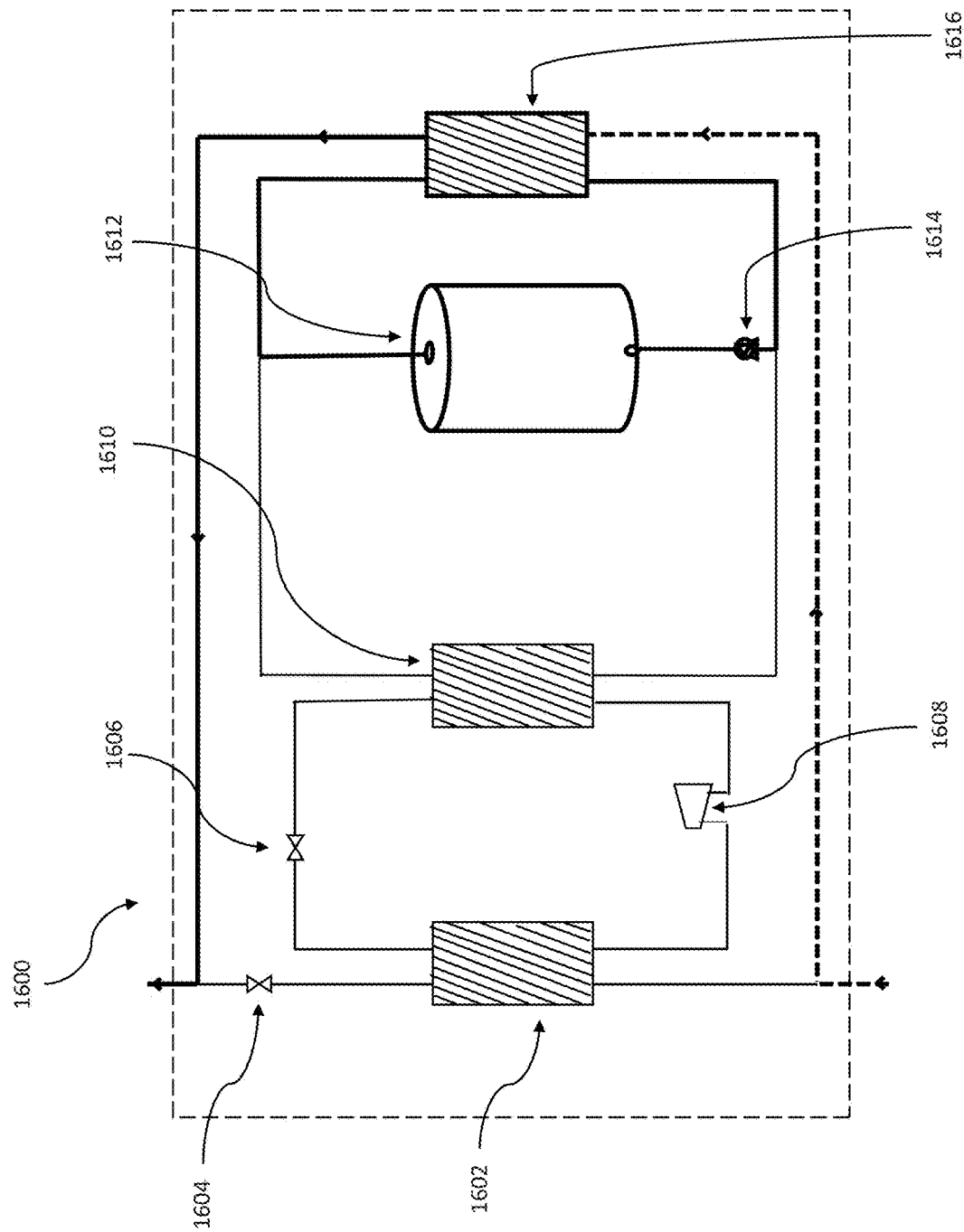

FIGS. 16A-16C illustrate a configuration for and operation of a cold thermal store employing a cascade vapor compression cycle and a secondary heat transfer loop of robust air conditioning systems incorporating cold thermal energy storage devices. In operation, a cold thermal store employing a cascade vapor compression cycle and a secondary heat transfer loop can function in the three distinct modes of being unused, charging, and discharging represented by FIGS. 16A, 16B and 16C respectively.

In particular, FIG. 16A illustrates the configuration of a cold thermal store 1600. More specifically, the structure of the cold thermal store 1600 is similar to that seen with respect to FIG. 15A, insofar as it includes: expansion devices 1604 and 1606, a primary heat exchanger 1602, a circulation pumping device 1614, a compressor 1608 and a thermal energy store 1612. The cold thermal store 1600 further includes a charging heat exchanger 1610 and a discharging heat exchanger 1616. The expansion device 1604 and the primary heat exchanger 1602 are operatively connected by piping and are thermally connected via the primary heat exchanger 1602 to a second loop using a secondary working fluid comprising the primary heat exchanger 1602, a compressor 1608, an expansion device 1606 and a charging heat exchanger 1610 piped to implement a vapor compression cycle. In addition, the charging heat exchanger 1610 is in thermal communication with a thermal energy store 1612 and a discharging heat exchanger 1616 via a third heat transfer fluid which can be motivated by a circulation pumping device 1614. As is the case with all figures, although not depicted, valves and other inline components can be incorporated to facilitate the operation of the cold thermal store 1600 and, a cold thermal store 1600 can be effectuated in any of a variety of ways in accordance with embodiments of the invention.

FIG. 16B illustrates the operation of the cold thermal store 1600 to store thermal potential for later use. In particular, the bolded lines (and arrows) depict the circulation of a working fluid so as to direct fluid (i.e. from a liquid pressurizer/distributor ensemble) to cool the thermal energy store 1612. As depicted in FIG. 16B, high pressure liquid working fluid (i.e. from a liquid pressurizer/distributor or the like) is expanded by the expansion device 1604 to a low pressure fluid, is evaporated in the primary heat exchanger 1602 and exits the cold thermal store 1600 (i.e. to a suction gas equalizer/distributor). In this way the primary heat exchanger 1602 operates as a condenser for a secondary working fluid circuit that is piped as to enable a vapor compression cycle consisting of the compressor 1608, an expansion device 1606 and the charging heat exchanger 1610 acting as the evaporator. The charging heat exchanger is in thermal communication with the thermal energy store 1612 via a third heat transfer fluid loop and is used to cool the thermal energy store. The secondary working fluid vapor compression cycle allows the third heat transfer fluid loop to be cooled to a lower temperature than the evaporation temperature of the primary working fluid.

FIG. 16C illustrates how the cold thermal store 1600 can operate to release stored thermal potential on demand. In particular, the bolded lines (and arrows) depict the circulation of a working fluid so as to release the stored thermal potential in the thermal energy store 1612 and provide condensed liquid working fluid (i.e. to a liquid pressurizer/distributor ensemble). More specifically, in the illustrated embodiment, cold low pressure gas working fluid enters the primary heat exchanger 1602 (e.g. from a suction gas equalizer/distributor ensemble) and is condensed into a low pressure liquid which then leaves the cold thermal store 1600. The heat from the incoming vapor phase refrigerant is absorbed by thermal energy store 1612 and is transferred by the third heat transfer fluid via the discharging heat exchanger 1616.

Figure 17A:
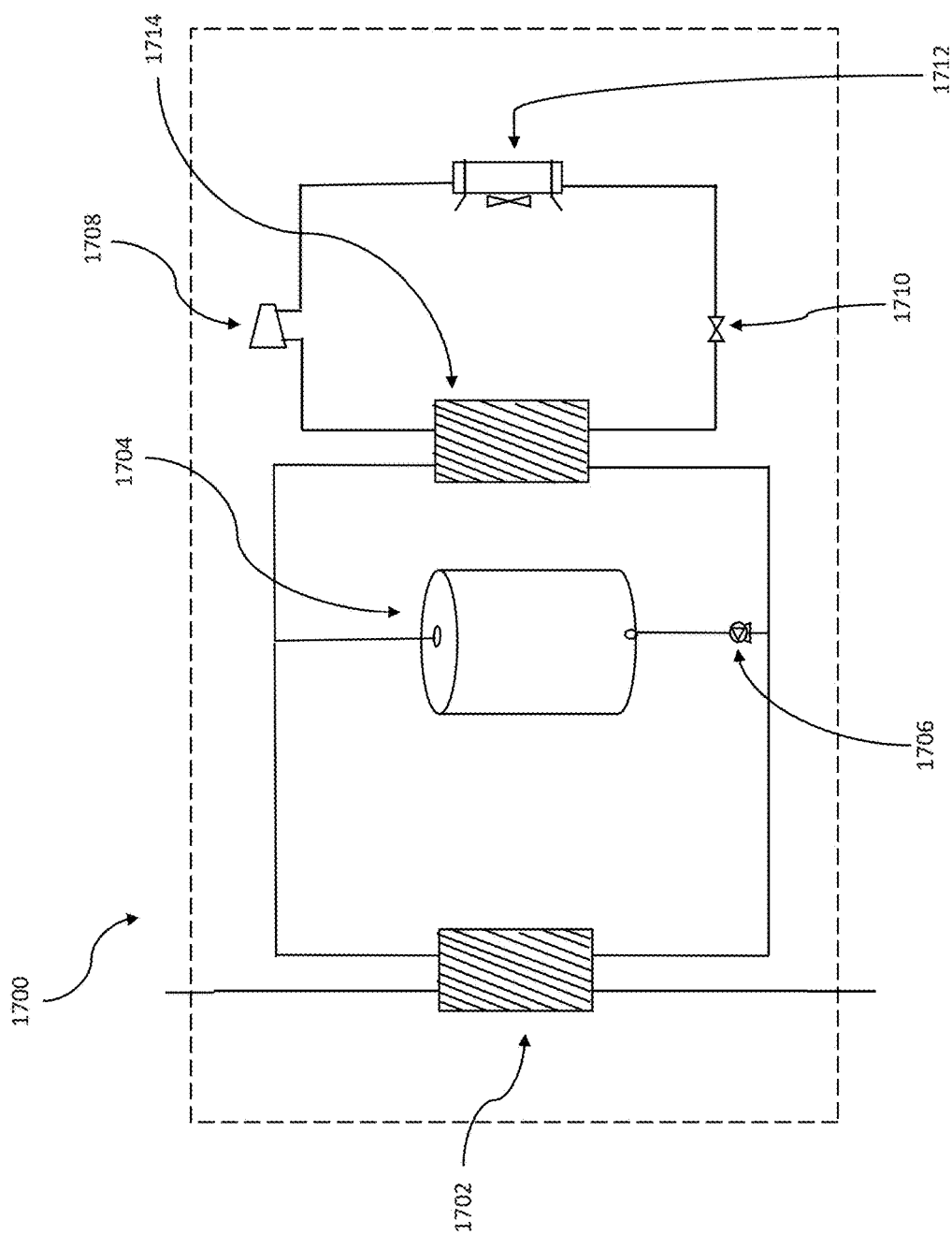
FIGS. 17A-17C illustrate a configuration for and operation of a cold thermal store employing a stand-alone charging vapor compression cycle and a secondary heat transfer loop of robust air conditioning systems incorporating cold thermal energy storage devices in accordance with certain embodiments of the invention.
Figure 17B:
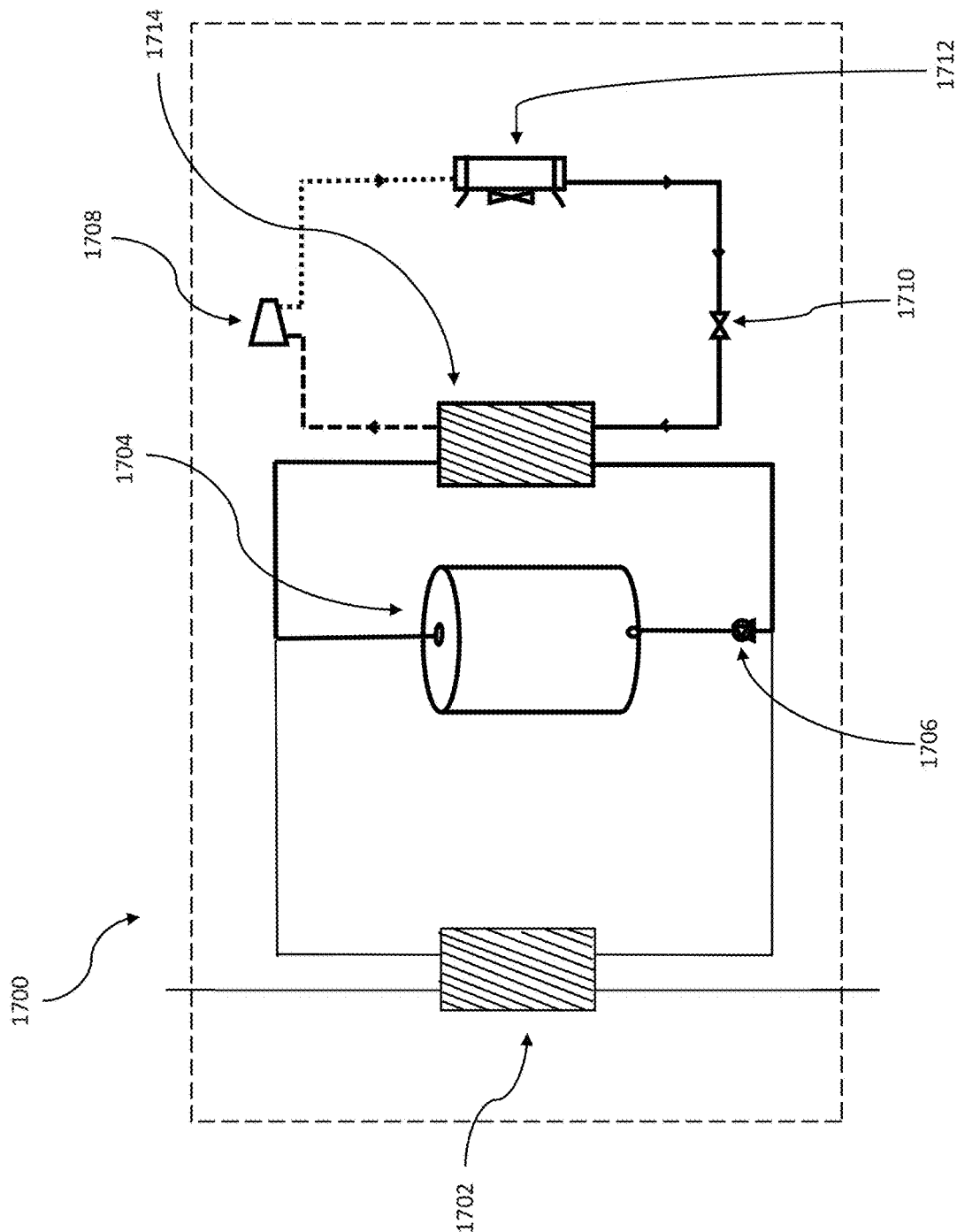
Figure 17C:
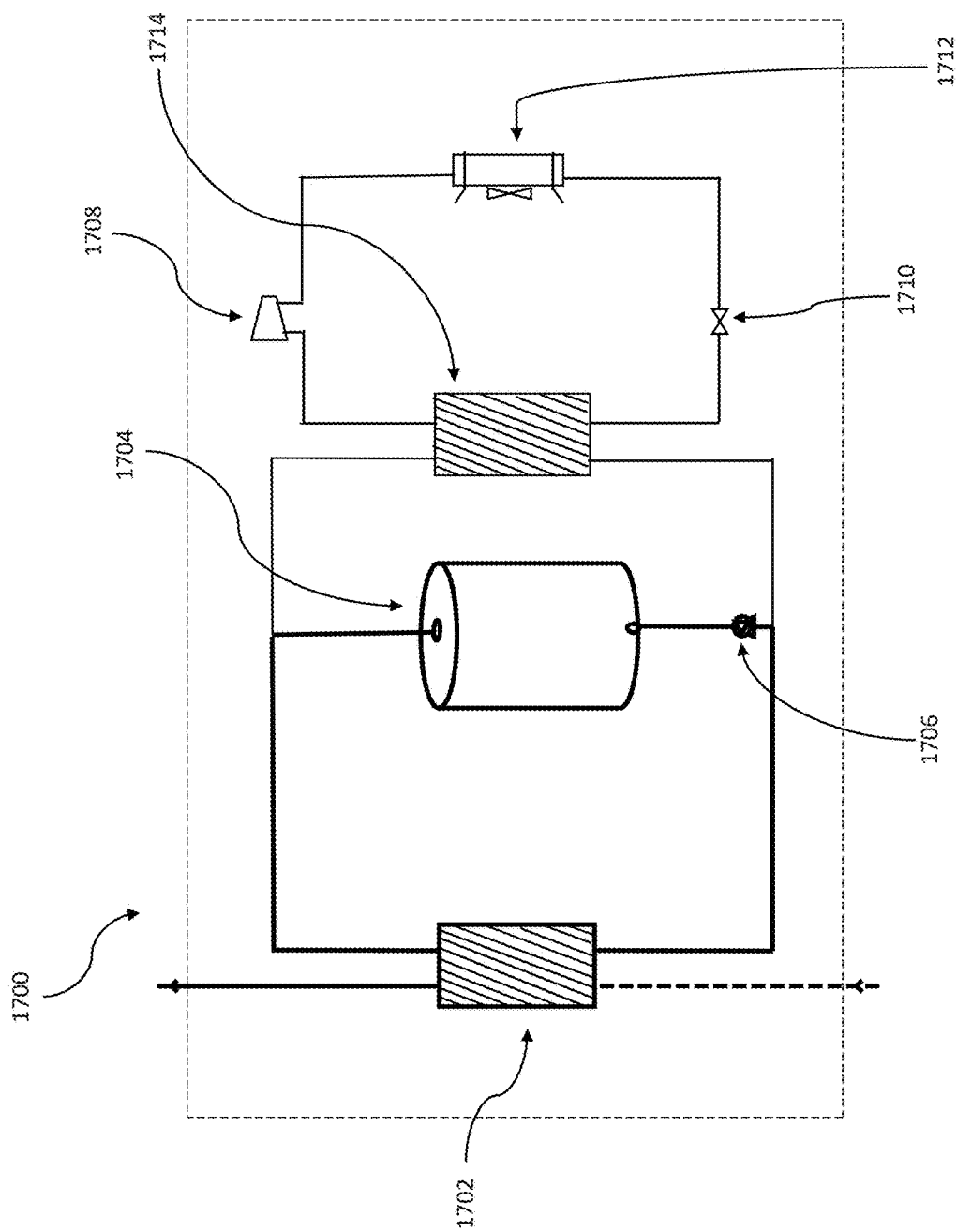

FIGS. 17A-17C illustrate a configuration for and operation of a cold thermal store employing a stand-alone charging vapor compression cycle and a secondary heat transfer loop of robust air conditioning systems incorporating cold thermal energy storage devices. In operation, a cold thermal store employing a stand-alone vapor compression cycle and a secondary heat transfer loop can function in the three distinct modes of being unused, charging, and discharging represented by FIGS. 17A, 17B and 17C respectively.

In particular, FIG. 17A illustrates the configuration of a cold thermal store 1700. More specifically, the structure of the cold thermal store 1700 is similar to that seen with respect to FIG. 16A, insofar as it includes: an expansion device 1710, a primary heat exchanger 1702, a circulation pumping device 1706, a thermal energy store 1704, a compressor 1708 and a charging heat exchanger 1714. The cold thermal store 1700 further includes a condenser 1712. The primary heat exchanger 1702 is connected to an inlet and outlet of the cold thermal store 1700 and connects to a secondary heat transfer loop that is in thermal communication with the thermal energy store 1704 and a charging heat exchanger 1714 where by the secondary heat transfer fluid can be motivated by a circulation pumping device 1706. Finally the charging heat exchanger 1714 is connected to a stand-alone vapor compression cycle utilizing a third working fluid and consisting of a compressor 1708, a condenser 1712 and an expansion device 1710. As is the case with all figures, although not depicted, valves and other inline components can be incorporated to facilitate the operation of the cold thermal store 1700 and, a cold thermal store 1700 can be effectuated in any of a variety of ways in accordance with embodiments of the invention.

FIG. 17B depicts the operation of the cold thermal store 1700 to store thermal potential for later use. As depicted in FIG. 17B no working fluid is taken in by the cold thermal store 1700 during charging. Instead, a working fluid is circulated through a stand-alone vapor compression cycle that rejects heat from the thermal energy store 1704 via the charging heat exchanger 1714 that is in thermal communication with the thermal energy store via a secondary heat transfer fluid. The stand-alone vapor compression cycle allows the thermal energy store 1704 to be charged at any appropriate temperature for the operation of the cold thermal store 1700.

FIG. 17C illustrates how the cold thermal store 1700 can operate to release stored thermal potential on demand. In particular, the bolded lines (and arrows) depict the circulation of a working fluid so as to release the stored thermal potential in the thermal energy store 1704 and provide condensed liquid working fluid (i.e. to a liquid pressurizer/distributor ensemble). More specifically, in the illustrated embodiment, cold low pressure gas working fluid enters the primary heat exchanger 1702 (e.g. from a suction gas equalizer/distributor ensemble) and is condensed into a low pressure liquid which then leaves the cold thermal store 1700. The heat from the incoming vapor phase refrigerant is absorbed by the thermal energy store 1704 and is transferred from the primary heat exchanger 1702 by the secondary heat transfer fluid.

While several examples of cold thermal stores that are suitable for implementation within many of the above described robust air conditioning systems are described, it can be appreciated that any of a variety of cold thermal stores can be implemented that are suitable for incorporation in a number of the above-described robust air conditioning systems in accordance with many embodiments of the invention.

Suction Gas Pressurizer and Distributor Ensembles for Implementation within Robust Air Conditioning Systems In many embodiments, suction gas pressurizer and distributor ensembles are implemented that are suitable to be incorporated within many of the above described air conditioning system configurations.

Figure 18:
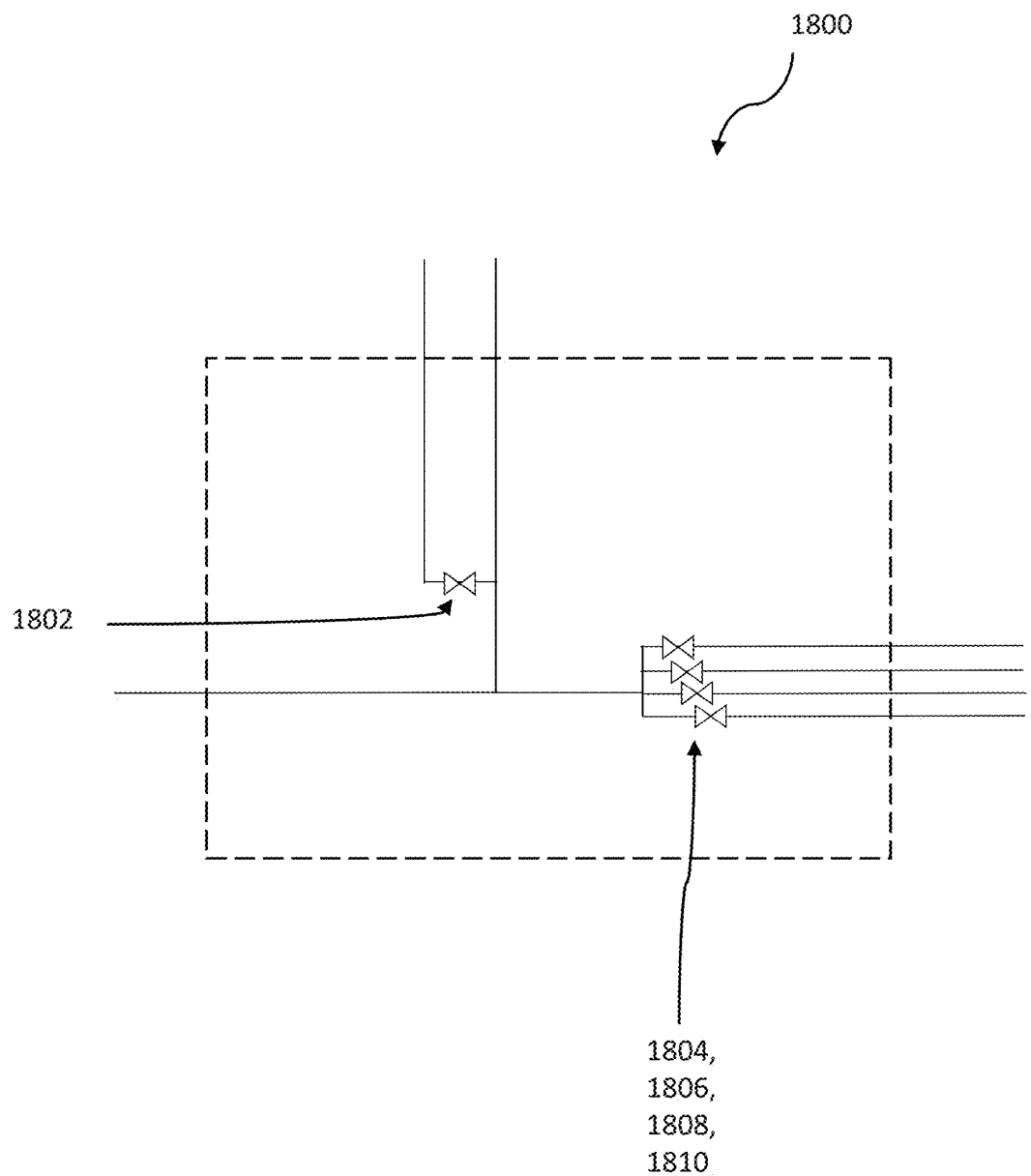
FIG. 18 illustrates a configuration of a suction gas equalizer/distributor in accordance with certain embodiments of the invention.

FIG. 18 depicts a configuration of a suction gas equalizer/distributor 1800 that can accept two streams of vapor phase working fluid at different pressures from a cold thermal store as well as multiple streams from target spaces and equalizes them to a common suction gas pressure via an expansion valve 1802 for the cold thermal store and expansion valves 1804, 1806, 1808 and 1810 for the target spaces. During cold thermal store discharge mode, low pressure suction gas bypasses the expansion valve 1802 as it exits the suction gas equalizer/distributor 1800. As can be appreciated, although not depicted, valves or other inline components can be incorporated to facilitate the operation of the suction gas equalizer/distributor 1800 in accordance with many embodiments of the invention.

Figure 19:
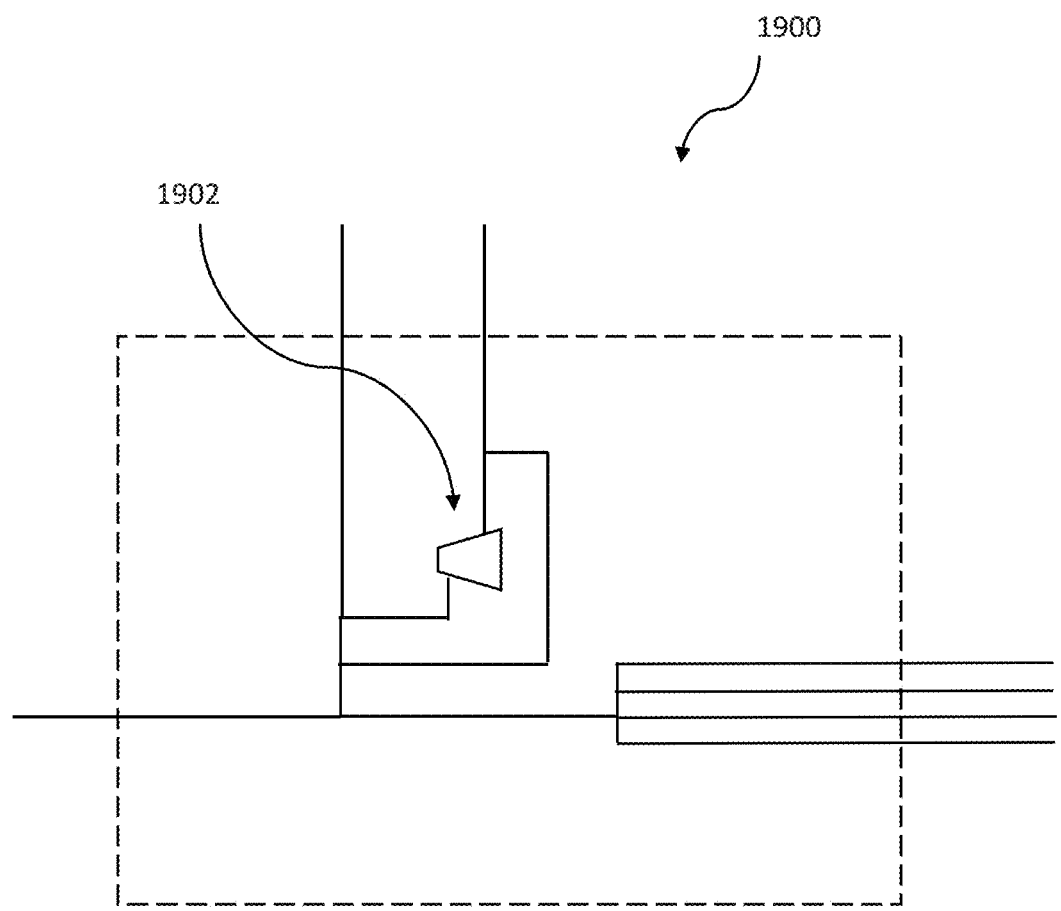
FIG. 19 illustrates an additional configuration of a suction gas equalizer/distributor in accordance with certain embodiments of the invention.

FIG. 19 depicts a configuration of a suction gas equalizer/distributor 1900 that can accept two streams of vapor phase working fluid at different pressures from a cold thermal store and equalize the lower pressure stream to the same pressure as the multiple inlet streams from target spaces and higher pressure stream from the cold thermal store via a booster compressor 1902. During cold thermal store discharge mode, low pressure suction gas bypasses the booster compressor 1902 as it exits the suction gas equalizer/distributor 1900. As can be appreciated, although not depicted, valves or other inline components can be incorporated to facilitate the operation of the suction gas equalizer/distributor 1900 in accordance with many embodiments of the invention.

While several examples of suction gas equalizer and distributors that are suitable for implementation within many of the above described robust air conditioning systems are described, it can be appreciated that any of a variety of suction gas equalizer and distributors can be implemented that are suitable for incorporation in a number of the above-described robust air conditioning systems in accordance with many embodiments of the invention.

Hot Thermal Energy Storage Units for Implementation within Robust Air Conditioning Systems In many embodiments, hot thermal energy storage units are implemented that are suitable to be incorporated within many of the above described air conditioning system configurations.

Figure 20:
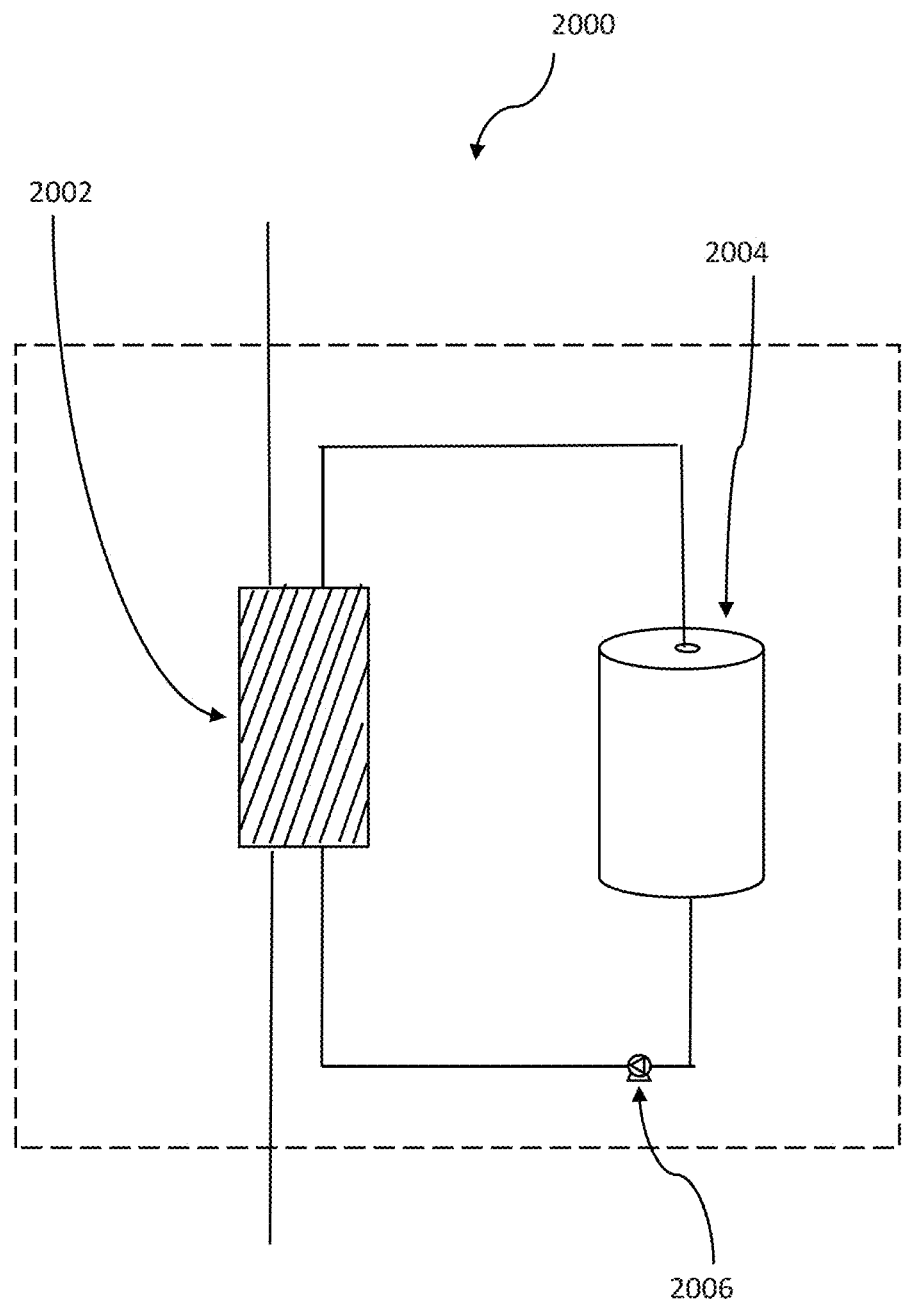
FIG. 20 illustrates a configuration of a hot thermal store of robust air conditioning systems incorporating cold and hot thermal energy storage devices units in accordance with certain embodiments of the invention.

FIG. 20 illustrates a configuration of a hot thermal store of robust air conditioning systems incorporating cold and hot thermal energy storage devices. In particular, FIG. 20 illustrates the configuration of a hot thermal store 2000 which includes a heat exchanger 2002, a thermal energy store 2004, and a circulation pumping device 2006 which are operatively connected by piping. In operation, as hot high pressure vapor phase working fluid enters the hot thermal store 2000 (i.e. from the discharge gas distributor) it travels through the heat exchanger 2002 and is condensed into high pressure liquid. During the condensation process heat is rejected by the working fluid into the thermal energy store 2004 which is in thermal communication via a circulating secondary heat transfer fluid. During discharge of the hot thermal store 2000, high pressure liquid working fluid enters the heat exchanger 2002 (i.e. from the liquid pressurizer/distributor ensemble or the like) and is boiled by the thermal store which is in thermal communication via the secondary heat transfer media. As is the case with all figures, although not depicted, valves and other components can be incorporated to facilitate the operation of the hot thermal store 2000 in accordance with many embodiments of the invention.

While an example of a hot thermal energy storage unit that is suitable for implementation within many of the above described robust air conditioning systems is described, it can be appreciated that any of a variety of hot thermal energy storage units can be implemented that are suitable for incorporation in a number of the above-described robust air conditioning systems in accordance with many embodiments of the invention.

Configurations for Hot Thermal Storage Units that can Also Act as a Heat Source for Implementation within Robust Air Conditioning Systems In many embodiments, hot thermal energy storage units that can also function as heat sources are implemented that are suitable to be incorporated within many of the above described air conditioning system configurations.

Figure 21:
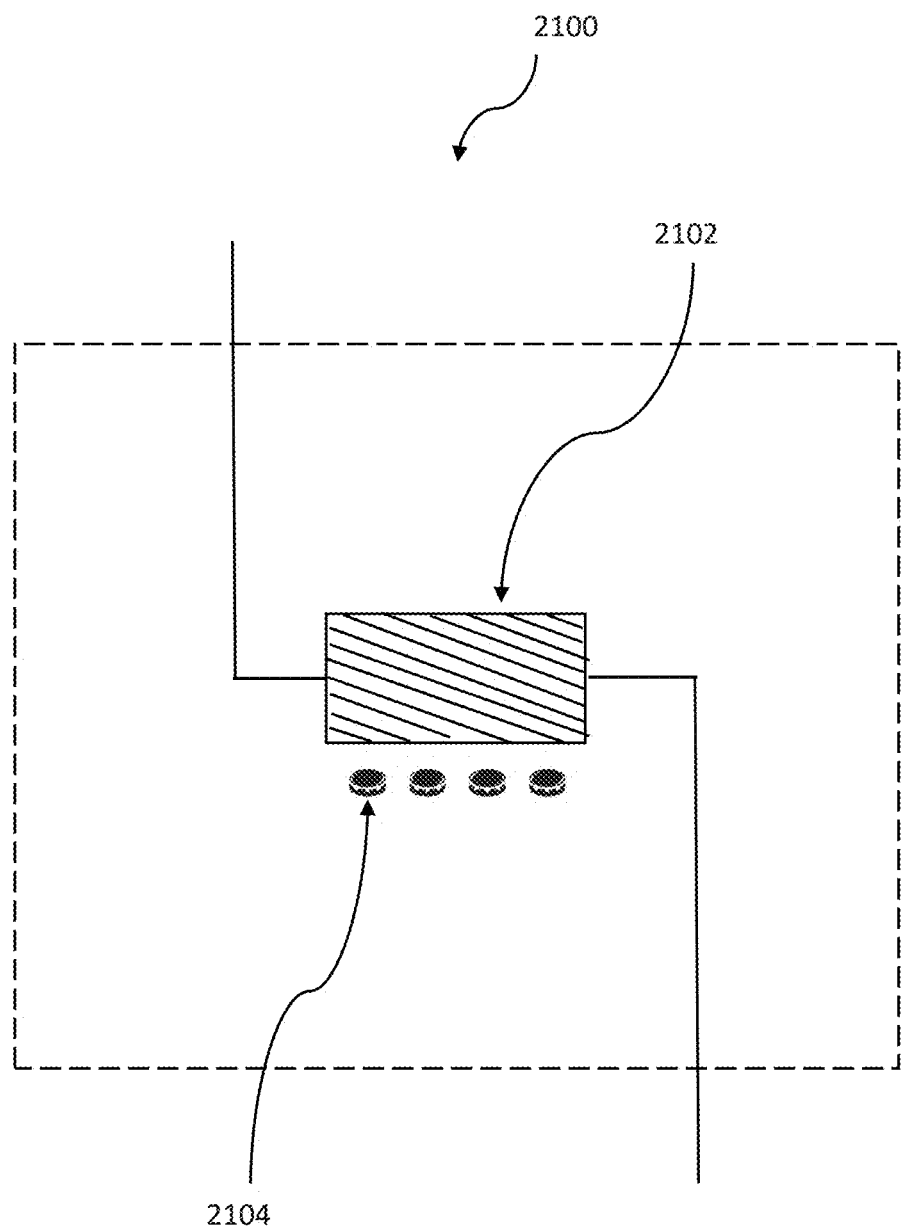
FIG. 21 illustrates a configuration of a heat source of robust air conditioning systems incorporating cold and hot thermal energy storage devices in accordance with certain embodiments of the invention.

For example, FIG. 21 illustrates a configuration of a heat source of robust air conditioning systems incorporating cold and hot thermal energy storage devices. In particular, FIG. 21 illustrates the configuration of a heat source 2100 which includes a heat exchanger 2102 and a heating element 2104. In operation, during discharge high pressure liquid phase working fluid travels through the heat exchanger 2102 and is boiled by the heating element 2104. The resulting high pressure vapor phase working fluid leaves the heat source 2100 (i.e. to the discharge gas distributor or the like). As is the case with all figures, although not depicted, valves and other components can be incorporated to facilitate the operation of the heat source 2100 in accordance with many embodiments of the invention.

The heating element 2104 of the heat source 2100 provides heat to boil liquid working fluid. Although the heating element 2104 is depicted schematically it should be appreciated that it can be implemented using a variety of schemes. For example, in many embodiments, the heat source 2104 comprises as gas burner. In another scheme, the heat source 2104 comprises a bioreactor containing an exothermic reaction. Of course, to be clear, a heating element and heat source can be effectuated in any of a variety of ways in accordance with embodiments of the invention.

While an example of a hot thermal energy storage unit that can also serve as a heat source and that is suitable for implementation within many of the above described robust air conditioning systems is described, it can be appreciated that any of a variety of hot thermal energy storage units that can also serve as heat sources can be implemented that are suitable for incorporation within in a number of the above-described robust air conditioning systems in accordance with many embodiments of the invention.

Alternative Robust Air Conditioning System Configurations

In many embodiments, alternative robust air conditioning system configurations are implemented.

Figure 22A:
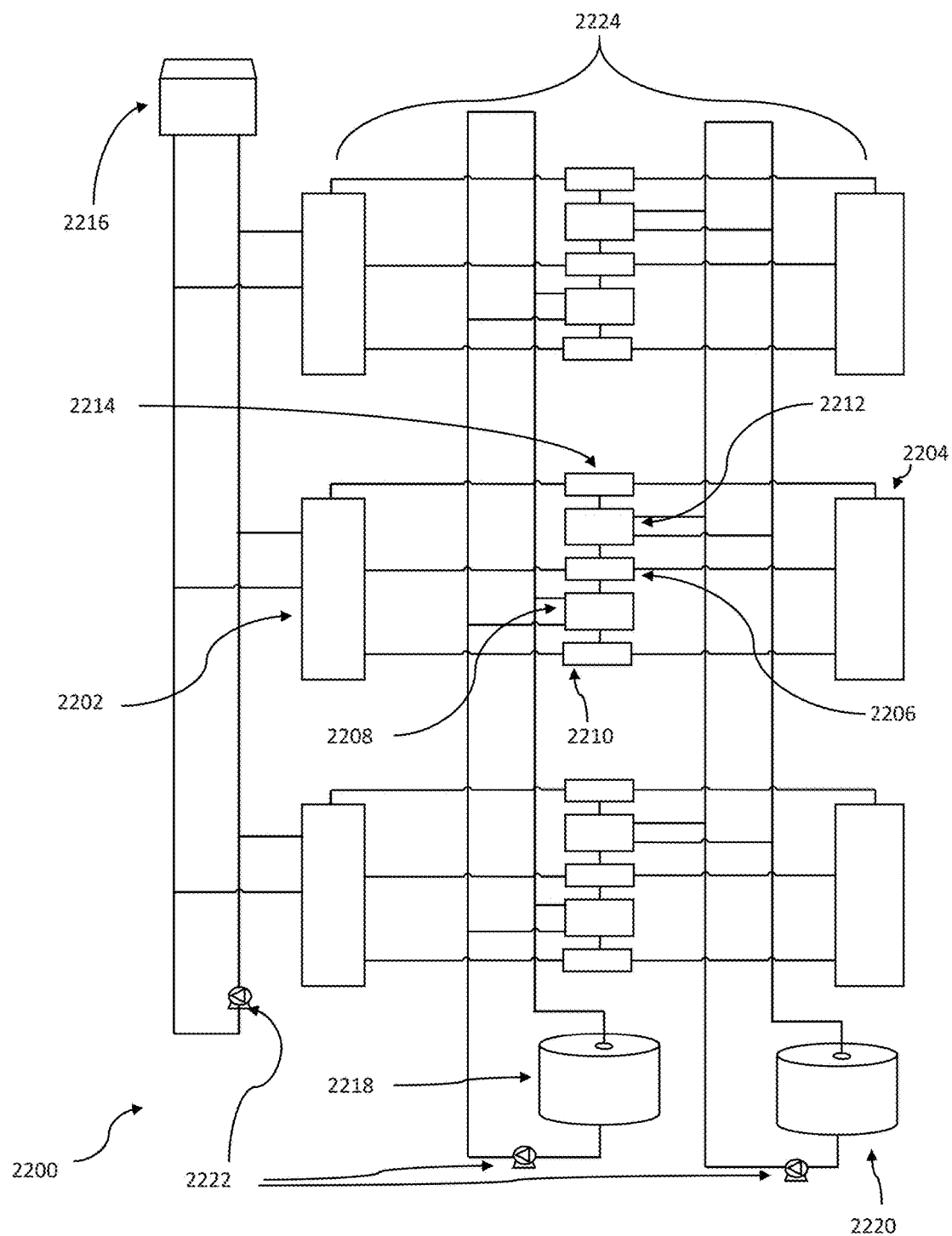
FIGS. 22A-22C illustrate a multiple connected configuration for and operation of robust air conditioning systems incorporating both hot a cold thermal energy storage units in accordance with certain embodiments of the invention.
Figure 22B:
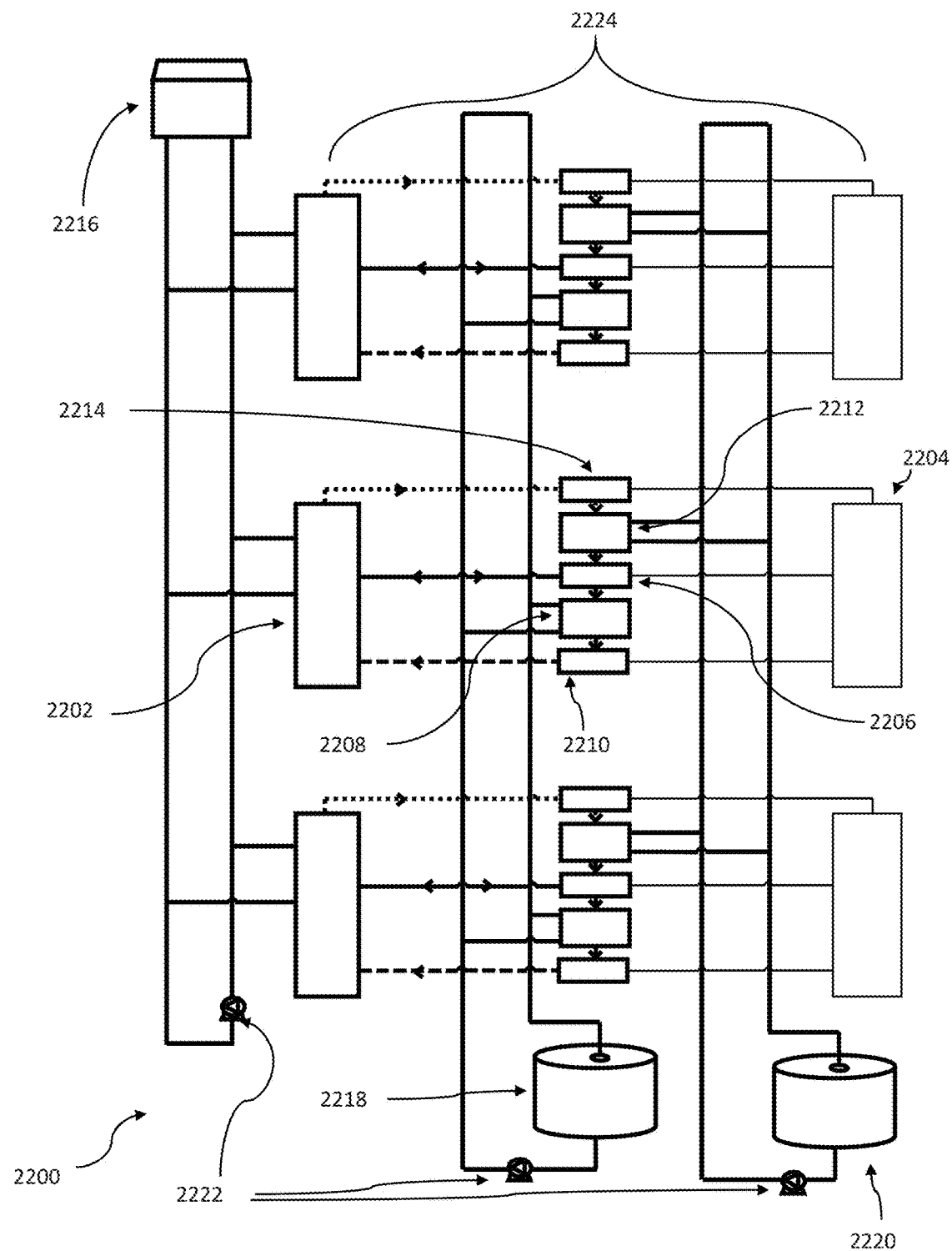
Figure 22C:
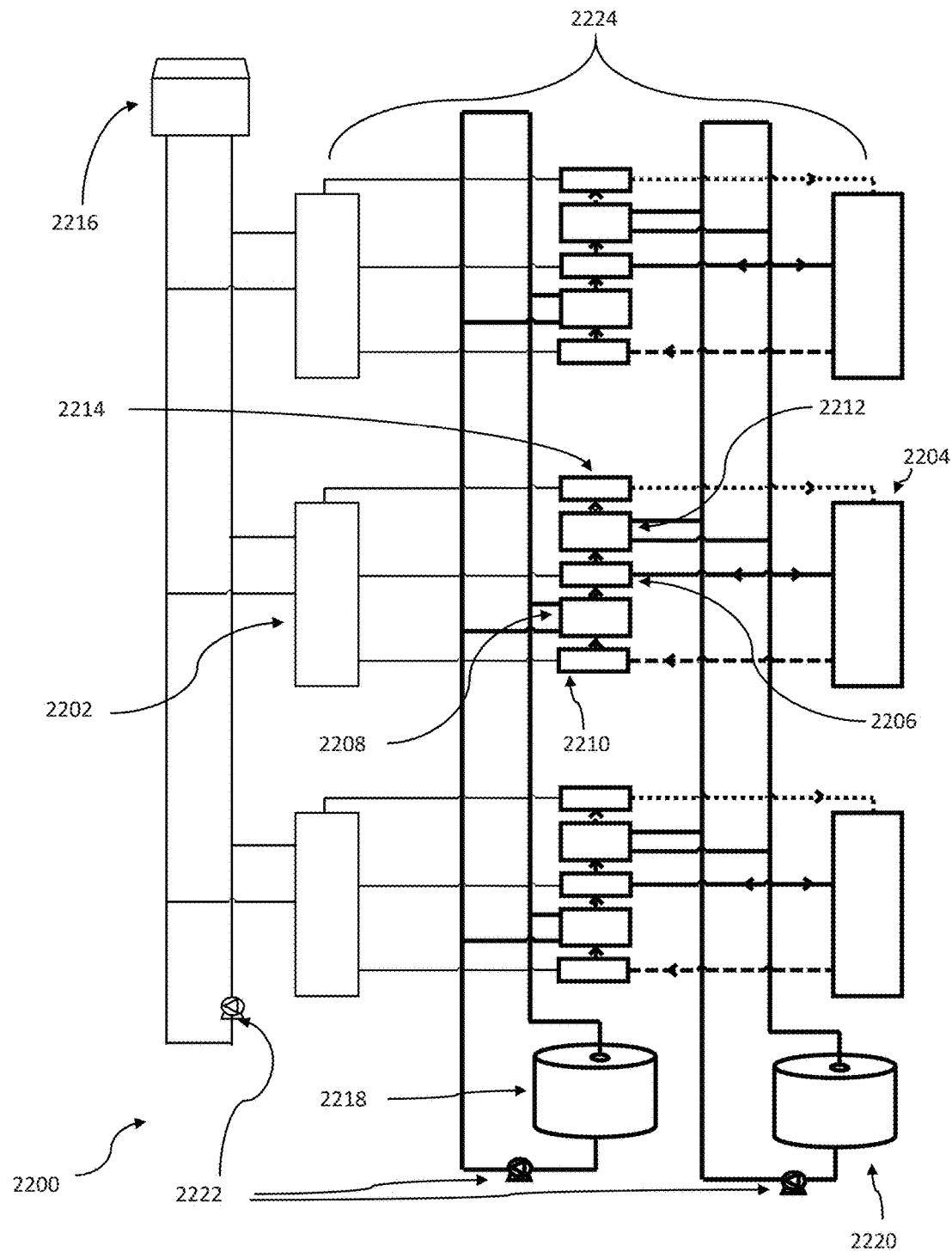

For example, FIGS. 22A-22C illustrate a multiple connected configuration for and operation of robust air conditioning systems incorporating both hot and cold thermal energy storage units. In operation the multiple connected configuration can function in a similar manner as a robust air conditioning system that includes separate thermal energy storage units for heating and cooling a target space as depicted in FIGS. 3A-3K.

In particular FIG. 22A illustrate that the air conditioning system 2200 is similar to that seen in FIG. 3A insofar as it includes: condensing units 2202, target spaces 2204, liquid pressurizer/distributor ensembles 2206, cold thermal energy storage units 2208, suction gas conditioner/distributors 2210, hot thermal energy storage units 2212 and discharge gas distributors 2214. FIG. 22A further depicts a unified condenser 2216, a unified cold thermal energy store 2218, a unified hot thermal energy store 2220, circulation pumps 2222 and individual entire robust air conditioning systems incorporating both hot and cold thermal energy storage units 2224.

The air condition system 2200 as depicted in FIG. 22A is comprised of multiple robust air condition systems 2224 as depicted in FIG. 3A where in the cold thermal stores 2208 have been configured to share one unified cold thermal energy store 2218, the hot thermal stores 2212 have been configured to share one unified hot thermal energy store 2220 and the condensing units 2202 have been configured to share one condenser 2216. In many embodiments, all three unified connections are made by secondary heat transfer fluid loops in which the heat transfer fluid is motivated by circulation pumps 2222. In many embodiments, the unified connections are made by loops filled with the primary working fluid. As is the case with all figures, although not depicted, valves can be incorporated to facilitate the operation of the air conditioning system 2200 in accordance with many embodiments of the invention.

FIG. 22B depicts the air conditioning system 2200 in an operational mode in which the unified cold thermal energy store 2218 and the unified hot energy store 2220 are being charge by the condensing units 2202 of the various individual entire robust air conditioning systems 2224 using a shared condenser 2216.

FIG. 22C depicts the air condition system 2200 in an operational mode in which the unified cold thermal energy store 2218 and the unified hot energy store 2220 are being used in conjunction with the various individual entire robust air conditioning systems 2224 to provide cooling and/or heating to the target spaces 2204.

Figure 23A:
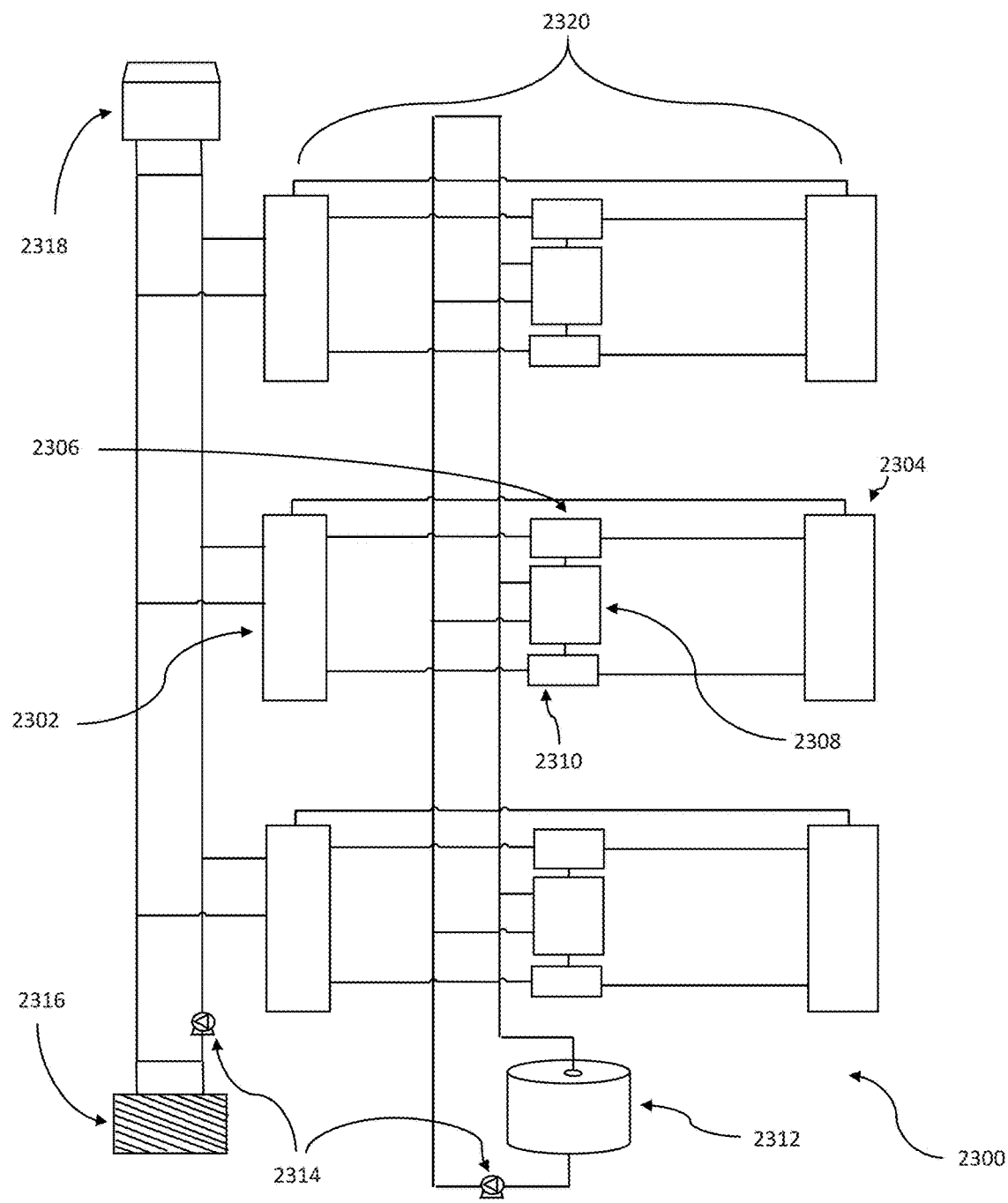
FIGS. 23A-23C illustrate a multiple connected configuration for and operation of robust air conditioning systems incorporating cold thermal energy storage devices operable to provide cooling and/or heating services in accordance with certain embodiments of the invention.
Figure 23B:
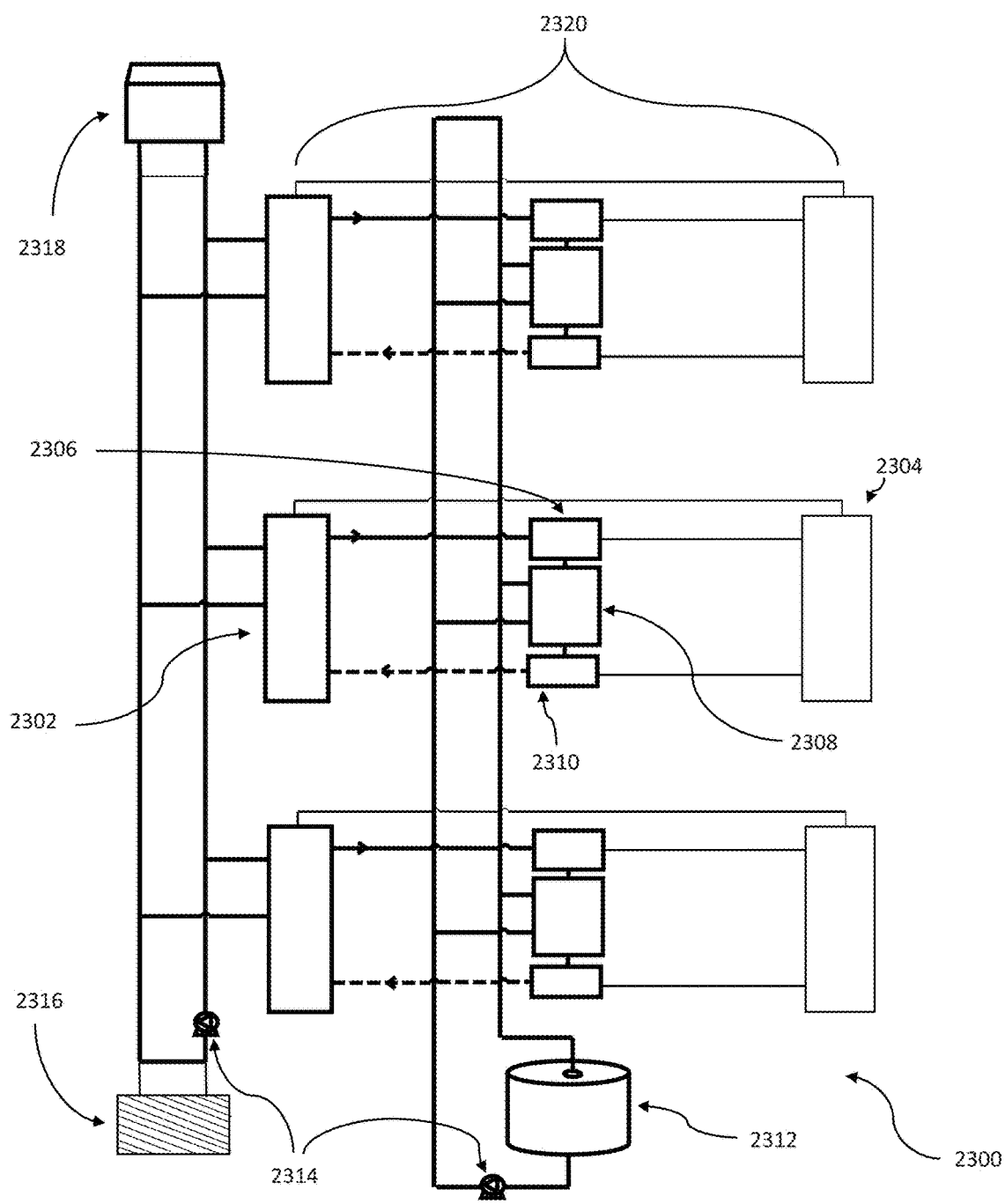
Figure 23C:
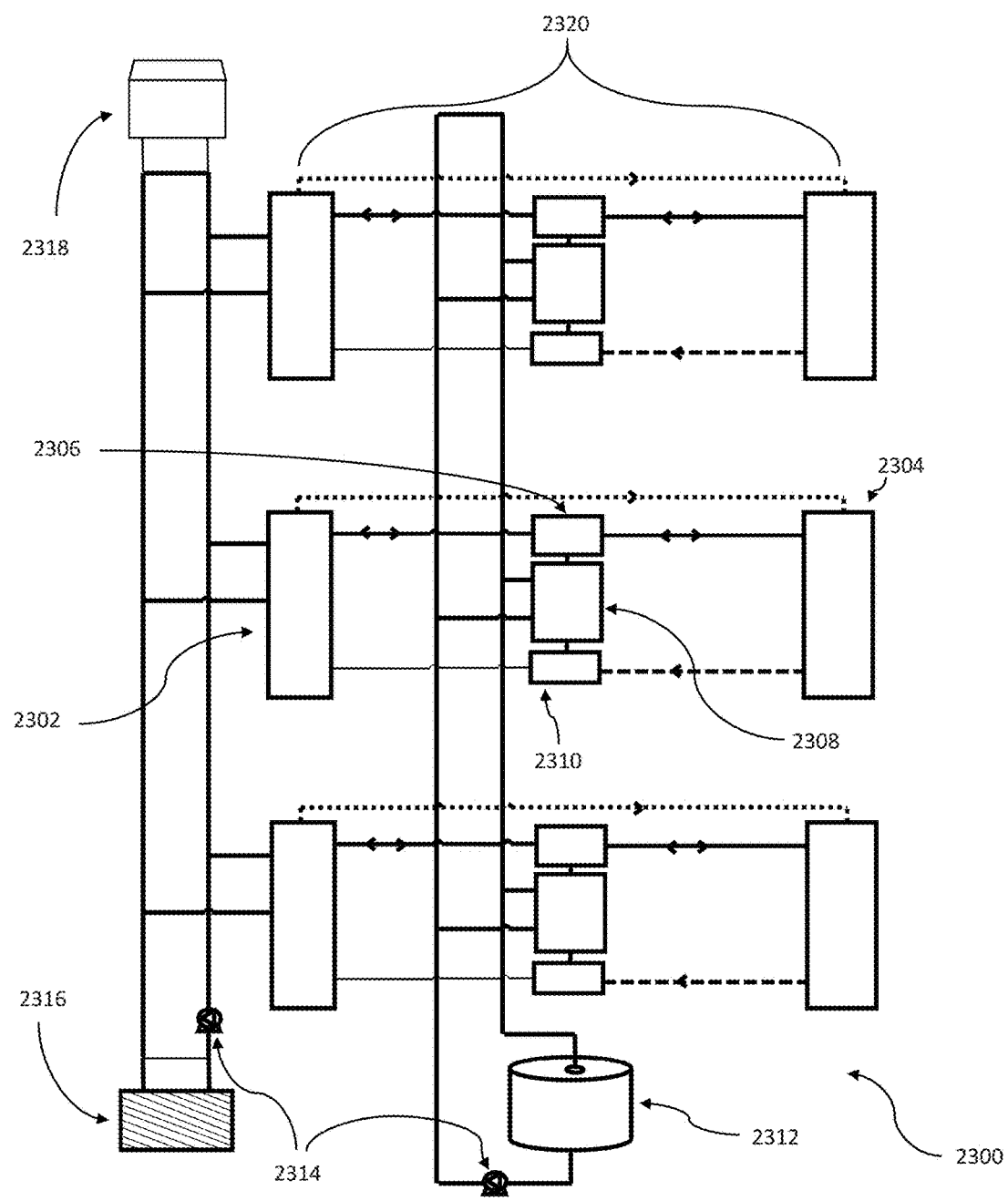

FIGS. 23A-23C illustrate a multiple connected configuration for and operation of robust air conditioning systems incorporating cold thermal energy storage devices operable to provide cooling and/or heating services. In operation the multiple connected configuration can function in a similar manner as robust air conditioning systems incorporating cold thermal energy storage devices operable to provide cooling and/or heating services as depicted in FIGS. 2A-2I.

In particular FIG. 23A illustrate that the air conditioning system 2300 is similar to that seen in FIG. 22A insofar as it includes: condensing units 2302, target spaces 2304, liquid pressurizer/distributor ensembles 2306, cold thermal energy storage unit 2308, a suction gas conditioner/distributor 2310, a unified cold thermal energy store 2312, circulation pumps 2314, a unified condenser 2318. FIG. 23A further depicts a unified integrated heating source 2316 on a shared connection with the unified condenser 2318. An individual entire robust air conditioning systems incorporating cold thermal energy storage devices operable to provide cooling and/or heating services 2320 is also depicted. Though not depicted, other suitable components such as receivers, valves, and sensors can be added without departing from the scope of the air conditioning system 2300 in accordance with many embodiments.

FIG. 23B depicts the air conditioning system 2300 in an operational mode in which the unified cold thermal energy store 2312 is being charge by the condensing units 2302 of the various individual entire robust air conditioning systems 2320 using a unified condenser 2318.

FIG. 23C depicts the air condition system 2300 in an operational mode in which the unified cold thermal energy store and the unified integrated heating source 2316 is being used in conjunction with the various individual entire robust air conditioning systems 2320 to provide cooling and/or heating to the target spaces 2304. Of course, to be clear, the air condition system 2300 can be effectuated in any of a variety of ways in accordance with embodiments of the invention.

While several alternative configurations for robust air conditioning systems have been depicted, it should be clear that any of a variety of robust air conditioning system configurations can be implemented in accordance with many embodiments of the invention.

More generally, as can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. An air conditioning system comprising:
a condensing unit;
a liquid pressurizer and distributor ensemble;
a cold thermal energy storage unit;
a target space; and
a suction gas pressurizer and distributor ensemble;
wherein:
the condensing unit, the liquid pressurizer and distributor ensemble, the cold thermal energy storage unit, the target space, and the suction gas pressurizer and distributor ensemble are operatively connected by piping such that vapor compression cycles can be simultaneously implemented that result in the cooling of the cold thermal energy storage unit and the target space;

wherein the cold thermal energy storage unit comprises:
first and second expansion devices disposed in fluid communication on either end of a liquid/gas separator, and
a volume of phase change material encased in thermal insulation interconnected with the second expansion device; and
the air conditioning system is configured such that when the vapor compression cycles are simultaneously implemented that result in the cooling of the cold thermal energy storage unit and the target space, the cold thermal energy storage unit can be cooled to a temperature lower than that of the target space; and
and the air conditioning system is configured such that, in a discharge mode, the liquid pressurizer and distributor ensemble is operable to iteratively circulate a refrigerant between the cold thermal energy storage unit and the target space so as to cool the target space without relying on any compression of any vapor phase refrigerant downstream of the target space during said circulation of said refrigerant.

2. The air conditioning system of claim 1, wherein the suction gas pressurizer and distributor ensemble comprises:
at least one of: a pressure regulator and a compressor; and
a flow control apparatus operable to controllably direct vapor phase working fluid to adjoined structures.

3. The air conditioning system of claim 1, wherein the condensing unit comprises a compressor and condenser in series, and wherein the condensing unit is operable to direct received vapor phase working fluid through a compressor to compress the vapor phase working fluid, and then direct the compressed vapor phase working fluid through a condenser to condense the vapor phase working fluid, such that the condensing unit can output the corresponding liquid phase working fluid.

4. The air conditioning system of claim 1, wherein the liquid pressurizer and distributor ensemble comprises a pump that is operable to alter the pressure of received liquid phase working fluid, and a flow control apparatus operable to controllably direct received liquid phase working fluid to adjoined structures.

5. The air conditioning system of claim 1, wherein the condensing unit is operable to output heated vapor phase working fluid.

6. The air conditioning system of claim 5, wherein the condensing unit comprises an integrated heating source and is thereby operable to output heated vapor phase working fluid.

7. The air conditioning system of claim 6, wherein the integrated heating source is a gas powered heater.

8. The air conditioning system of claim 5, further comprising piping configured to direct heated vapor phase working fluid that is output by the condensing unit to the target space.

9. The air conditioning system of claim 8, wherein the condensing unit is configured to output heated vapor phase working fluid such that when the heated vapor phase working fluid is directed by the piping to the target space, it condenses into a liquid phase working fluid.

10. The air conditioning system of claim 5, further comprising:
a discharge gas distributor; and
a hot thermal energy storage unit;
wherein the discharge gas distributor, the hot thermal energy storage unit, the liquid pressurizer and distributor ensemble, and the target space are operatively connected by piping such that heated vapor phase working fluid output by the condensing unit can be circulated, using the discharge gas distributor, to the target space and/or the hot thermal energy storage unit.

11. The air conditioning system of claim 10, wherein the condensing unit is configured to output heated vapor phase working fluid such that when the heated vapor phase working fluid is directed by piping to the target space and/or the hot thermal energy storage unit, it condenses into a liquid phase working fluid.

12. The air conditioning system of claim 11, wherein the hot thermal energy storage unit comprises a thermal storage medium encased in thermal insulation.

13. The air conditioning system of claim 1, further comprising:
   a hot thermal energy storage unit that is operable to act as a heat source;
   wherein:
      the hot thermal energy storage unit and the target space are operatively connected by piping; and
      the hot thermal energy storage unit is configured to receive liquid phase working fluid, and heat it so that it outputs vapor phase working fluid that thereafter be directed to the target space to heat it.

14. The air conditioning system of claim 13, wherein the air conditioning system is configured such that the vapor phase working fluid that is output by the hot thermal energy storage unit and thereafter directed to the target space, transmits heat to the target space and thereby condenses.

15. The air conditioning system of claim 1, wherein the condensing unit is configured to be operable only on received vapor phase working fluid that is within a distinct pressure range, and the suction gas pressurizer and distributor ensemble is configured to output vapor phase working fluid that is within the distinct pressure range.

16. The air conditioning system of claim 1, wherein the cold thermal energy storage unit comprises a phase change material within a circuit that interfaces with the piping via a heat exchanger.

17. The air conditioning system of claim 1, further comprising piping in fluid communication with volume of phase change material and configured to bypass the first and second expansion devices and the liquid/gas separator.

18. The air conditioning system of claim 1, further comprising piping in direct fluid communication with the liquid/gas separator.

19. The air conditioning system of claim 1, further comprising a primary heat exchanger is in thermal communication with the volume of phase change material and in fluid communication with the second expansion device.

20. The air conditioning system of claim 19, further comprising piping separately interconnecting the primary heat exchanger and the liquid/gas separator.

21. The air conditioning system of claim 19, wherein the primary heat exchanger further comprises a slurry ice generator configured to generate a pump-able phase change material slurry wherein the pump-able phase change material slurry is stored in a thermal energy store.

22. The air conditioning system of claim 19, wherein the thermal energy storage unit further comprises an direct contact heat transfer type slurry ice generator wherein a cooled secondary heat transfer fluid interacts with the volume of phase change material thereby causing the volume of phase change material to freeze prior to being separated and returned to the primary heat exchanger.

23. The air conditioning system of claim 1, further comprising a suction line heat exchanger in fluid communication between the liquid/gas separator and the second expansion device.

24. The air conditioning system of claim 23, wherein the suction line heat exchanger in further fluid communication with the volume of phase change material such that the volume of phase change material is in thermal communication with the refrigerant.

25. The air conditioning system of claim 1, wherein the suction gas pressurize and distributor ensemble is in fluid communication with multiple flows of vapor phase working fluid from a plurality of cold thermal energy storage units and a plurality of target spaces; and
   further comprises a plurality of pressure equalizing expansion valves, wherein at least one expansion valve is configured to be in fluid communication with the plurality of cold thermal energy storage units; and
   wherein each of the target spaces are in fluid communication with at least one expansion valve such that the plurality of expansion valves operate to equalize the fluid pressure between the target spaces and the cold thermal energy storage units.

26. The air conditioning system of claim 1, wherein the suction gas pressurizer and distributor ensemble is in fluid communication with a plurality of streams of vapor phase working fluid each having an operating pressure, wherein at least one stream exhibits a lower operating pressure than the remaining streams; and
   further comprises a booster compressor in fluid communication with the at least one stream exhibiting a lower operating pressure whereby the booster compressor is configured to equalize the lower pressure stream with the remaining streams.

* * * * *